United States Patent
Nakagawa et al.

(10) Patent No.: US 7,249,317 B1
(45) Date of Patent: Jul. 24, 2007

(54) INFORMATION PROCESSING APPARATUS, ITS CONTROL METHOD, AND STORAGE MEDIUM

(75) Inventors: Hisao Nakagawa, Kanagawa (JP); Tadashi Yamakawa, Kanagawa (JP); Eiji Kato, Kanagawa (JP); Akihiro Kohno, Tokyo (JP); Yoichi Kamei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 09/667,638

(22) Filed: Sep. 22, 2000

(30) Foreign Application Priority Data

| Sep. 27, 1999 | (JP) | 11-272951 |
| Sep. 27, 1999 | (JP) | 11-272952 |
| Sep. 27, 1999 | (JP) | 11-272953 |
| Sep. 27, 1999 | (JP) | 11-272986 |

(51) Int. Cl.
*G06F 15/00* (2006.01)
*G06F 15/16* (2006.01)
*G06F 15/167* (2006.01)

(52) U.S. Cl. .................. 715/515; 715/501.1; 709/203; 709/218; 348/211.9

(58) Field of Classification Search ................ 715/515, 715/513, 501.1; 348/211.9, 238, 1.15, 159, 348/537, 539; 709/203, 230
See application file for complete search history.

(56) References Cited

U.S. PATENT DOCUMENTS

| 5,742,329 | A | * | 4/1998 | Masunaga et al. | 348/14.07 |
| 5,781,915 | A | * | 7/1998 | Kohno et al. | 715/511 |
| 5,819,300 | A | * | 10/1998 | Kohno et al. | 715/511 |
| 5,875,304 | A | * | 2/1999 | Winter et al. | 709/231 |
| 5,907,851 | A | * | 5/1999 | Yamakawa et al. | 715/540 |
| 5,982,362 | A | * | 11/1999 | Crater et al. | 715/719 |
| 6,067,571 | A | * | 5/2000 | Igarashi et al. | 709/232 |
| 6,122,005 | A | * | 9/2000 | Sasaki et al. | 348/211.3 |
| 6,209,048 | B1 | * | 3/2001 | Wolff | 710/62 |

(Continued)

FOREIGN PATENT DOCUMENTS

JP 09-070034 3/1997

(Continued)

OTHER PUBLICATIONS

K. Goldberg et al., "Beyond the Web: Excavating the Real World Via Mosaic," University of Southern California, LA, CA, 1994, pp. 1-15.*

*Primary Examiner*—William Bashore
*Assistant Examiner*—Maikhanh Nguyen
(74) *Attorney, Agent, or Firm*—Fitzpatrick, Cella, Harper & Scinto

(57) ABSTRACT

This invention allows easy update of an image to be included in a document which is submitted on the network. For this purpose, data that set the image sensing times and image sensing states of a camera (111) the pan angle, tilt angle, and zoom ratio of which can be varied, are stored in an HD (106). If one of the stored times has been reached, image sensing is done in accordance with the set contents, and the obtained image is stored in the HD (106). Upon launching a candidate edit program, an old document inserted with images is displayed on a CRT (103). When a desired image is designated, it is substituted by a new, sensed image candidate corresponding to that designation position. The created document is then uploaded to a WWW server.

5 Claims, 66 Drawing Sheets

U.S. PATENT DOCUMENTS

| | | | |
|---|---|---|---|
| 6,313,875 B1 * | 11/2001 | Suga et al. | 348/211.99 |
| 6,438,566 B1 * | 8/2002 | Okuno et al. | 715/512 |
| 6,469,737 B1 * | 10/2002 | Igarashi et al. | 348/211.3 |
| 6,484,195 B1 * | 11/2002 | Igarashi et al. | 709/203 |
| 6,525,761 B2 | 2/2003 | Sato et al. | 348/14.04 |
| 6,560,639 B1 * | 5/2003 | Dan et al. | 709/218 |
| 6,874,131 B2 * | 3/2005 | Blumberg | 382/148 |
| 6,930,709 B1 * | 8/2005 | Creamer et al. | 348/211.3 |
| 2002/0135698 A1 * | 9/2002 | Shinohara | 348/473 |

FOREIGN PATENT DOCUMENTS

| | | |
|---|---|---|
| JP | 09-083955 | 3/1997 |
| JP | 09-160925 | 6/1997 |
| JP | 09-288684 | 11/1997 |
| JP | 10-042279 | 2/1998 |
| JP | 10-051674 | 2/1998 |
| JP | 10-063749 | 3/1998 |
| JP | 10-097637 | 4/1998 |
| JP | 10-164419 | 6/1998 |
| JP | 10-191143 | 7/1998 |
| JP | 10-243285 | 9/1998 |
| JP | 11-098481 | 4/1999 |
| JP | 11-103451 | 4/1999 |
| JP | 11-112857 | 4/1999 |
| JP | 11-203299 | 7/1999 |
| JP | 11-242523 | 9/1999 |
| JP | 11-265390 | 9/1999 |

* cited by examiner

FIG. 13

|  | PRESET 1 | PRESET 2 | PRESET 3 | PRESET 4 | ... |
|---|---|---|---|---|---|
| PAGE 1 |  |  |  |  |  |
| PAGE 2 | ✓ | ✓ |  |  |  |
| PAGE 3 | ✓ |  |  | ✓ |  |
| ⋮ |  |  |  |  |  |

| PAN VALUE | TILT VALUE | ZOOM VALUE |
|---|---|---|
| 9.72 | 0.00 | 46.80 |
| 7.72 | 0.00 | 46.80 |
| 8.72 | 0.00 | 46.80 |
| 10.72 | 0.00 | 46.80 |
| 11.72 | 0.00 | 46.80 |
|  |  |  |
| 9.72 | -2.00 | 46.80 |
| 9.72 | -1.00 | 46.80 |
| 9.72 | 1.00 | 46.80 |
| 9.72 | 2.00 | 46.80 |
|  |  |  |
| 9.72 | 0.00 | 44.80 |
| 9.72 | 0.00 | 45.80 |
| 9.72 | 0.00 | 47.80 |
| 9.72 | 0.00 | 48.80 |

FIG. 22

| PRESET | PAN DISPLACEMENT AMOUNT | PAN DISPLACEMENT VALUE | TILT DISPLACEMENT AMOUNT | TILT DISPLACEMENT VALUE | ZOOM DISPLACEMENT AMOUNT | ZOOM DISPLACEMENT VALUE |
|---|---|---|---|---|---|---|
| 1 | 1 | ±2 | 1 | ±2 | 1 | ±2 |
| 2 | 1 | ±1 | 0 | 0 | 0 | 0 |
| 3 | 0.5 | ±2 | 0.5 | ±2 | 1 | -1 |
| 4 | 2 | ±1 | 2 | ±1 | 2 | +2 |
| 5 | | | | | | |

10201

F I G. 44
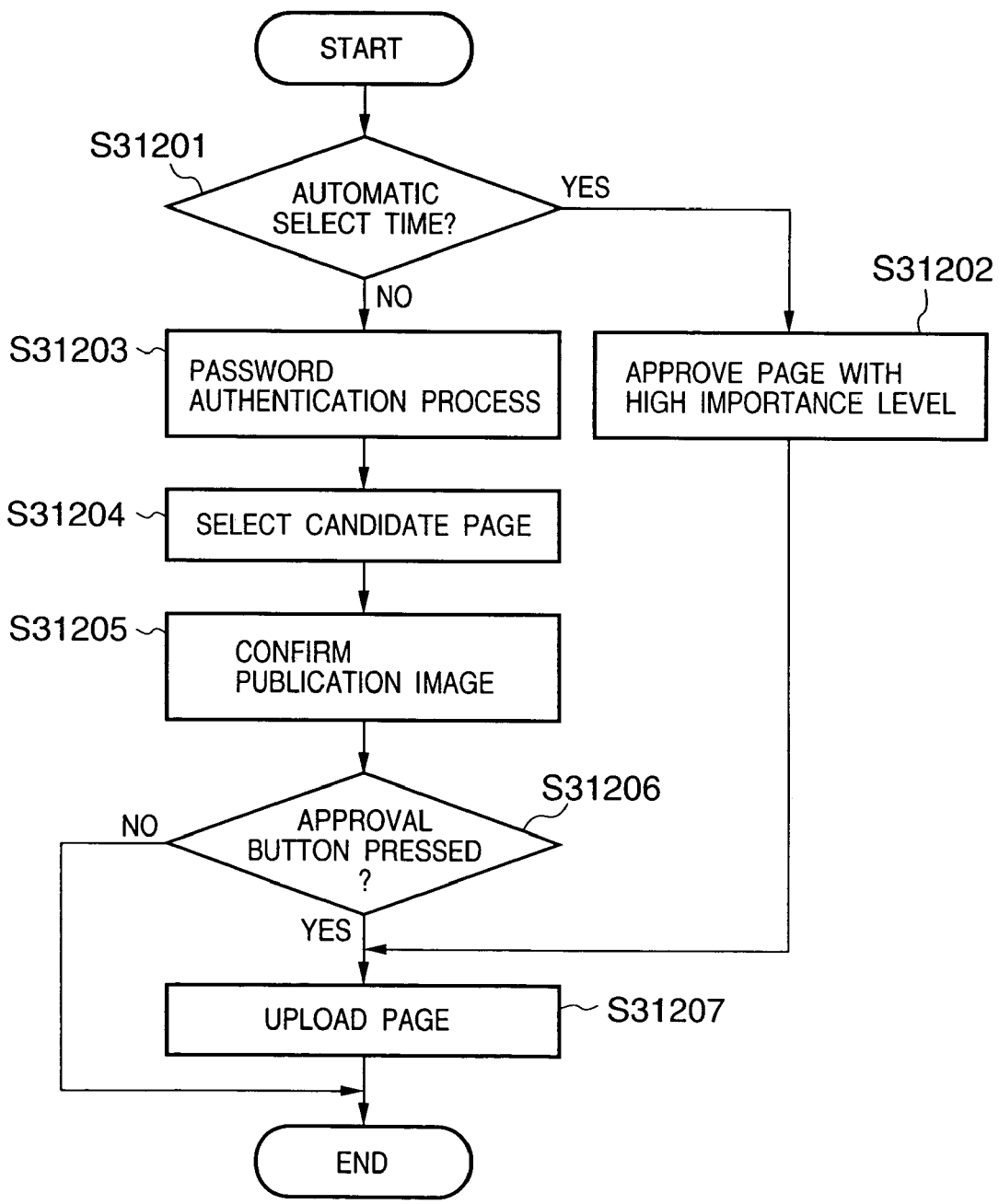

| PAGE 1 | ZERO TIMES, 11:20 |
|---|---|
| PAGE 2 | ONCE, 11:25 |
| PAGE 3 | TWICE, 11:30 |
| PAGE 4 | THREE TIMES, 11:55 |
| PAGE 5 | TWICE, 11:40 |
| PAGE 6 | THREE TIMES, 11:45 |
| ⋮ | ⋮ |

| PAGE 1 | ZERO TIMES, 11:20, ONCE |
|---|---|
| PAGE 2 | ONCE, 11:25, THREE TIMES |
| PAGE 3 | TWICE, 11:30, ONCE |
| PAGE 4 | THREE TIMES, 11:55, ZERO TIMES |
| PAGE 5 | TWICE, 11:40, ZERO TIMES |
| PAGE 6 | THREE TIMES, 11:45, ONCE |
| ⋮ | ⋮ |

| | SELECT | SUPPORT |
|---|---|---|
| 120-1-1 | 1 | 1 |
| 120-2-1 | 0 | 1 |
| 120-3-1 | 2 | 0 |
| 120-4-1 | 1 | 2 |
| 120-1-2 | 0 | 0 |
| 120-2-2 | 1 | 1 |
| ⋮ | ⋮ | ⋮ |

| PAGE 1 | ZERO TIMES, 11:20, ONCE | 8 |
|---|---|---|
| PAGE 2 | ONCE, 11:25, THREE TIMES | 6 |
| PAGE 3 | TWICE, 11:30, ONCE | 6 |
| PAGE 4 | THREE TIMES, 11:55, ZERO TIMES | 7 |
| PAGE 5 | TWICE, 11:40, ZERO TIMES | 5 |
| PAGE 6 | THREE TIMES, 11:45, ONCE | 7 |
| ⋮ | ⋮ | ⋮ |

| | PUBLICATION |
|---|---|
| 120-1-1 | OK |
| 120-2-1 | OK |
| 120-3-1 | NG |
| 120-4-1 | OK |
| 120-5-1 | NG |
| 120-1-2 | NG |
| 120-2-2 | OK |
| ⋮ | ⋮ |

FIG. 67

| | SELECT | SUPPORT | PUBLICATION 44001 |
|---|---|---|---|
| 120-1-1 | 1 | 1 | OK |
| 120-2-1 | 0 | 1 | OK |
| 120-3-1 | 2 | 0 | NG |
| 120-4-1 | 1 | 2 | OK |
| 120-5-1 | 0 | 0 | NG |
| 120-1-2 | 0 | 0 | NG |
| 120-2-2 | 1 | 1 | OK |
| ⋮ | ⋮ | ⋮ | ⋮ |

INFORMATION PROCESSING APPARATUS, ITS CONTROL METHOD, AND STORAGE MEDIUM

FIELD OF THE INVENTION

The present invention relates to an information processing apparatus, its control method, and a storage medium and, more particularly, to an information processing apparatus which creates an electronic document using images sensed and stored by a video input device, its control method, and a storage medium.

BACKGROUND OF THE INVENTION

An increasing number of users connect to the Internet these days. Such users can build their home pages on the Internet as information resources in place of merely accessing the Internet. Also, networks in each company and in related companies, i.e., so-called intranets, have prevailed.

Upon advertising a given shop, it is a common practice to use newspapers (inserted bills), magazines, or broadcast. However, publishing home pages can achieve resource savings, and such approach to advertising a given shop will become increasingly prevalent in the future. Even small shops are projected to use such services.

Upon updating a home page, the user must edit his or her home page on the terminal, and then must upload the edited result to a WWW server.

Although it is not common to update a personal home page so frequently, if a need to update a home page frequently arises, such works are complicated and result in another factor of cost increase.

For example, a home page that displays menu items of a cafeteria will be examined. In this case, when a menu item has changed, it is required to quickly update an open image list page. More specifically, the following processes will be done. That is, an image of each menu item is sensed using a digital camera or the like, and that image data is captured using an HTML document editor or the like and is edited. Finally, the obtained data is then uploaded to the WWW server.

Therefore, as soon as a menu item has changed, one must contact an editor to ask him or her to start editing. In other words, the editor must stand by while a menu item change is likely to occur, resulting in high running cost. Also, updating is troublesome. Furthermore, it is not easy to precisely lay out an object to be sensed in correspondence with the image sensing position.

If there are documents or images which are not to be open to the public, the operator must examine such documents or images one by one whether to open them to the public.

SUMMARY OF THE INVENTION

The present invention has been made in consideration of the above problems and has as its object to provide an information processing apparatus which can easily update an image contained in a document which is submitted on the network, its control method, and a storage medium.

In order to achieve the above object, an image processing apparatus according to the present invention comprises the following arrangement. That is, an information processing apparatus for submitting document information including an image via a network, comprises image input means, schedule storage means for storing input schedule information of the image input means, image storage means for storing an image obtained in accordance with the schedule information, and document creation means for creating new document information by substituting an image in the document information by the image stored in the image storage means.

It is another object of the present invention to provide an information processing apparatus which can easily update an image contained in a document which is submitted on the network, and can make an image of an object to be sensed fall within the field range the user intended without precisely designating the image sensing position, its control method, and a storage medium.

In order to achieve the above object, an image processing apparatus according to the present invention comprises the following arrangement. That is, an information processing apparatus for submitting document information including an image via a network, comprises image input means, schedule input means for inputting schedule information pertaining to image capture of the image input means, correction means for correcting the schedule information input by the schedule input means, image storage means for storing an image obtained in accordance with new schedule information corrected by the correction means, and document creation means for creating document information on the basis of an image stored in the image storage means.

It is still another object of the present invention to provide an information processing apparatus which can easily update an image contained in a document which is submitted on the network, and can automatically make it open on the network, its control method, and a storage medium.

In order to achieve the above object, an image processing apparatus according to the present invention comprises the following arrangement. That is, an information processing apparatus for submitting document information including an image via a network, comprises image input means, schedule input means for inputting schedule information pertaining to image capture of the image input means, correction means for correcting the schedule information input by the schedule input means, image storage means for storing an image obtained in accordance with new schedule information corrected by the correction means, document creation means for creating document information on the basis of an image stored in the image storage means, authentication means for authenticating if a candidate document is submitted onto the network, and submission control means for controlling submission of the candidate document onto the network in accordance with a predetermined condition irrespective of an authentication result of the authentication means.

It is still another object of the present invention to provide an information processing apparatus which can easily update an image contained in a document which is submitted on the network, and can set an image sensed under a required image sensing condition to be closed, its control method, and a storage medium.

In order to achieve the above object, an image processing apparatus according to the present invention comprises the following arrangement. That is, an information processing apparatus for submitting document information including an image via a network, comprises image input means, schedule storage means for storing input schedule information of the image input means, image storage means for storing an image obtained in accordance with the schedule information, document creation means for creating new document information by substituting an image in the document information by the image stored in the image storage means, and setting means for setting a condition for inhibiting an image, which is input by the image input means and is stored, from being published, wherein an image that satisfies the condition set by the setting means is determined not to be published, and is excluded from images to be submitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a view showing the contents of a substitute table in the second embodiment;

FIG. 21 shows a list of displacement camera angle information generated from camera angle information in the fourth embodiment;

FIG. 22 shows an example of displacement camera angle setup window in the fourth embodiment;

FIG. 44 is a flow chart showing the processing contents of a page select program in the 11th embodiment;

FIG. 46 shows the contents of a candidate importance list in the 11th embodiment;

FIG. 50 shows the contents of a candidate importance list in the 12th embodiment;

FIG. 54 shows the contents of a candidate importance list in the 13th embodiment;

FIG. 55 shows the contents of an image importance list in the 13th embodiment;

FIG. 64 shows an example of the contents of a publication list in the 15th embodiment;

FIG. 67 shows an example of the contents of an image importance list in the 16th embodiment.

DETAILED DESCRIPTION OF THE PREFERRED EMBODIMENTS

Preferred embodiments of the present invention will be described in detail hereinafter with reference to the accompanying drawings.

First Embodiment

Figure 2:
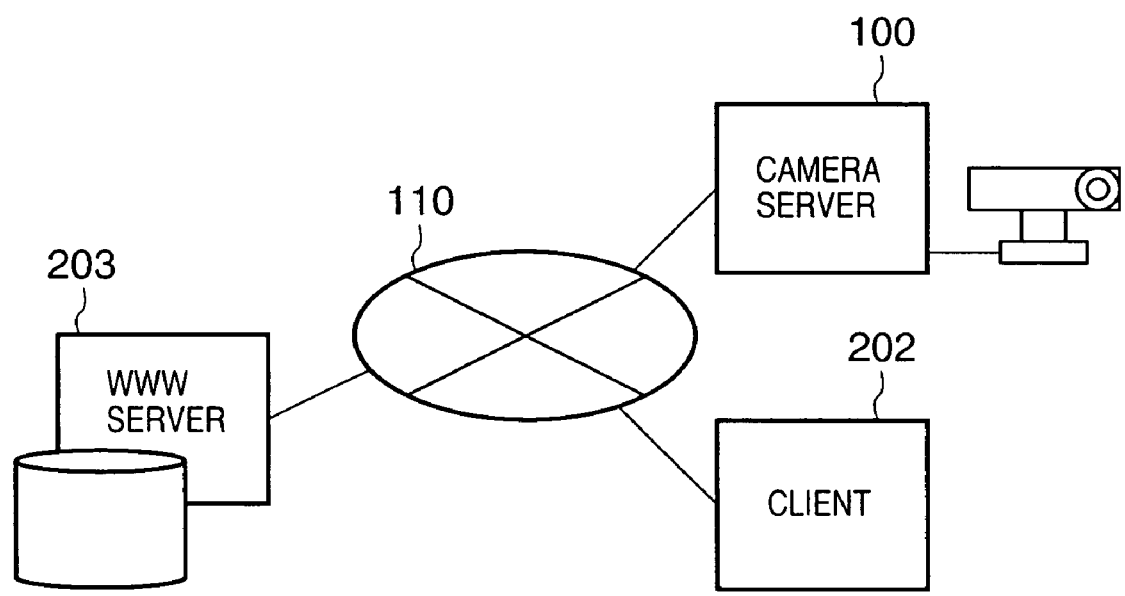
FIG. 2 is a diagram showing the system arrangement to which a camera server of each embodiment is applied.

FIG. 2 shows the arrangement of a system used in each embodiment. Referring to FIG. 2, reference numeral 100 denotes a camera server which serves as an image edit system; and 110, a network (the Internet or the like). Reference numeral 202 denotes a client connected to the network 110; and 203, a WWW (World Wide Web) server that offers WWW services.

In this embodiment, a home page (to be simply referred to as a page hereinafter) is edited/created on the basis of images sensed/recorded by the camera server 100, and is uploaded to the WWW server 203. When the user accesses the WWW server 203 via the client 202, he or she can browse through images (pages) sensed by the camera server 100.

Figure 1:
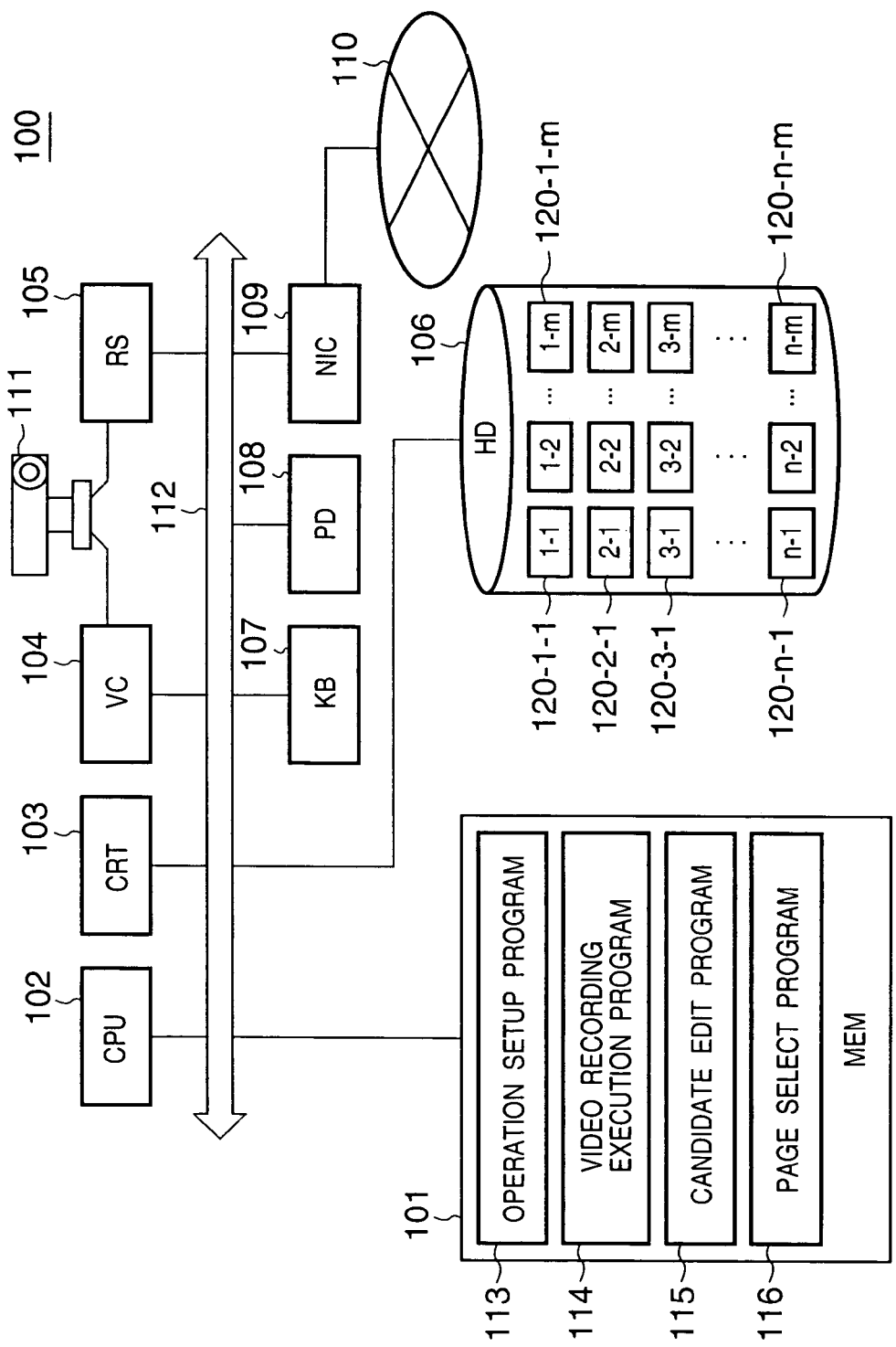
FIG. 1 is a block diagram showing the arrangement of a camera server according to the first embodiment of the present invention.

FIG. 1 shows the arrangement of the camera server 100 which serves as an image edit system in the embodiment.

In the camera server 100, a memory 101 for storing programs and data required for starting up the system, a central processing unit 102 for controlling arithmetic operations and processes, a CRT 103 as a display device for displaying characters, symbols, images, and the like, an image input interface 104 for capturing images, a serial interface 105 for exchanging control commands and the like, an auxiliary storage device (hard disk or the like) 106 for saving data, a keyboard device 107 for inputting characters and the like, a pointing device 108 used to point to a displayed character or the like using a cursor, and a network communication interface 109 for exchanging data among many locations are connected via a bus 112.

The camera server 100 is connected to the network 110 via the network communication interface 109.

A camera 111 is connected to the image input interface (VC) 104 for capturing images and the serial interface (RS) 105 for receiving control commands and the like, and sending status signals (current status and the like). That is, the image sensing conditions of the camera 111 (pan angle, tilt angle, zoom ratio, exposure, and the like) are controlled by sending commands via the RS 105. An image sensed by the camera 111 is received by the VC 104, and is captured as digital data. A program associated with this control is stored in the memory 101.

The memory 101 mainly stores an operation setup program 113, video recording execution program 114, candidate edit program 115, and page select program 116.

Note that these programs may be stored in a storage medium (not shown), and may be loaded and executed on the memory 101 via a drive device (not shown) of that storage medium. In other words, the camera server 110 may use a versatile information processing apparatus (e.g., a personal computer or the like) which has an interface for connecting the camera 111.

The operations of this embodiment with the aforementioned arrangement will be described in detail in turn below.

When the time set by the operator upon executing the operation setup program 113 has been reached, the camera server 110 controls the camera 111 to sense a video at a predetermined position, and stores the sensed video.

Figure 3:
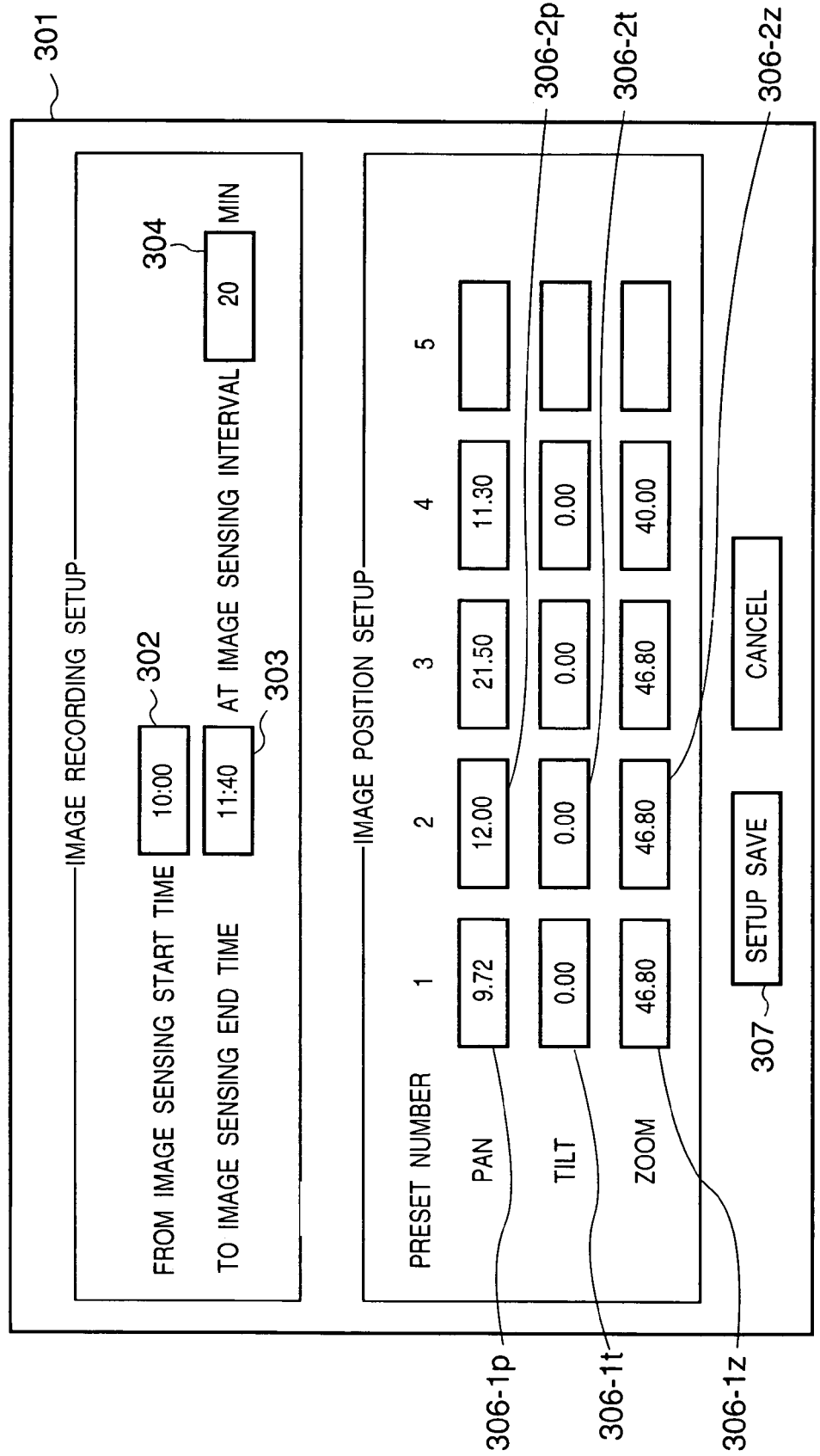
FIG. 3 shows a user interface with which the user sets an image sensing schedule of the camera server in the first embodiment.

FIG. 3 shows an example of the operation setups for setting an image sensing schedule of this camera server, and the flow of the operation setup program will be explained below using the flow chart in FIG. 6.

Default setup data (not shown) are read from the auxiliary storage device 106 (S601), and a setup page window 301 in FIG. 3 is displayed in accordance with the read data (S602). If no setup data is available, items to be described below have no entries.

On this window, fields 302, 303, and 304 are respectively used to input the image sensing start time, image sensing end time, and image sensing interval.

Pan, tilt, and zoom information of the first preset position can be respectively input using fields 306-1$p$, 306-1$t$, and 306-1$z$. Pan, tilt, and zoom information of the second preset position can be respectively input using fields 306-2$p$, 306-2$t$, and 306-2$z$. Likewise, in this embodiment, a maximum of five preset positions can be input using the corresponding fields. Of course, the number of preset positions can be increased/decreased as needed.

The setup input process in step S604 repeats itself until a setup save button 307 is pressed. If the setup save button 307 has been pressed, the flow advances to step S605 (S603).

In the setup input process (step S604), data input in various fields are checked to change display of input data. In the example of FIG. 3, the image sensing start time, image sensing end time, image sensing interval, and camera angle information of the first to fourth preset positions are set.

Since no data is designated for the fifth preset position, image sensing and video recording at four preset positions are designated at the designated image sensing interval from the image sensing start time to the image sensing end time.

In step S605, respective pieces of displayed information are written in a setup file in the auxiliary storage device 106.

In the example shown in FIG. 3, the setup file that designates to sense four images from an image with a camera angle of the first preset position (pan value=9.72, tilt value=0.00, and zoom value=46.80) to an image with a camera angle of the fourth preset position (pan value=11.30, tilt value=5.00, and zoom value=40.00) at each of image sensing timings of 20-min intervals (a total of six timings) from 10:00 until 11:40 is saved.

Note that registration is made in the operating system to launch the video recording execution program 114 at each image sensing time.

When the time designated by the operation setup program has been reached, the video recording execution program 114 is launched to sense and store videos.

Figure 7:
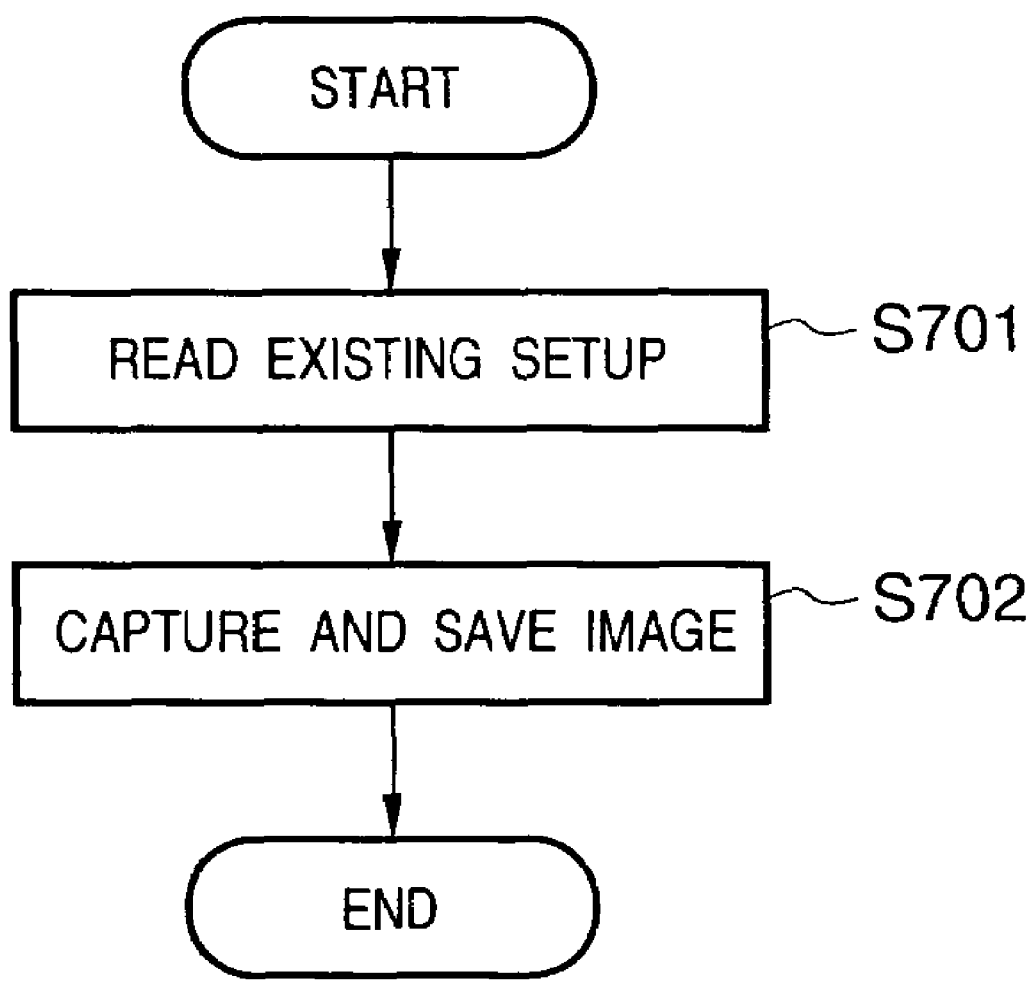
FIG. 7 is a flow chart showing the processing sequence of a video recording execution program in the first embodiment.

The flow of the video recording execution program will be explained below using the flow chart in FIG. 7.

Data (not shown) of the setup file are read from the auxiliary storage device 106 (step S701), and an image capture command of a predetermined camera angle corresponding to each preset position is sent to the camera 111 to control the camera 111 to capture an image. The captured image is written in the auxiliary storage device in correspondence with each image capture timing and preset position (step S702).

For example, the following image capture command is issued to the camera 111 for the first preset position shown in FIG. 3:

GetStillImage?pan=9.72&tilt=0.00&zoom=46.80& . . .

Then, as shown in FIG. 1, from image sensing time 10:00, images at the first, second, third, and fourth preset positions are respectively saved as files "image data 120-1-1", "image data 120-2-1", "image data 120-3-1", and "image data 120-4-1" in the auxiliary storage device 106.

Likewise, from the next image sensing time 10:20, images at the first preset position, second preset position, . . . are saved as files "image data 120-1-2", "image data 120-2-2", . . . Upon completion of all image sensing schedules by repeating the aforementioned processes, the video recording execution program ends.

In the above description, the operation setup data is saved in the auxiliary storage device 106. Alternatively, data may be kept stored in the memory 101 without being erased even after the operation setup program 113 ends.

Figure 4:
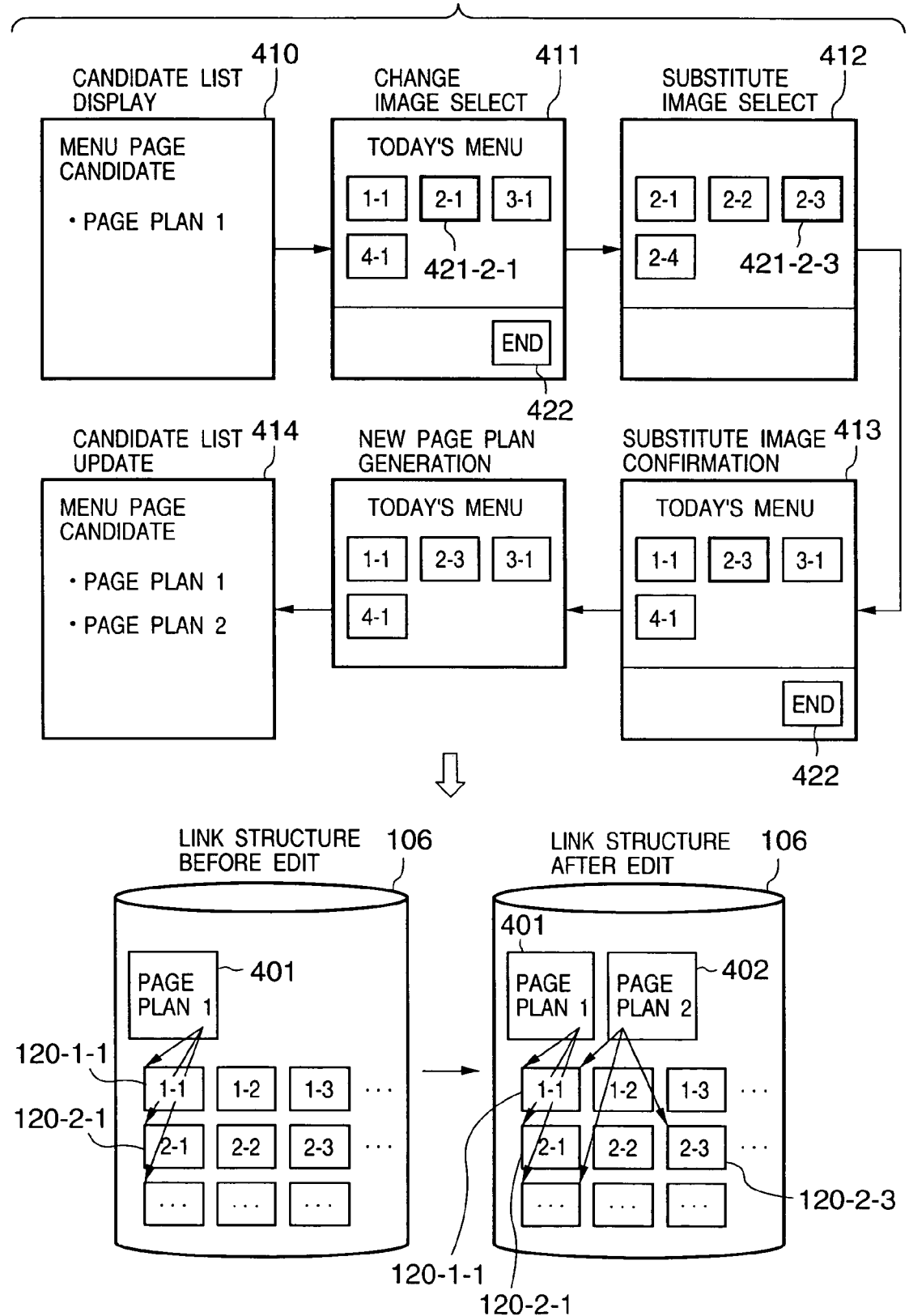
FIG. 4 is a chart showing the flow of image edit processes in the first embodiment.

FIG. 4 shows an example of the flow of image edit processes.

The flow of the candidate edit program 115 will be explained using the flow chart in FIG. 8. This process starts when a page candidate editor launches the page select program 115.

This embodiment will explain an example wherein a "cafeteria menu page" (for example, an intranet is built in a given company, and a menu page of a cafeteria of that company) is created.

A candidate list window 410 used to select a page to be edited is displayed (step S801).

If no image page candidate is available, an image page that displays a list of images at a specific time of the respective image sensing positions is automatically generated on the basis of image data which have been sensed and stored, and the flow advances to step S802 to display this page.

If one candidate is selected, a change image select window 411 that shows the image page generated by the system as page plan 1 is displayed (step S802).

In this case, as shown in page plan data 401 before edit, page plan 1 uses first candidate images of the first to fourth preset positions like image data 120-1-1, 120-2-1.

If an end button has been pressed, the flow advances to step S806. If one of the displayed images is selected, the flow advances to step S805 (decision processes in steps S803 and S804).

In step S805, a substitute image select window 412 that displays images sensed at respective times at the same preset position as the selected image as substitute candidate images is displayed. If one of the displayed images is selected, the selected image is substituted by the image at the selected time, and the flow returns to step S802 to repeat the process. That is, the change image select window 413 is displayed.

For example, when the user wants to change an image 421-2-1 and clicks it, this image is selected, and the flow advances to step S805.

The image 421-2-1 corresponds to the image data 120-2-1, and is the image sensed at the second preset position at the first time. Then, images sensed at the second preset position at respective image sensing times are displayed, and an image candidate select window is displayed. When an image 421-2-3 is selected on that window, a page on which the image data 120-2-1 is substituted by the image data 120-2-3 is created.

Upon depression of an end button 422, page plan data 402 is created as page plan 2, and is simultaneously saved in the auxiliary storage device 106 (step S806). The candidate list is updated (step S807). In the next edit process, a candidate list window 414 to which a new candidate is added is displayed. The candidate edit program has been explained.

Upon completion of all image substitute edit processes, the page select program 116 executes a page authentication process and an upload process to the WWW server 203.

This process is started when an approver launches the page select program 116.

Figure 5:
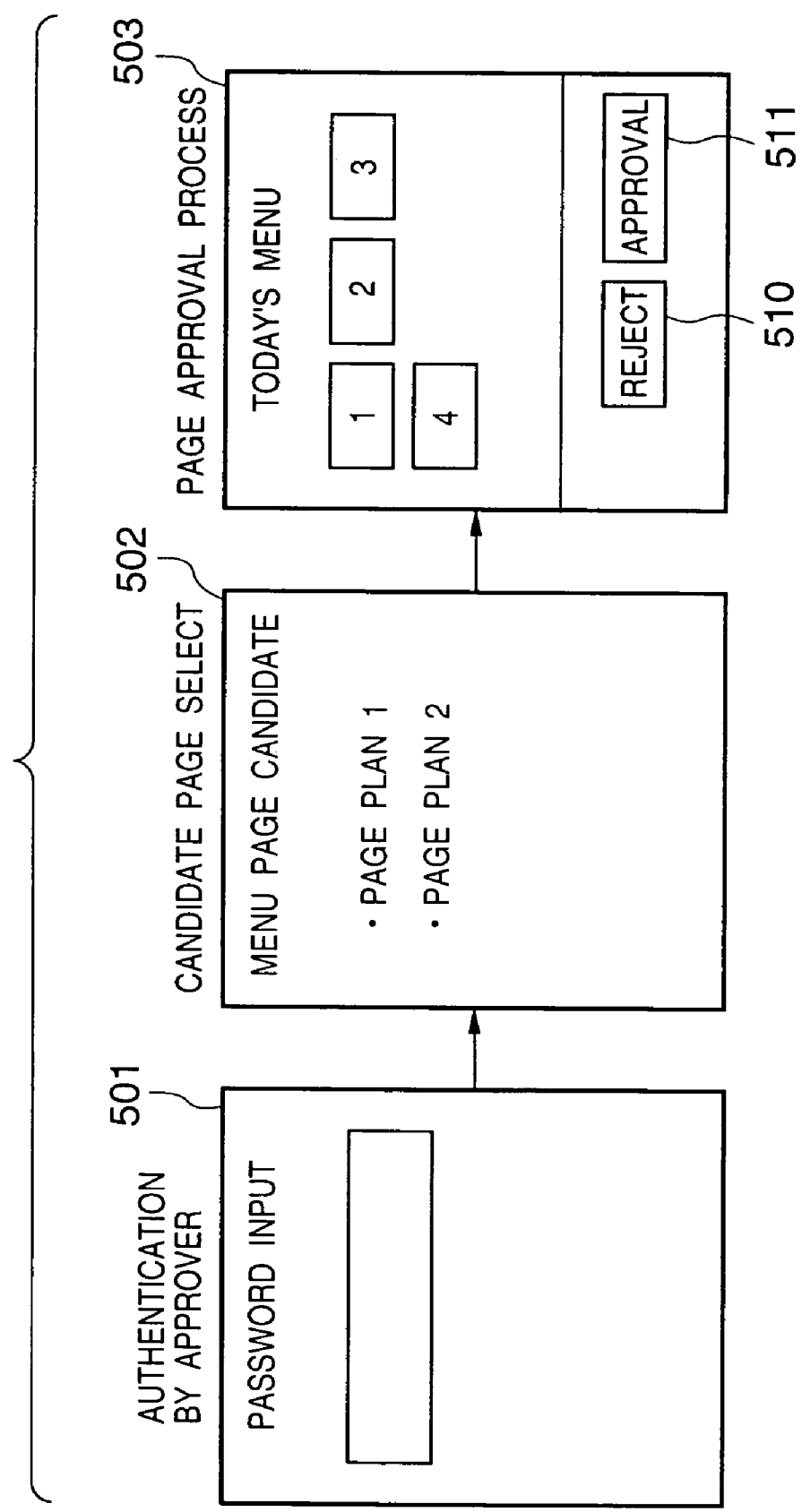
FIG. 5 is a chart for explaining the flow of page authentication processes in the first embodiment.

FIG. 5 shows an example of the flow of this page authentication. The flow of the page select program will be explained below using the flow chart in FIG. 9.

Connection to the WWW server is established, and an authentication window 501 of the approver is displayed at that time to execute a password authentication process (step S901). If authentication has failed, the process is interrupted.

If authentication has succeeded, a candidate page select window 502 is displayed (step S902). Upon selection of a candidate, a page approval process window 503 is displayed (step S903). If a reject button 510 has been pressed on this window, the process ends; if it is determined that an approval button 511 has been pressed (step S904), the flow advances to step S905.

In step S905, the approved image page is uploaded to the WWW server 203, thus ending the process. When a public network is used in place of an intranet (e.g., when the Internet is used), a line disconnection process may be done upon completion of transfer.

With the aforementioned sequence, the WWW service on the WWW server 203 publishes the image page on the network, and the user can access that page via a WWW browser on the client.

The page select program has been explained.

Note that a plurality of persons can use this system as image page candidate editors.

Based on a page that has been edited by a given editor, another editor can easily create another image page. Hence, candidate plans are created by volunteers, and a manager can finally select and approve one of such candidate plans and publish the selected page.

As described above, according to this embodiment, an image page can be created by selecting only appropriate sensed images in units of positions, and the load of the edit work can be greatly reduced. By selecting a substitute sensed image for only a position which is required to be changed on the image page automatically created by the system, the image page can be modified. Hence, an image of a given position where the image is not sensed satisfactorily need only be changed, thus further reducing the load of the edit work. Furthermore, a plurality of volunteers can create some image page candidates, and by only selecting one of a plurality of created image page candidates, the image page can be uploaded to and published on the WWW server, thus further reducing running cost.

Second Embodiment

In the above embodiment (first embodiment), images are evenly displayed on the candidate page. However, the present invention is not limited to such specific embodiment.

In the second embodiment, whether each image to be displayed is approved is indicated upon displaying a candidate page. In this manner, the editor can recognize at a glance whether or not each image has been edited, thus improving the edit efficiency of an image page.

The second embodiment will be described in detail below.

Figure 10:
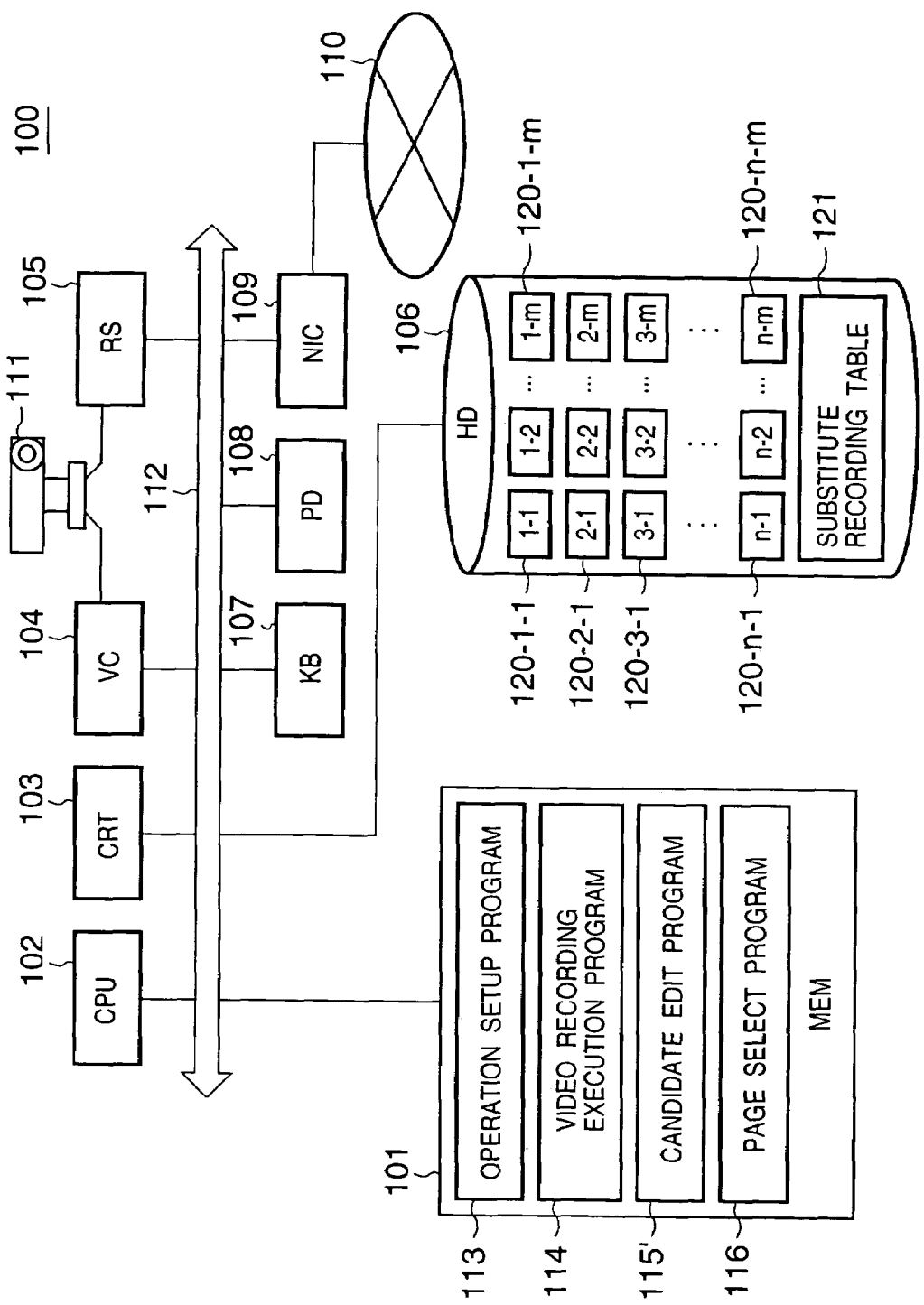
FIG. 10 is a block diagram showing the arrangement of a camera server according to the second embodiment of the present invention.

The system arrangement can be achieved by replacing the candidate edit program 115 in the camera server block diagram shown in FIG. 1 by a candidate edit program 115' in FIG. 10.

A substitute recording table 121 is added to the contents of the HD 106 in the camera server block diagram in FIG. 1 of the first embodiment, as shown in FIG. 10.

The operation of the second embodiment will be described in detail below.

The operations of the operation setup program 113, video recording execution program 114, and page select program 116 are the same as those in the first embodiment.

Figure 11:
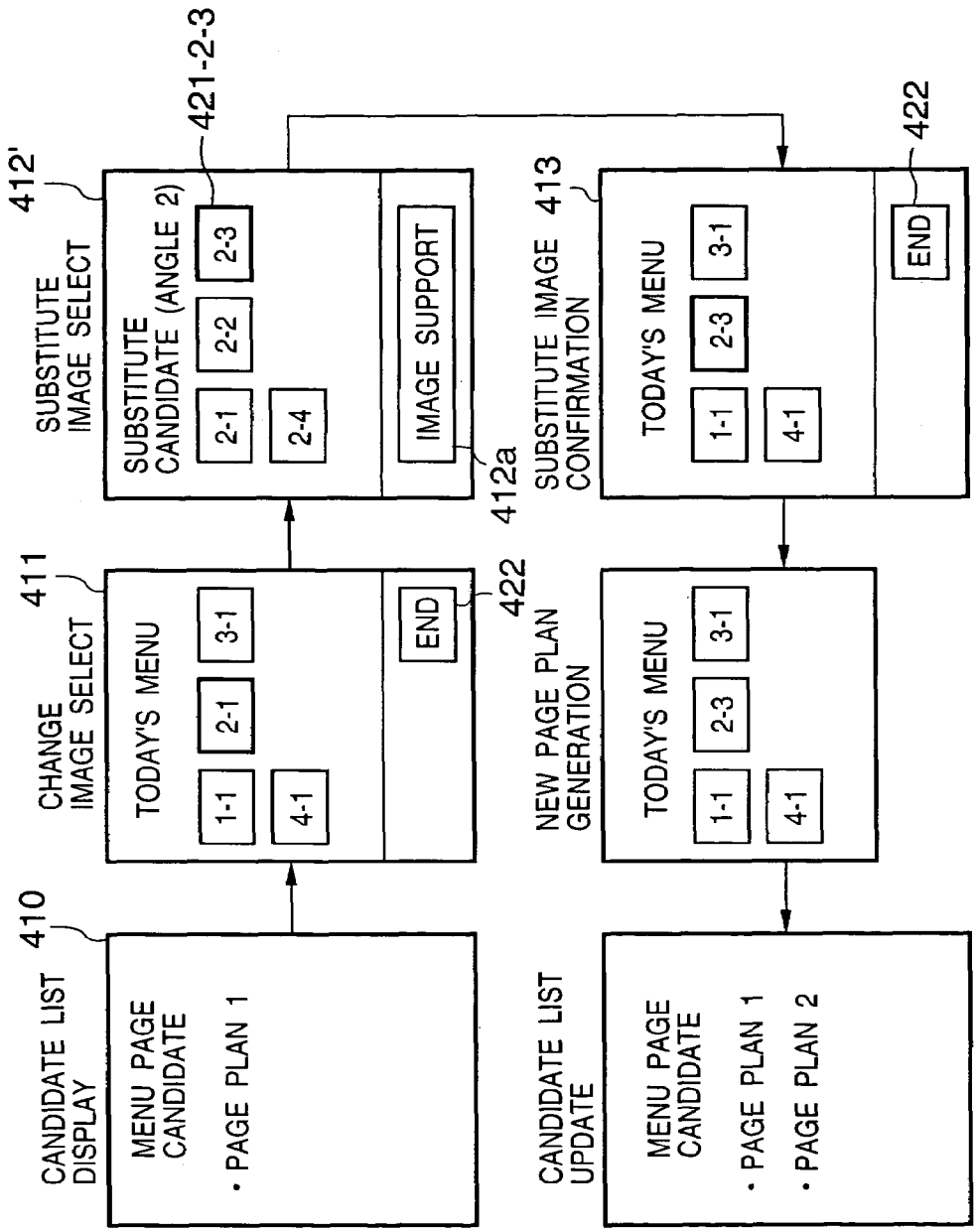
FIG. 11 is a chart showing the flow of image edit processes in the second embodiment.

FIG. 11 shows an example of the flow of image edit processes. In FIG. 11, reference numeral 412a denotes a button used to support (approve) the selected image (image 2-3 in FIG. 11) as it is. When an image is selected, the selected image is displayed so that its frame is different from those of other non-selected images, thus informing the operator of the selected image. In this case, various display patterns may be used and, for example, the color, width, or the like of the frame may be changed. When the image that has already been supported is selected again, indication on the agree button 412a is switched to "support cancel", and when the button in this state is selected, support can be canceled.

FIG. 13 shows an example of the substitute recording table 121.

Tables are held in correspondence with the first to fourth preset positions of respective image data of each candidate page, and when an image is substituted or is agreed upon, a check mark is recorded in the corresponding field.

Since candidate page 1 is automatically generated by the page select program 115, and images on this page are neither selected nor supported, the fields of all the preset positions are blank.

A table for a new candidate page is added by copying the same information as that of the source candidate page when a given image is substituted or supported for the first time. When an image that has been supported undergoes operation for canceling that support, a check mark in the corresponding field is removed, and that image undergoes the same operation as in an unchecked state.

Figure 8:
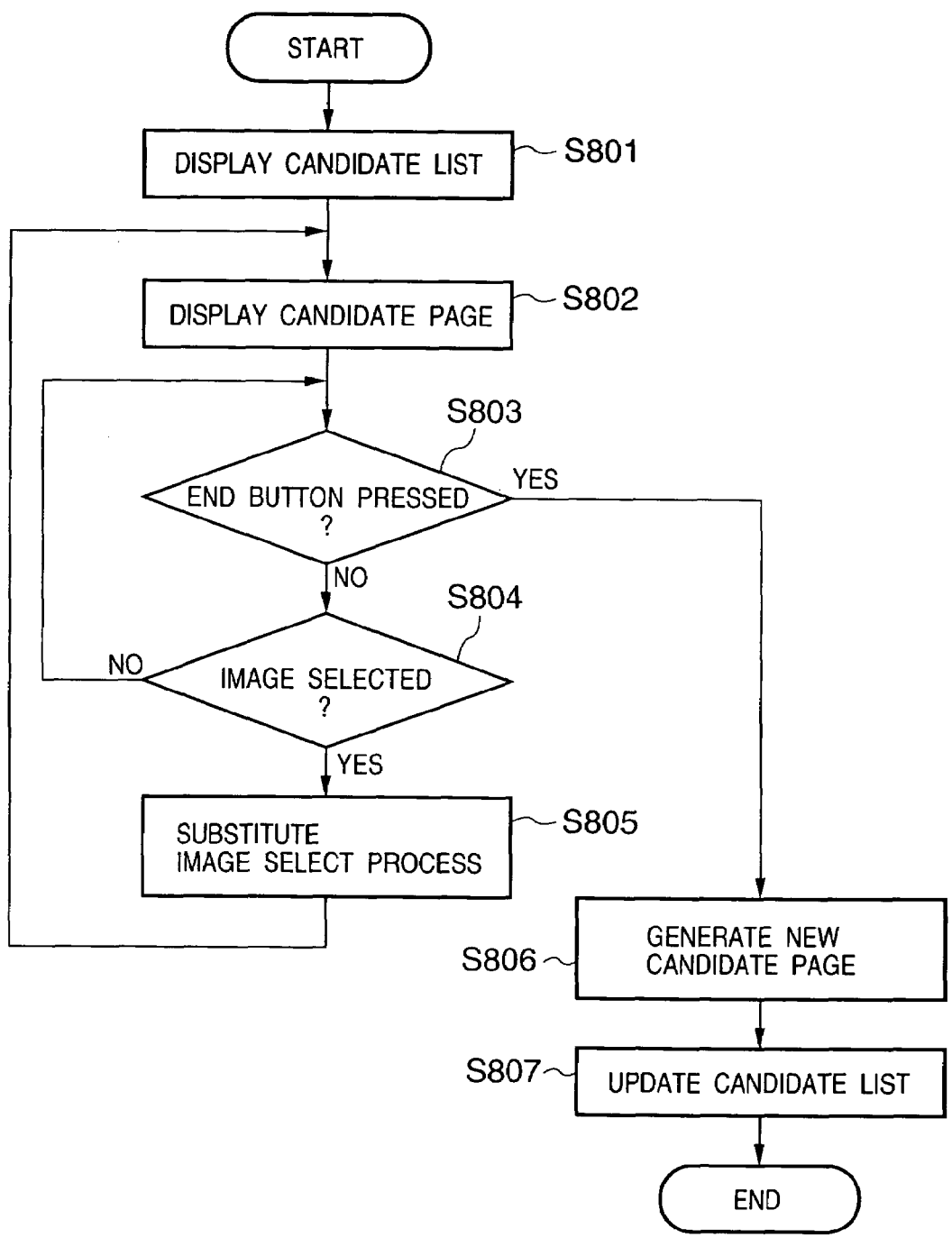
FIG. 8 is a flow chart showing the processing sequence of a candidate edit program in the first embodiment.
Figure 12:
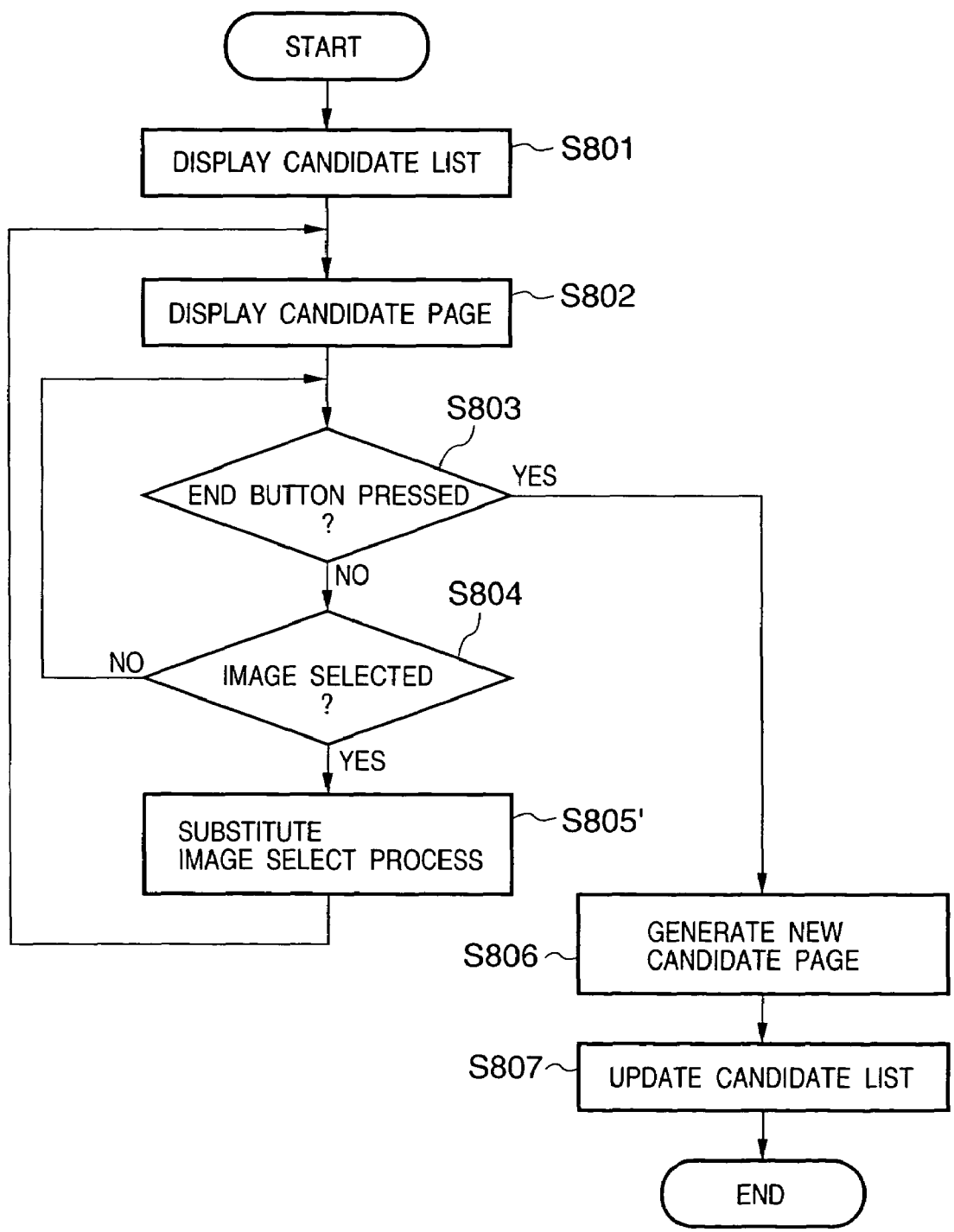
FIG. 12 is a flow chart showing the processing sequence of a candidate edit program in the second embodiment.

The flow of the operation of the candidate edit program 115' is substantially the same as that in the flow chart in FIG. 8 of the first embodiment, except that the process in step S805 is changed to a substitute image select process in step S805', as shown in FIG. 12.

Steps S801, S803, S804, S806, and S807 in FIG. 12 use the same step numbers as those in FIG. 8 of the first embodiment, since they have the same processing contents.

In step S805' after an image is selected in step S804, a substitute image select window 412' added with the image support button 412a is displayed. If the button 412a has been pressed, the selected image is left unchanged; if another image is selected, the selected image is substituted by that image.

In either case, a check mark is recorded in the corresponding field of the substitute recording table 121. The flow returns to step S802 to execute a candidate page display process.

Figure 14:
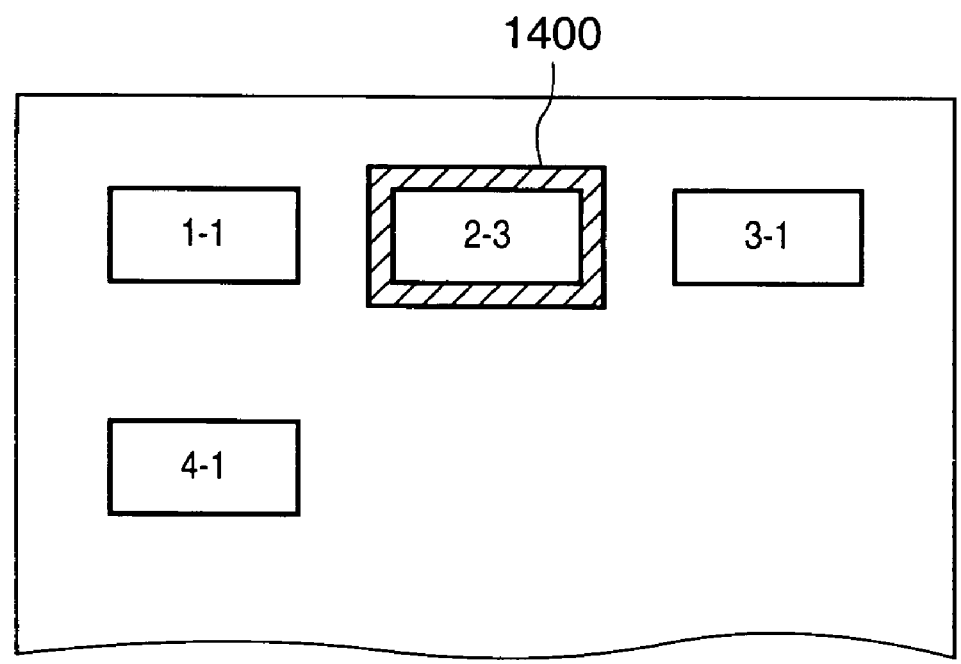
FIG. 14 shows a display example in an image in select process in the second embodiment.

In the candidate page display process in step S802, emphasized display (e.g., the selected or supported image is bounded by a bold frame 1400, as shown in FIG. 14) is made on the change image select window 411 and substitute image confirm window 413 in FIG. 11, a new page plan generation window, or the like. In this manner, the editor can clearly recognize the selected or supported image. Also, the total of the list in FIG. 13 may be computed to display the number of supports together.

In step S801, when the source candidate page is selected from the candidate list for the first time, the page may be displayed using the substitute record of the source page from the substitute recording table 121, and when a new candidate page is created by selecting or supporting a given image, the page may be displayed using a newly created substitute record of the new candidate page.

In this manner, after the source candidate page emphasizes images that have been substituted and supported on its source page (the source of the source candidate page), a new candidate image can be created.

Also, images that have been neither selected nor supported can be consequently emphasized.

As a result, the editor can recognize images that have not been edited, thus improving the edit efficiency of an image page.

As described above, according to the second embodiment, a satisfactory image page can be easily created using edit records of selection and support on image pages created by volunteers.

Especially, since the source candidate page emphasizes images that have been substituted and supported on its source page (the source of the source candidate page), only an image which is not supported can be substituted, and a new, satisfactory candidate page can be created more easily.

Since images that have been selected or supported are emphasized upon editing a candidate page, a new, satisfactory candidate page can be created easily. Furthermore, since images that have been neither selected nor supported are emphasized upon creating a candidate page, the editor can recognize images to be edited, thus improving the edit efficiency of an image page, and allowing easy creation of a new, satisfactory candidate page. Also, since the editor can know images that have not been edited, a new, satisfactory candidate page can be easily created.

Third Embodiment

The second embodiment emphasizes images using substitute information of each image. However, the present invention is not limited to such specific embodiment.

In the third embodiment, if there is an image which has been neither substituted nor supported upon approving a candidate page, the page is approved after that image is substituted by a predetermined image which is prepared in advance.

In this manner, an image that has not been edited is substituted by a preferred image using a predetermined image prepared in advance, thus improving the appearance of the image page.

The third embodiment will be described in detail below.

Figure 15:
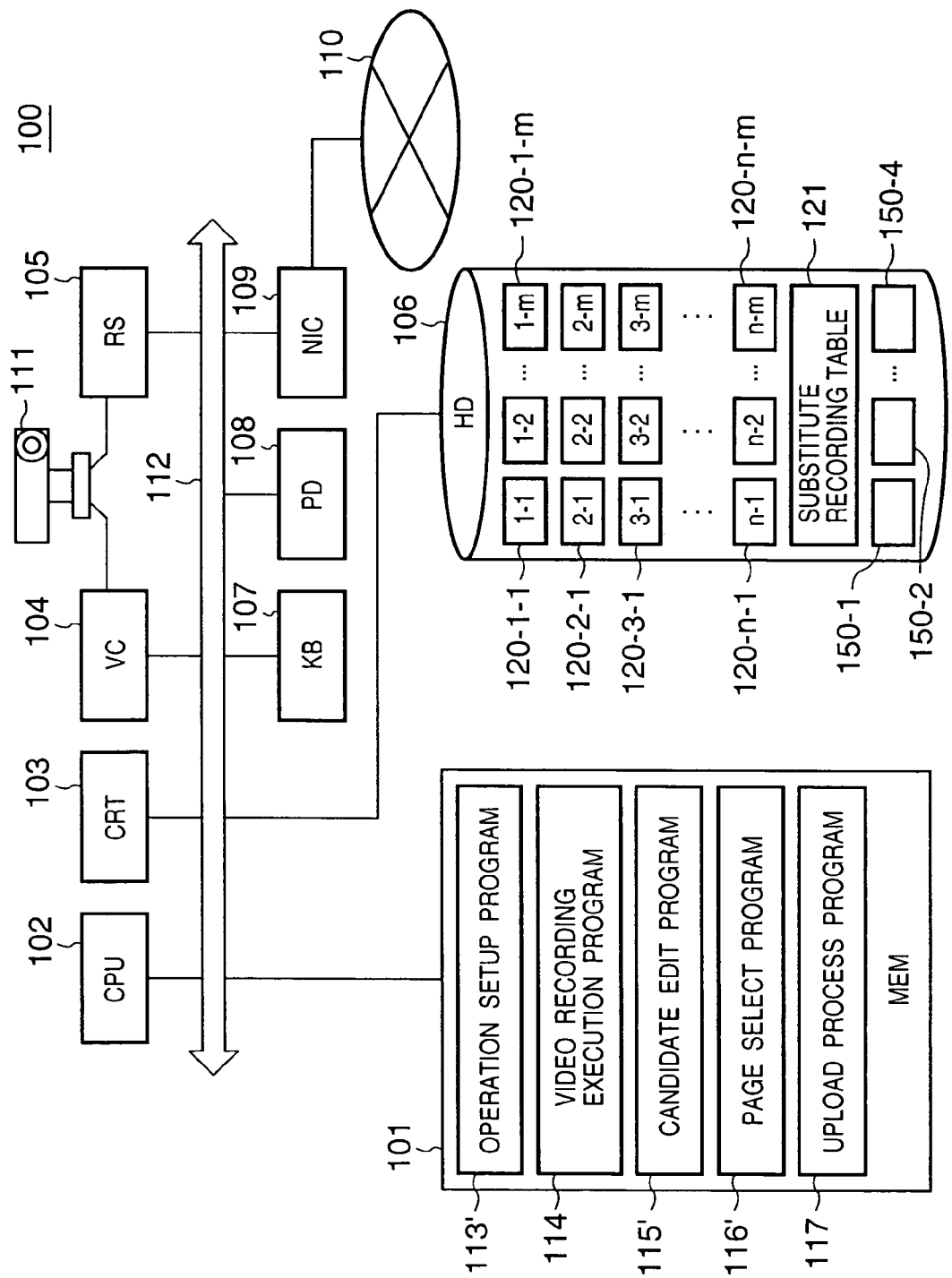
FIG. 15 is a block diagram showing the arrangement of a camera server according to the third embodiment of the present invention.

The system arrangement is substantially the same as that in FIG. 10 of the second embodiment, except that the operation setup program 113 and page select program 116 in FIG. 10 are replaced by an operation setup program 113' and page select program 116', and an upload process program 117 is added, as shown in FIG. 15.

Also, preferred images 150-1, 150-2, . . . , 150-4 are added to the contents of the HD 106 of the second embodiment.

The operation of the third embodiment will be described in detail below.

The operation of the video recording execution program 114 is the same as that in the second embodiment.

The operation of the candidate edit program 115' is the same as that in the second embodiment.

Figure 16:
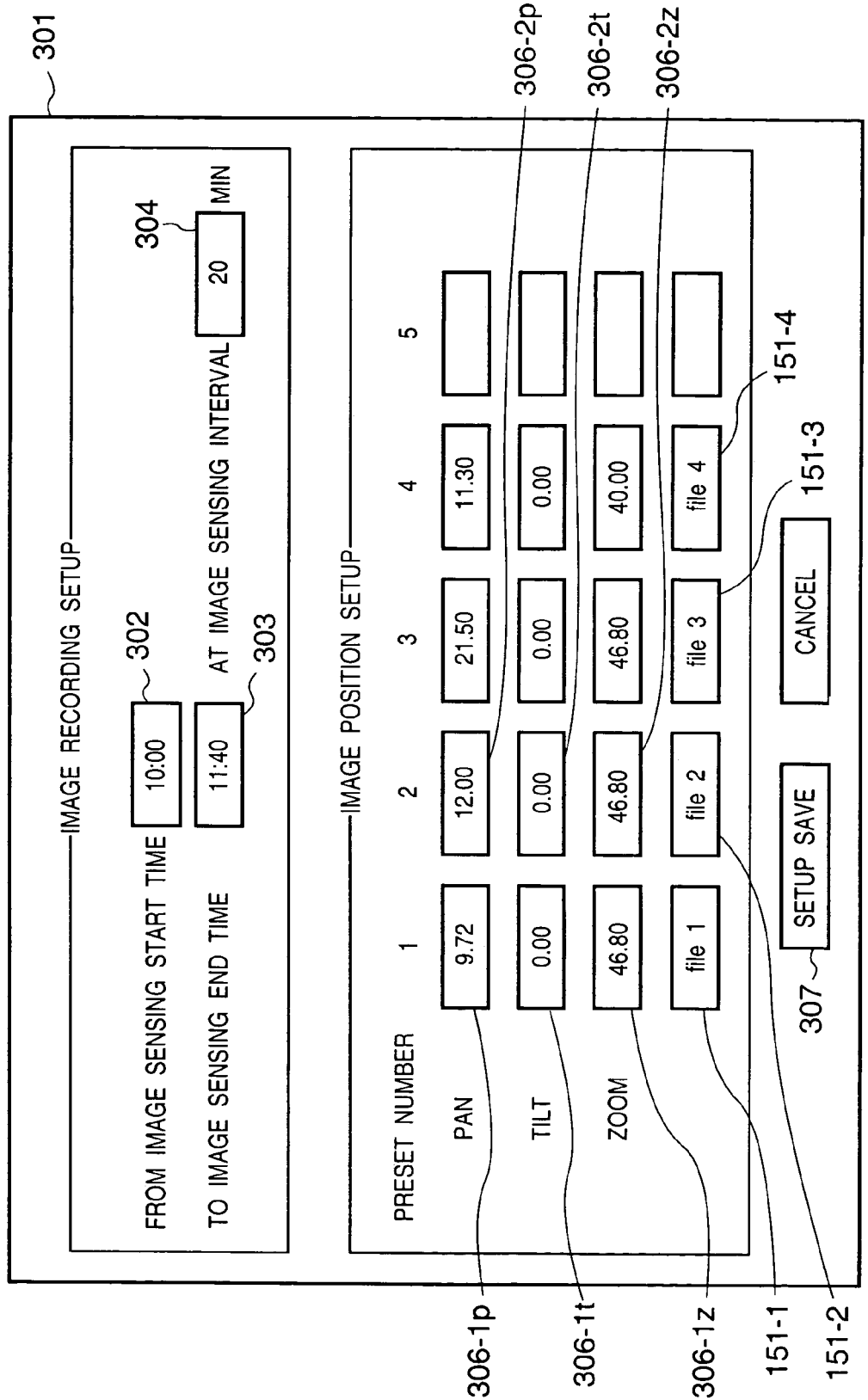
FIG. 16 shows a user interface with which the user sets an image sensing schedule of the camera server in the third embodiment.

FIG. 16 shows an example of operation setups of the operation setup program 113'.

In the operation setups in FIG. 16, predetermined image setup fields 151-1, 151-2, . . . , 151-4 are added to the example of the operation setups shown in FIG. 3 of the first embodiment.

In the predetermined image setup fields 151-1, 151-2, . . . , 151-4, file names or the like that indicate the preferred images 150-1, 150-2, . . . , 150-4 at the respective preset positions are input to save the preferred images in the HD 106.

Figure 6:
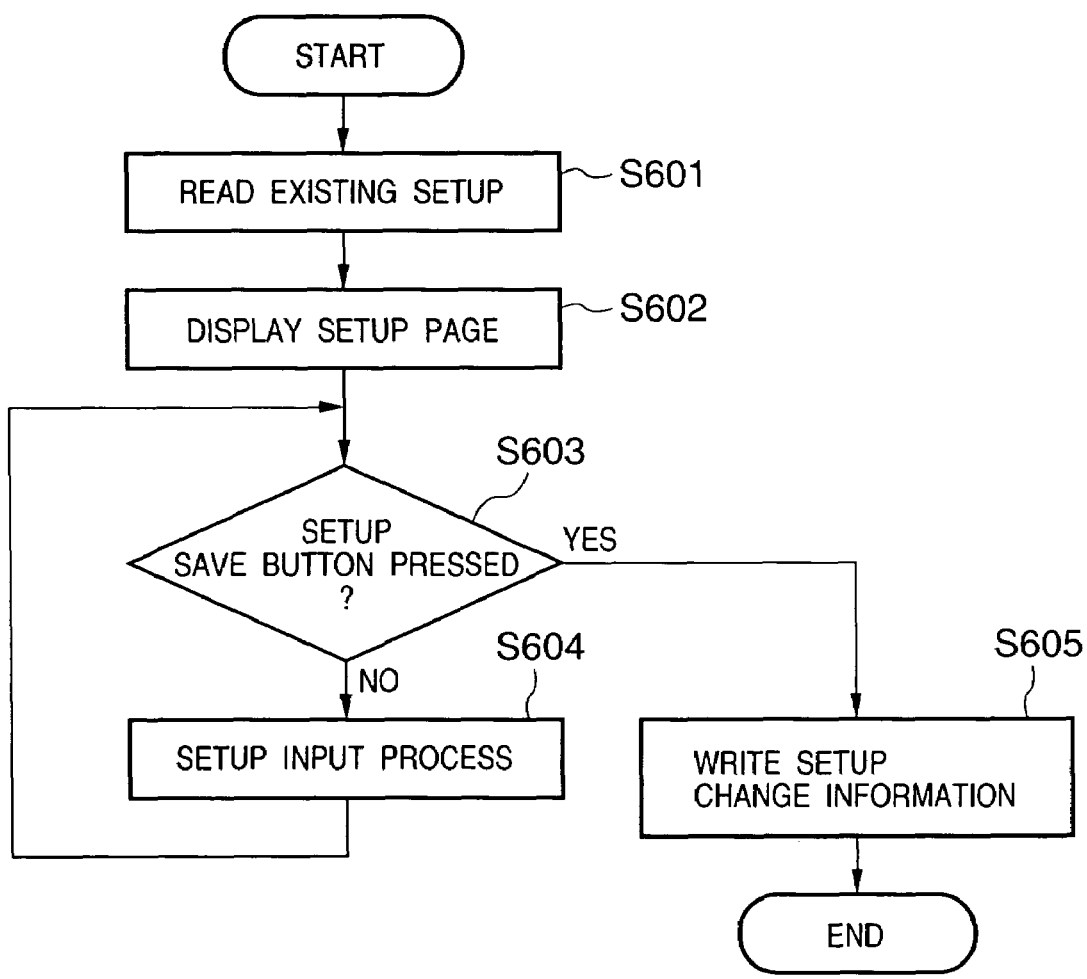
FIG. 6 is a flow chart showing the processing sequence of an operation setup program in the first embodiment.

The flow of the operation of the operation setup program 113' is substantially the same as that of the operation setup program 113 in FIG. 6 of the first embodiment, except that a preferred image setup process is added. For example, when a given predetermined image setup field is selected on the operation setup window in FIG. 3, the window is switched to a preferred image designation window to designate a preferred image.

Also, the operation of the page select program 116' is substantially the same as the example of the operation of the page setup program 116 in FIG. 5 of the first embodiment, except that a preferred image is added. In the flow of the operation of the page select program 116', the contents of the page upload process in step S905 in FIG. 9 of the first embodiment are modified.

Figure 17:
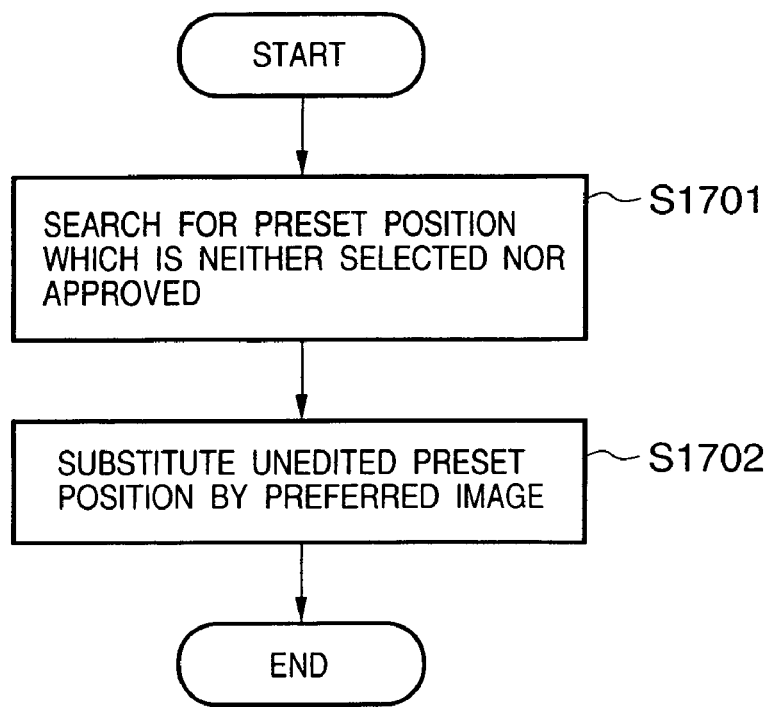
FIG. 17 is a flow chart showing the processing sequence of an upload program in the third embodiment.

The flow of the operation of the upload process program 117 in the third embodiment will be described below using the flow chart in FIG. 17.

Figure 9:
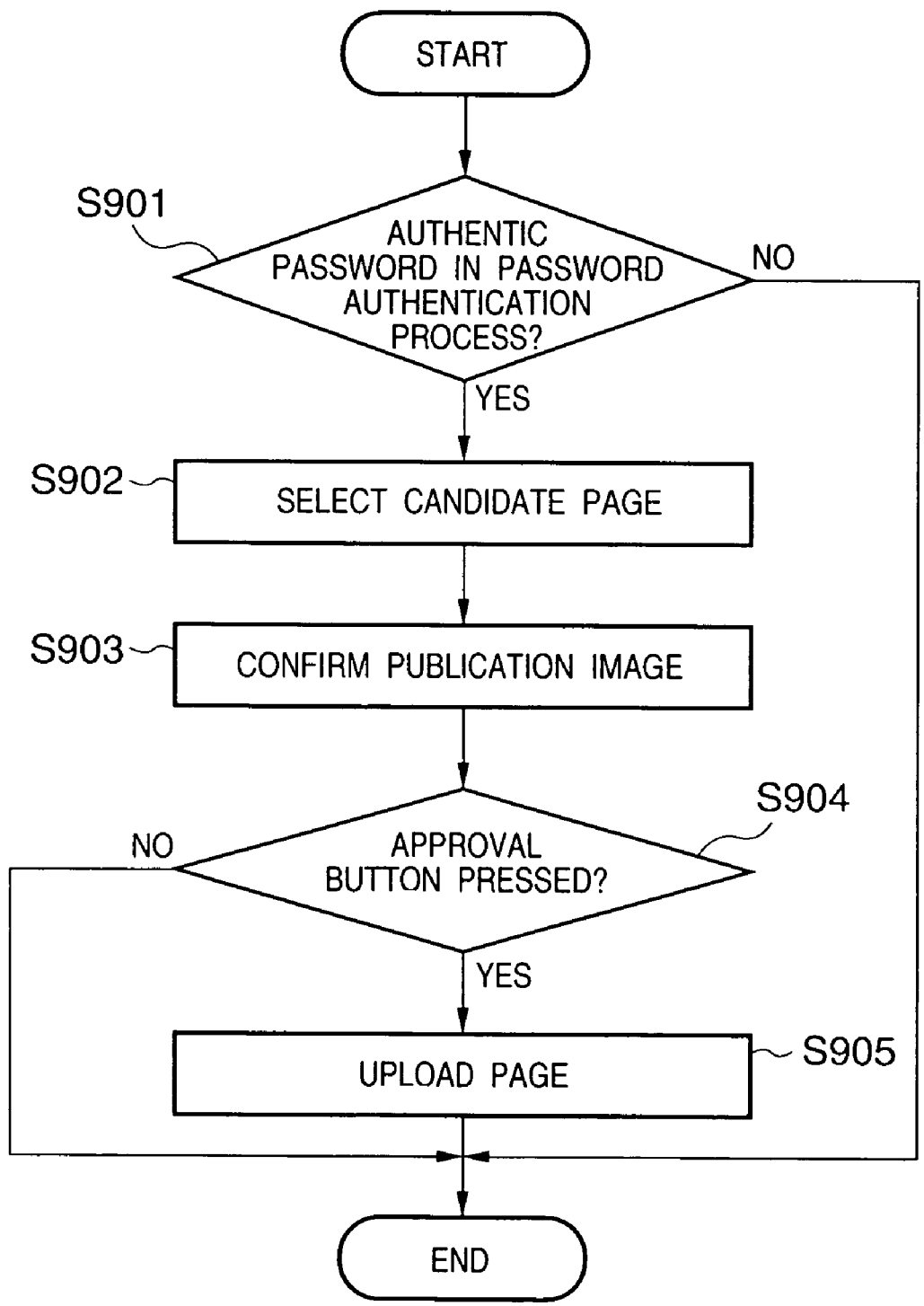
FIG. 9 is a flow chart showing the processing sequence of a page select program in the first embodiment.

As in step S904 in FIG. 9 of the first embodiment, upon depression of the approval button, the upload process program 117 is launched.

In step S1701, the substitute record of the approved candidate page is read from the substitute recording table 121 to search for a preset position which is neither selected nor supported.

In step S1702, an image of the found preset position is substituted by an image of the approved candidate page selected from the preferred images 150-1, 150-2, . . . , 150-4.

In this manner, an image which is neither changed nor supported is substituted by a preset image, and the page is uploaded.

In this case, the preset position, the image of which is neither selected nor supported, may be deleted from the candidate page.

For example, when an image of preset position 4 on the candidate page has been neither selected nor supported, a candidate page formed by only preset positions 1 to 3 is created and approved.

Figure 18:
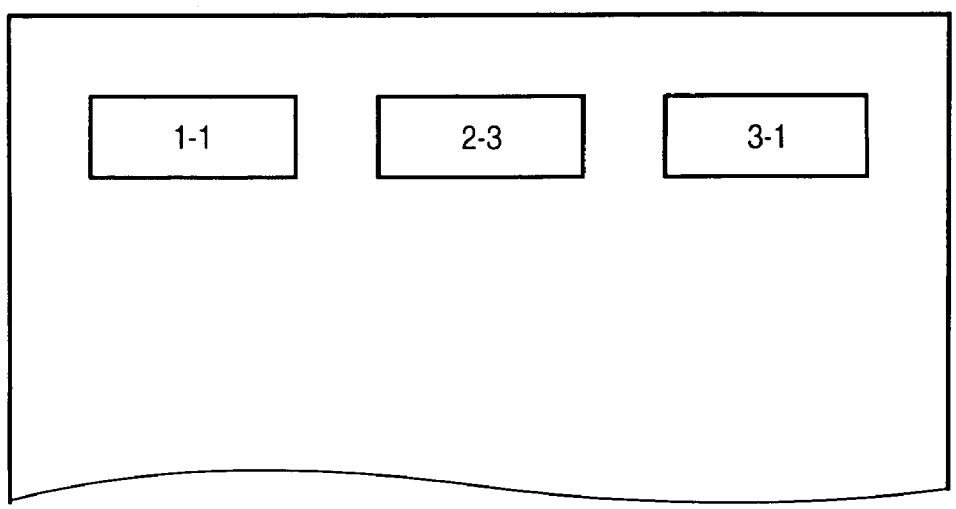
FIG. 18 shows an example of a deleted image list page in the third embodiment.

FIG. 18 shows an example of the image page approved in this case.

In this manner, an image that has not been edited can be automatically substituted by a preferred image, thus improving the appearance of an image page.

Alternatively, by deleting an image which has not been edited, only preferred images can be published, and the appearance of the image page can be improved.

As described above, according to the third embodiment, when a given candidate page is approved and is open to the public, an image that has not been edited can be automatically substituted by a preferred image, thus improving the appearance of the image page.

Alternatively, upon approving and publishing a given candidate page, the appearance of the image page can be improved by deleting an image which has not been edited.

In the above embodiments, the operation setup program, video recording execution program, candidate edit program, page select program, and the like are executed on the camera server 100. Alternatively, if the camera server 100 interprets the commands and sends back a sensed image to an information processing device to which the commands have been sent, that information processing device may execute these programs.

For example, the WWW server 203 may implement operation setup, video recording execution, candidate edit, and page select processes. In this case, if the operation setup program 113, video recording execution program 114, candidate edit program 115, and page select program 116 are described as CGI (Common Gateway Interface) programs, the user can execute these programs via WWW services on the WWW server 203.

With this arrangement, the image page editor or approver need not visit the camera server 100, and can edit sensed data at a remote place via the network.

Alternatively, the video recording execution program may be executed on the camera server, and the operation setup program, candidate edit program, page select program, and the like may be executed on the WWW server 203.

In this case, data set by the operation setup program can be transferred to the camera server 100, which executes video recording on the basis of the transferred data. When the candidate edit program 115 or page select program 116 requires image data, the image data can be transferred from the camera server 100 to undergo the corresponding process.

In this manner, since image sensing and video recording are locally done, image capture failures can be prevented. On the other hand, images may be captured from a plurality of camera servers on the network. As a result, for example, images of display racks at a plurality of positions can be combined to create a menu.

Note that this embodiment is applied to creation of a page of displayed items such as a cafeteria menu. Also, this embodiment can be applied to creation of a page of a pet list of a pet shop in which cages containing animals are stacked, and a creation of a list page of potted plants on a broad floor like a gardening shop. Also, this embodiment can be applied to creation of an image page that collects best shots at respective camera angles by sensing images of street corners, resort facilities, and the like. Also, this embodiment can be applied to creation of camera site-dependent best shot collections if images sensed by a plurality of cameras are used irrespective of their camera angles. That is, the present invention is not limited to any specific objects to be sensed.

In place of selecting images automatically sensed and stored by the camera at respective positions of an image page, the image page may be divided into a plurality of sections, candidate images of the respective sections may be prepared in advance, and a plurality of editors may change images of arbitrary sections as partial images, thus creating an image page in collaboration.

For example, by preparing, as candidate images, product images having variations of chromaticity, lightness, and saturation values, cuts that express different seasons, illustrations that suggest various scenes of sports, hobbies, and the like, and so forth, a product catalog page, facility guide page, and the like can be created in collaboration.

Furthermore, the image itself may be segmented into a plurality of areas, and respective partial images may be substituted or modified. When a facility guide or event guide is expressed by an image like a route sketch, or when products, exhibits, or the like are introduced together with various illustrations, cuts, and the like in a single picture, a guide board, guide map, and the like can be easily created in collaboration by substituting or modifying partial images.

To restate, according to the first embodiment, an image page can be created by selecting only appropriate sensed images in units of positions, and the load of the edit work can be greatly reduced.

By selecting a substitute sensed image for only a position which is required to be changed on the image page automatically created by the system, the image page can be modified. Hence, an image of a given position where the image is not sensed satisfactorily need only be changed, thus further reducing the load of the edit work.

Furthermore, a plurality of volunteers can create some image page candidates, and by only selecting one of a plurality of created image page candidates, the image page can be uploaded to and published on the WWW server, thus further reducing running cost.

In the second embodiment, since the source candidate page emphasizes images that have been substituted and supported on its source page (the source of the source candidate page), a new, satisfactory candidate page can be created more easily.

Also, in the second embodiment, since images that have been selected or supported are emphasized upon editing a candidate page, a new, satisfactory candidate page can be created easily. Furthermore, since images that have been neither selected nor supported are emphasized upon creating a candidate page, the editor can recognize images to be edited, thus improving the edit efficiency of an image page, and allowing easy creation of a new, satisfactory candidate page. Also, since the editor can know images that have not been edited, a new, satisfactory candidate page can be easily created.

According to the third embodiment, when a given candidate page is approved and is open to the public, an image that has not been edited can be automatically substituted by a preferred image, thus improving the appearance of an image page. Alternatively, upon approving and publishing a given candidate page, the appearance of an image page can be improved by deleting an image which has not been edited.

As described above, according to the first to third embodiments, an image to be included in a document which is submitted on the network can be easily updated.

Fourth Embodiment

The fourth embodiment of the present invention will be described below.

The arrangement of a camera server that allows the operation of the fourth embodiment is substantially the same as that shown in FIG. 1. Hence, portions unique to the camera server that constructs the fourth embodiment will be explained below.

Figure 19:
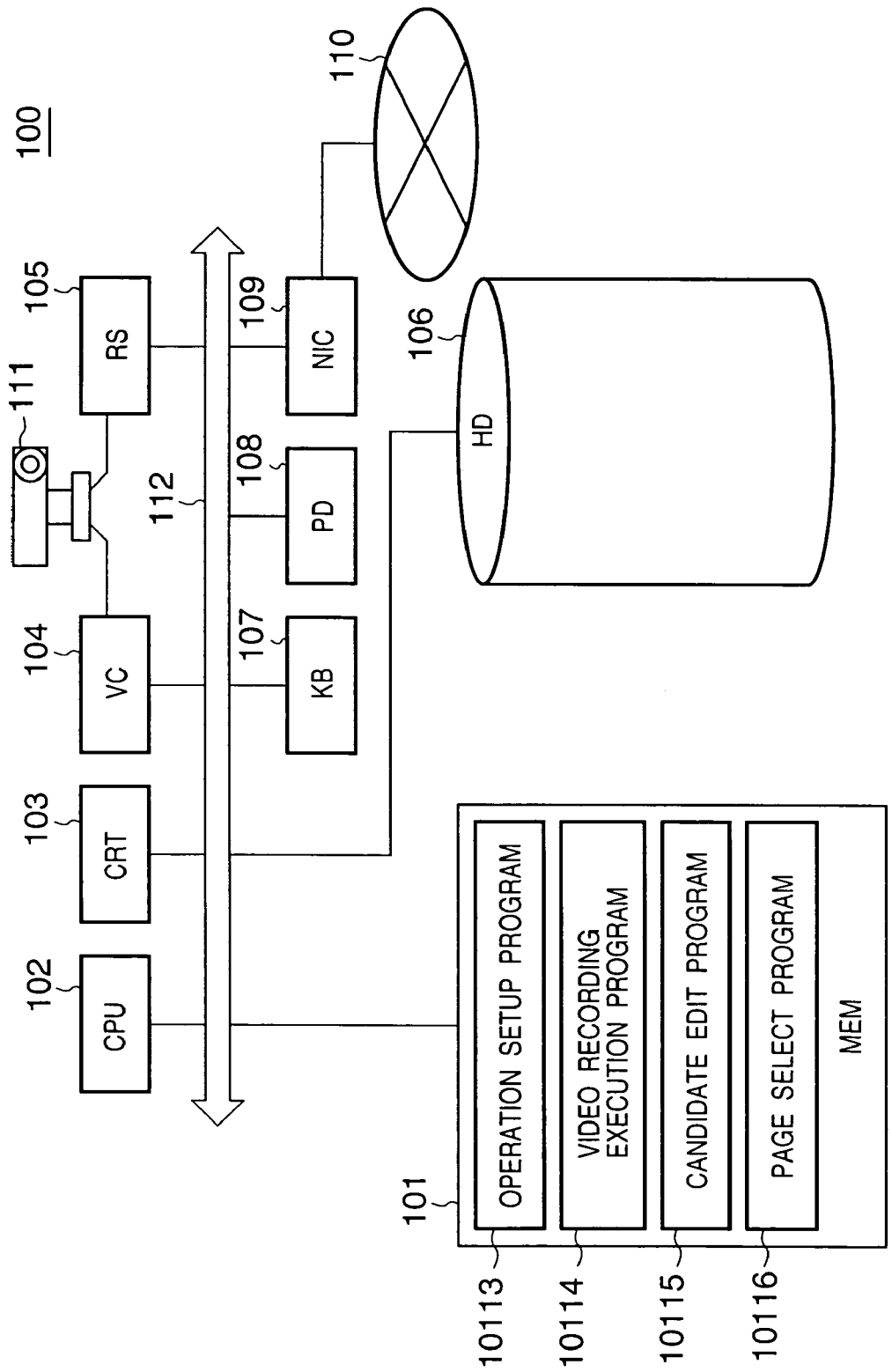
FIG. 19 is a block diagram showing the arrangement of a camera server according to the fourth embodiment of the present invention.

On the memory 101, as shown in FIG. 19, an operation setup program 10113, video recording execution program 10114, and candidate edit program 10115 as characteristic features of the fourth embodiment are stored.

Figure 20:
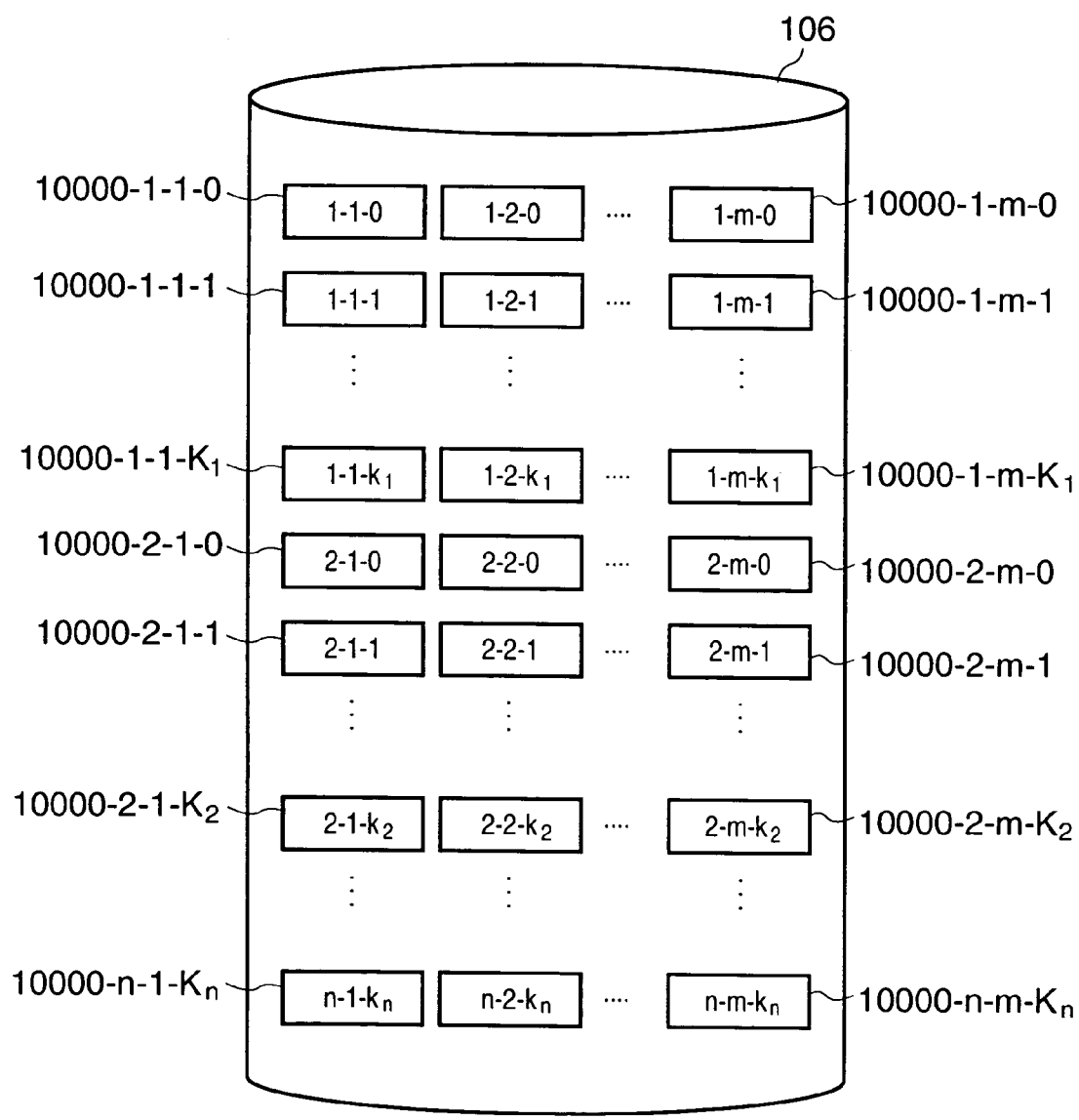
FIG. 20 shows the storage state of image data in an auxiliary storage device in the fourth embodiment.

Also, the auxiliary storage device 106 saves data as a characteristic feature of the fourth embodiment (see FIG. 20 to be described later).

The basic operation of the fourth embodiment with the above arrangement is the same as that of the first embodiment, and an operation unique to the fourth embodiment will be explained below.

The camera server 100 senses and stores videos at predetermined locations at times set in advance by the operator upon executing the operation setup program 10113.

The flow of the operation setup program is substantially the same as that in the first embodiment, and FIG. 3 and the flow chart in FIG. 6 will be explained below while substituting portions unique to the fourth embodiment.

In FIG. 6, the operations from step S601 to step S604 are the same as those in the first embodiment, but the operation in step S605 in the fourth embodiment is as follows.

Pieces of information displayed on the setup page window 301 are written in setup data (not shown) on the auxiliary storage device. Then, displacement camera angle information is generated for each preset position on the basis of camera angle information of the corresponding preset position.

The displacement camera angle information is information of a new camera angle consisting of values obtained by slightly increasing/decreasing the values designated by the operator. For example, when a pan value=9.72 is increased/decreased to have a displacement difference=1 so as to obtain two values each before and after the original value, information having pan values=7.72, 8.72, 10.72, and 11.72 is obtained. Such information is generated for each of the pan, tilt, and zoom values. FIG. 21 shows an example of a list of displacement camera angle information generated from the camera angle information of the first preset position on the window 301.

In the example shown in FIG. 21, two out of the pan, tilt, and zoom values are fixed to generate displacement values, but the present invention is not limited to such specific example. Two values each before and after a given value are generated, but the present invention is not limited to such specific generation range. Alternatively, the operator may input or designate these values. A displacement setup window 10201 shown in FIG. 22 is an example for such process.

After the displacement camera angle information for each preset position is generated, it is written in displacement setup data (not shown) on the auxiliary storage device.

Also, registration is made in the OS to launch the video recording execution program 10114 at each image sensing time.

The operation of the operation setup program 10113 has been explained.

Figure 23:
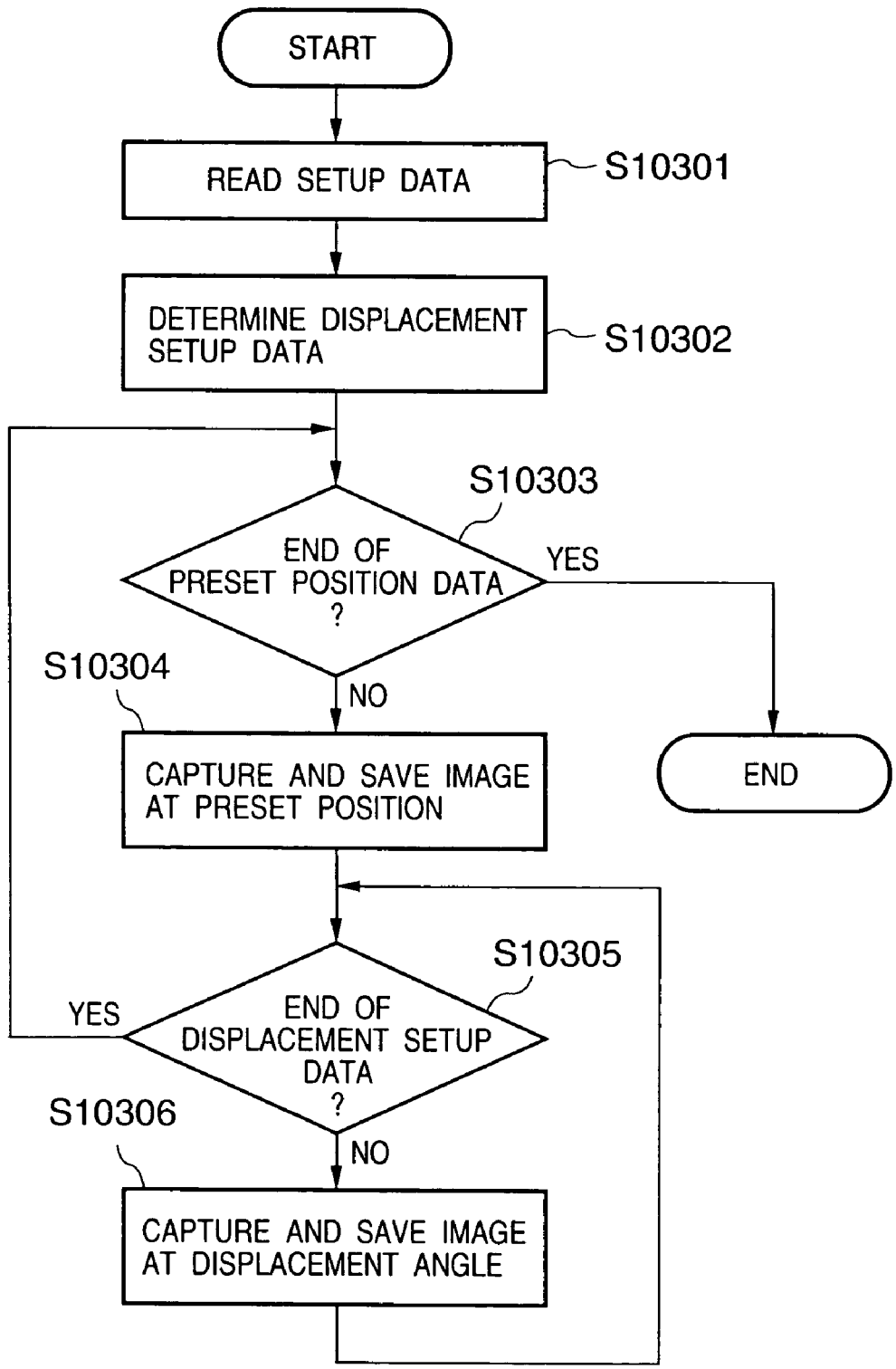
FIG. 23 is a flow chart showing the operation of a video recording execution program in the fourth embodiment.

When the time designated by the operation setup program has been reached, the video recording execution program 10114 is launched to sense and store videos. The operation of the video recording execution program will be explained below using the flow chart in FIG. 23.

The setup data stored in the auxiliary storage device are read (step S10301), and displacement setup data is then determined. The displacement setup data is obtained by reading displacement setup data (not shown) from the auxiliary storage device or is computed from the setup data by uniquely setting a displacement difference (step S10302).

The setup data is extracted in turn from the first one in units of preset positions, and if preset position data does not reach an end, the flow advances to step S10304; otherwise, the program ends (step S10303).

In step S10304, an image is sensed and stored at the camera angle of the extracted preset position. A predetermined command is sent to the camera 111 to control the camera, thus capturing an image.

The captured image is stored by writing data in the auxiliary storage device 106. If an image is captured at the first image sensing time of the second preset position, that image is saved as image data 10000-2-1-0; if an image is captured at the m-th image sensing time, that image is saved as image data 10000-2-$m$-0.

Subsequently, data of the corresponding preset position is extracted from the displacement setup data, and is processed in turn from the first one. If displacement setup data to be processed still remain, the flow advances to step S10306; otherwise, the flow returns to step S10303.

In step S10306, an image is sensed and stored at the displacement camera angle of the extracted preset position. A predetermined command is sent to the camera 111 to control the camera, thus capturing an image.

The captured image is stored by writing data in the auxiliary storage device 106. If an image is captured at the first image sensing time of the third preset position and at the first displacement angle, that image is saved as image data 10000-3-1-1; if an image is captured at the (k3)-th displacement angle, that image is saved as image data 10000-3-1-$k3$. On the other hand, when images are sensed at these angles and at the m-th image sensing time, they are saved as image data 10000-3-$m$-1 and 10000-3-$m$-3$k$. The video recording execution program 10114 has been explained.

The operation of the candidate edit program 10115 in the fourth embodiment will be described below.

Figure 24:
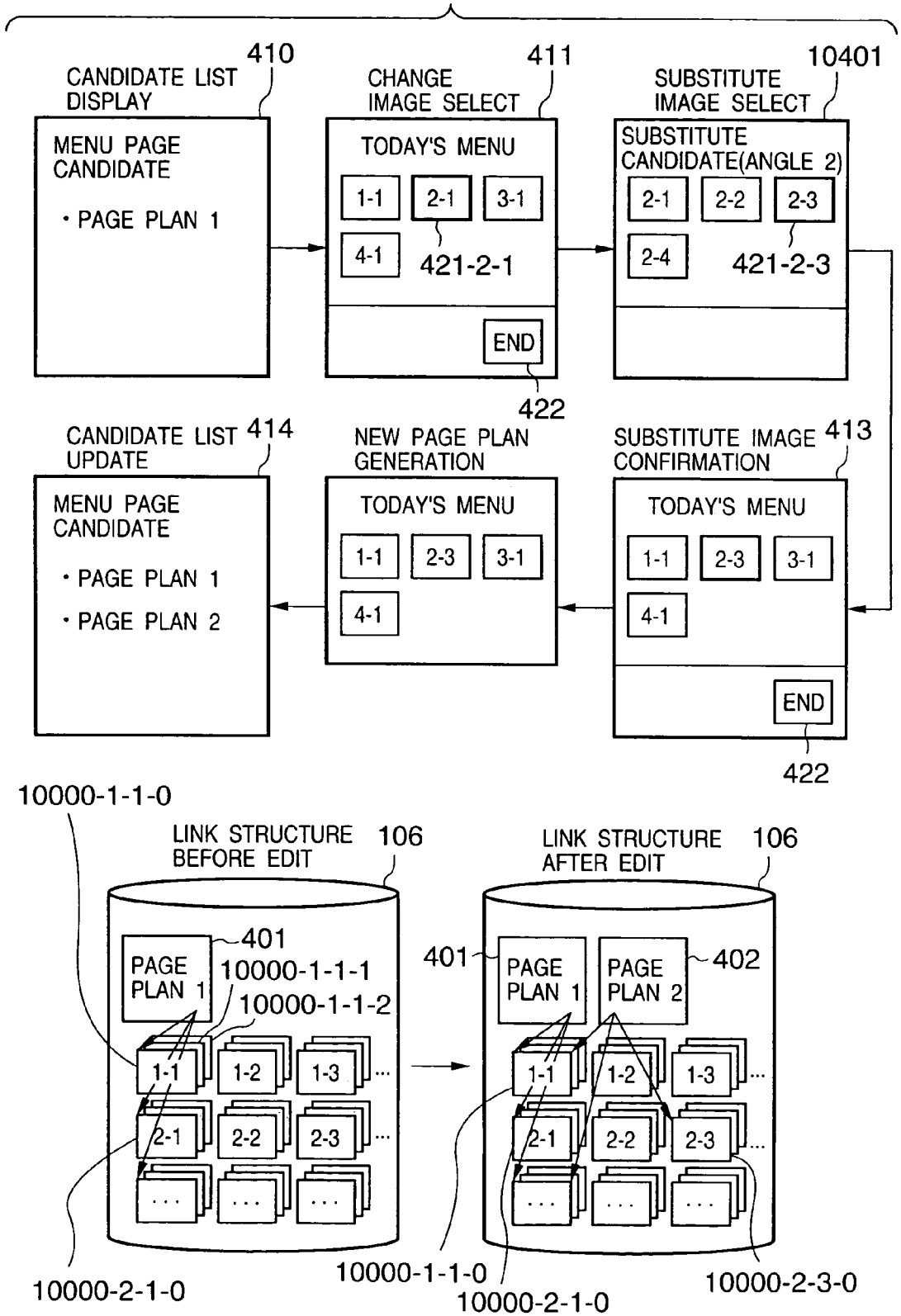
FIG. 24 is a chart showing the flow of image edit processes in the fourth embodiment.
Figure 25:
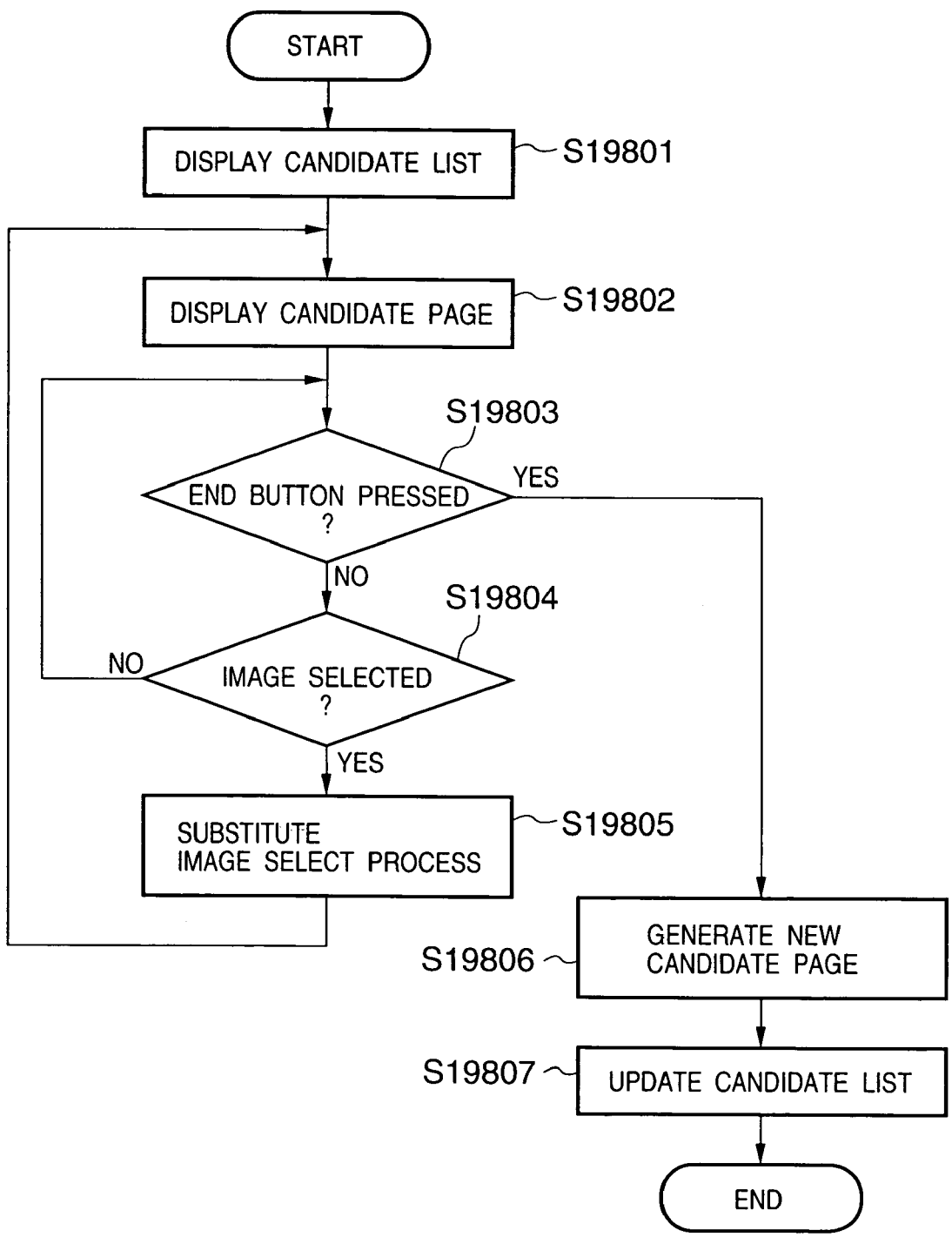
FIG. 25 is a flow chart showing the processing contents of a candidate edit program in the fourth embodiment.

The flow of the candidate edit program is substantially the same as that in the first embodiment, and FIG. 4 and the flow chart in FIG. 8 will be explained below while substituting portions unique to the fourth embodiment. FIGS. 24 and 25 respectively correspond to FIGS. 4 and 8.

This process starts when a page candidate editor launches the page select program 10115.

If no image list page candidate is available, an image list page that displays a list of images at a specific time of the respective preset positions is generated on the basis of image data which have been sensed and stored. A candidate list page window 410 as a list of image list pages, which is used to select the newly generated image list page or to select an object to be edited from existing image list pages, is generated and displayed (step S19801).

If one candidate to be edited is selected, a change image select window 411 that shows the selected image list page as page plan 1 is displayed (step S19802). In this case, the image list page 401 generated by the system is used as page plan 1, and images 10000-1-1-0, 10000-2-1-0, 10000-3-1-0, and 10000-4-1-0 sensed at the first timing of the respective preset position are used.

If an end button has been pressed, the flow advances to step S19806. If one of the displayed images is selected, the flow advances to step S19805.

Figure 26:
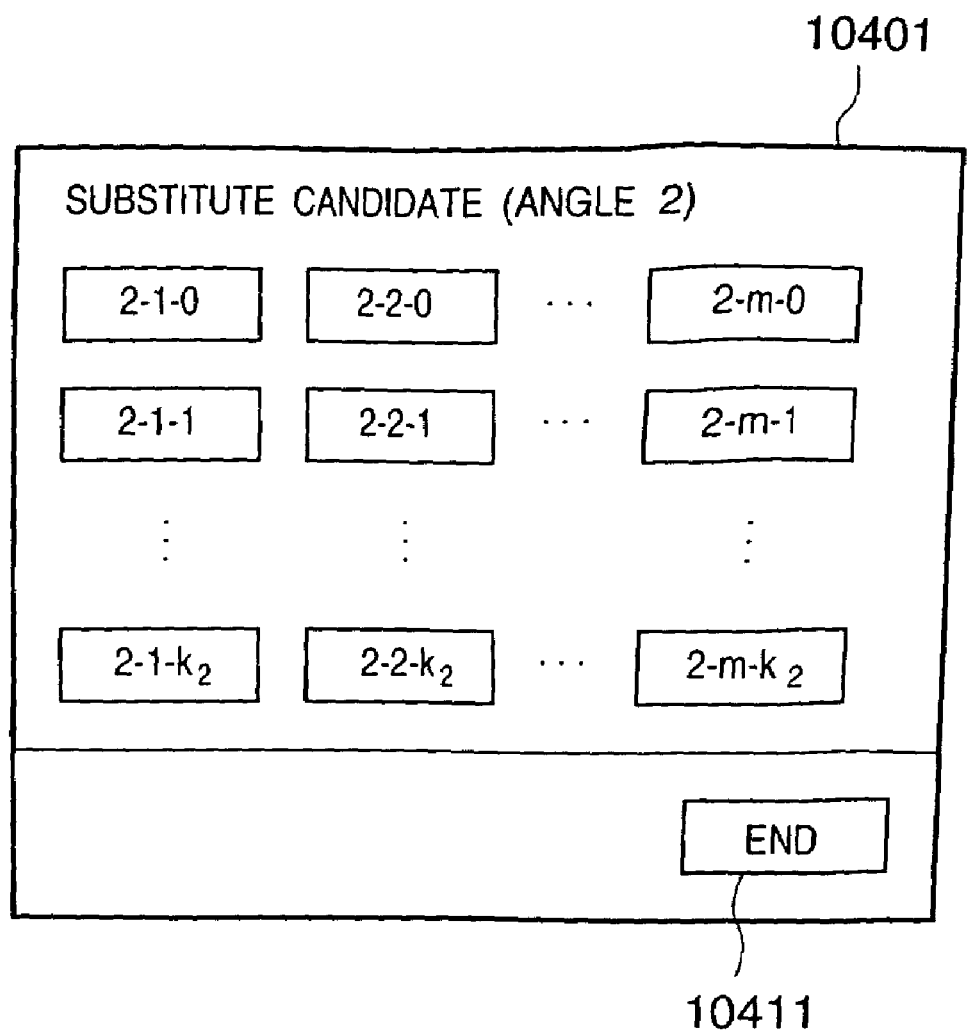
FIG. 26 shows an example of a substitute image select window in the fourth embodiment.

In step S19805, a substitute image select window 10401 (FIG. 26) which displays images at displacement angle positions of the preset position of the selected image, and images obtained at other image sensing times of the corresponding preset position and displacement angle positions as substitute candidates is displayed.

The select window 10401 displays images of all image sensing times and displacement angle positions associated with that preset position. When the page candidate editor selects an optimal image from those images, the change image select window 413 is displayed again (S19802). In this case, the image selected in step S19804 is substituted by the image selected in step S19805.

Upon depression of the end button after the aforementioned substitute process is repeated an arbitrary number of times, the flow advances to step S19806 to generate a new image list page based on the substituted images. In this case, page plan 2 as the second page plan is generated, and its page plan data 402 is saved in the auxiliary storage device 106. Furthermore, the new page plan is added to the candidate list in step S19807.

The operation of the candidate edit program 10115 has been explained. The subsequent operation is the same as that of the page select program 116 of the first embodiment.

According to the fourth embodiment, since images can be sensed not only at camera angles which are set in advance but also at nearby angles and be stored automatically or by some additional setups, even when the object position is not completely fixed, an optimal image can be selected or substituted.

As described above, even when the display position or the dish size varies, if some setups for image sensing within their change ranges are prepared, images that allow these changes can be sensed, and an image page which has an image of the target object falling within the field of view can be easily created.

Fifth Embodiment

In the fifth embodiment, the candidate edit program 10115 in the fourth embodiment is replaced by a program unique to this embodiment. Since other arrangements are the same as those in the fourth embodiment, a detailed description thereof will be omitted.

Figure 27:
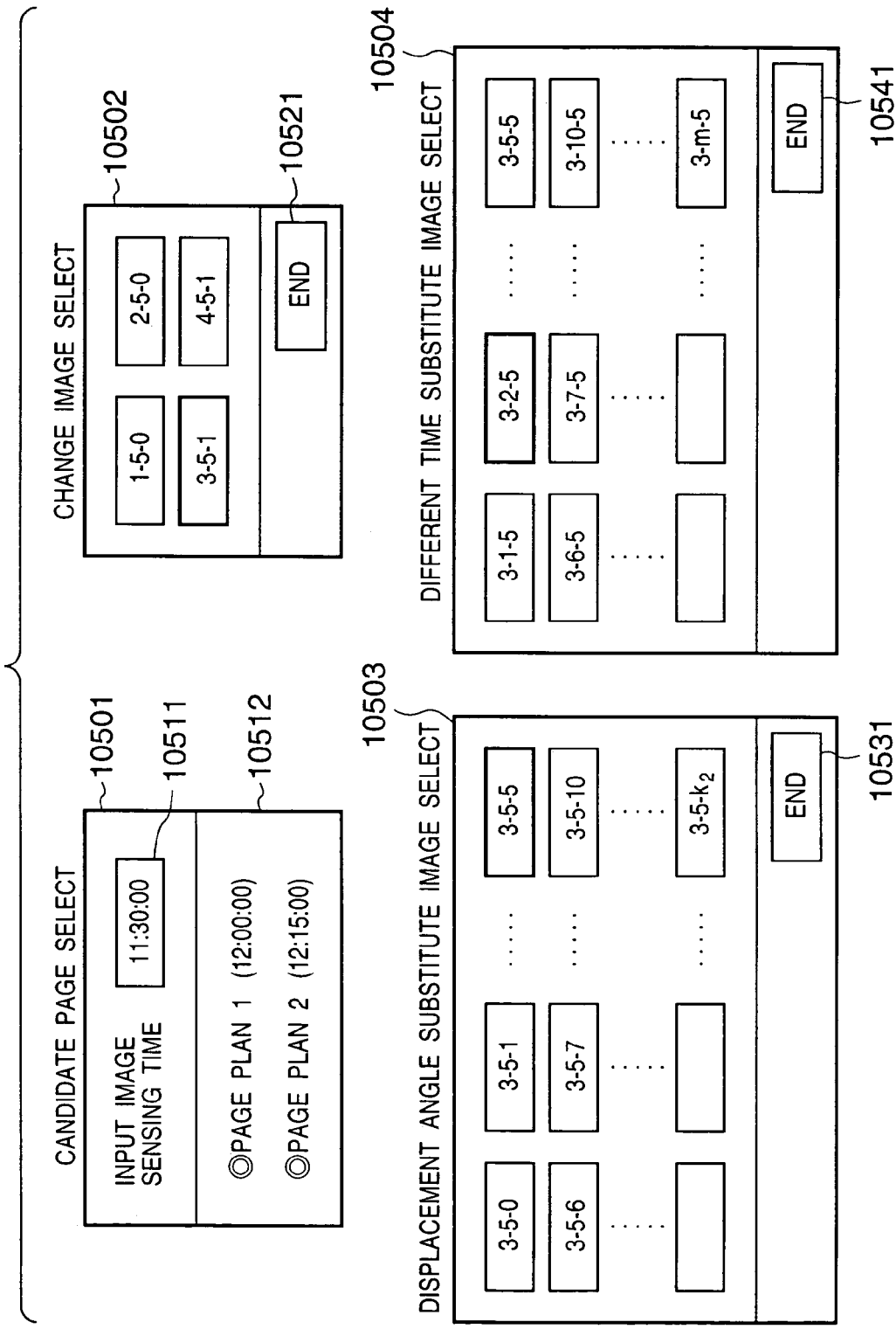
FIG. 27 shows an example of an edit window in the fifth embodiment of the present invention.
Figure 28:
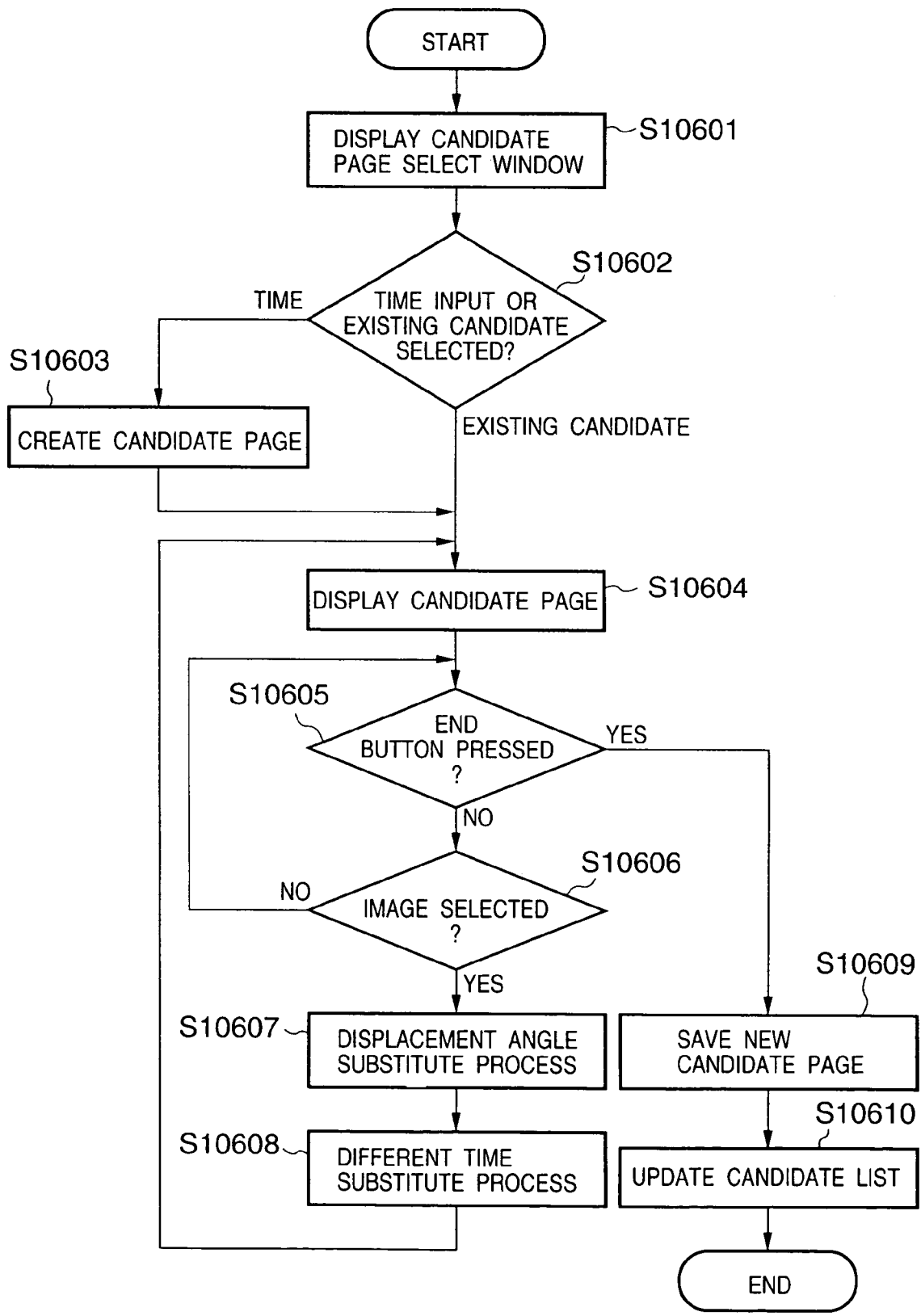
FIG. 28 is a flow chart showing the processing contents of a candidate edit program in the fifth embodiment.

The operation of the candidate edit program will be explained below using FIGS. 27 and 28. The candidate edit program (not shown) as a characteristic feature of the fifth embodiment is stored on the memory 101 like the program 10115 in the fourth embodiment, and is launched by the page candidate editor.

A candidate page select window 10501 is displayed (step S10601). The candidate page select window has an area 10511 for inputting a candidate time, and an area 10512 for selecting a candidate from an existing candidate list. When the candidate edit program is launched for the first time in a series of processes, no existing candidate list is displayed since it is not available yet.

If a candidate page to be edited is input as a candidate time, the flow advances to step S10603; if a candidate page is selected from the existing list, the flow advances to step S10604 (S10602).

In step S10603, image data stored in the auxiliary storage device 106 are searched for preset angle images sensed at the designated time to generate a candidate page to be edited.

In step S10604, a candidate page 10502 which is generated in the previous step or is selected is displayed. If an end button has been pressed, the flow advances to step S10609; if one of the displayed images is selected, the flow advances to step S10607 (steps S10605 and S10606).

In step S10607, a displacement angle substitute image select window 10503 that displays images at displacement angle positions of the image sensing time of the selected image as substitute candidates is displayed. The page candidate editor compares images at the preset positions with those at displacement angle positions, and selects an optimal image. When the editor has pressed an end button 10531, the displacement angle substitute process ends.

Subsequently, a different time substitute image select window 10504 that displays images at other image sensing times at the displacement angle position selected in the immediately preceding step S10607 as substitute candidates is displayed in step S10608. The page candidate editor compares the image at the image sensing time selected in step S10602 with images at other image sensing times, and selects an optimal image. When the editor has pressed an end button 10431, the different time substitute process ends, and the change image select window 10502 is displayed again (S10604). In this case, the image selected in step S10607 is substituted by the image selected in step S10608.

Upon depression of the end button after the aforementioned substitute processes are repeated an arbitrary number of times, the flow advances to step S10609 to generate a new image list page based on the substituted images and store it in the auxiliary storage device 106. Furthermore, the new page plan is added to the candidate list in step S10610, thus ending the operation of the program.

The aforementioned operations of the candidate edit program 18115 from the page editor's view can be summarized as follows.

When the candidate edit program is launched, the page editor selects a candidate edit page. When an existing candidate page created by another page editor or by himself or herself previously is to be edited, the editor selects the page from the existing candidate page list. In order to create a new candidate page, the editor sets an image sensing time on the basis of knowledge about an object to be sensed (in the example of a cafeteria menu, a cafeteria opening time or the like), a time at which a candidate page is satisfactorily obtained and which is obtained from candidate edit experiences so far, and the like, thus creating and displaying the candidate page.

The editor determines an image to be substituted from those of the respective preset angle positions on the candidate page, and selects that image (angle). Then, since a list of displacement images which have pan, tilt, and zoom angles slightly different from those of the selected image is displayed, the editor selects an image of an optimal, and substitutes the selected image by the selected displacement angle image.

Furthermore, a list of images at other image sensing times of that displacement angle is displayed. The editor similarly selects an image at an optimal time, and substitutes the selected image with the image of the selected image sensing time. In this manner, the image substitute process for one preset angle is complete.

If other present angle images are required to be substituted, the editor repeats the aforementioned process. Upon completion of all substitutions, the editor presses the end button on the change image select window, thus ending the candidate page edit process.

According to the fifth embodiment, upon substituting each preset position image, a different image sensing time image can be selected after a displacement angle position image is selected, and when many displacement angle position images and different image sensing time images are available, a substitute image can be easily selected.

In the description of the fifth embodiment, after the displacement angle substitute process is done, the different time substitute process is done. Alternatively, this processing order may be replaced, i.e., a displacement angle image may be selected after a different time image is selected.

For example, in the example of the cafeteria menu, it is nonsense to determine the displacement angle using an image before a sample is set. In such case, it is better to select an optimal image after a sample is set from a list of different time images, and to determine the displacement angle in correspondence with the position where the sample is set.

Even when an object to be sensed is an animal as in an example of a pet shop or the like, and is moving, an image is selected first using the time, and is preferably finely adjusted using displacement angles.

By contrast, in case of a preset angle with a large zoom ratio, the object may often fall outside the image sensing range when the pan or title value deviates even slightly. In such case, it is preferable that the displacement angle substitute process be done first like in the description of this embodiment.

Sixth Embodiment

In the sixth embodiment, the video recording execution program and candidate edit program in the fifth embodiment are replaced by ones unique to the sixth embodiment. Since other arrangements are the same as those in the fifth embodiment, a detailed description thereof will be omitted.

Figure 29:
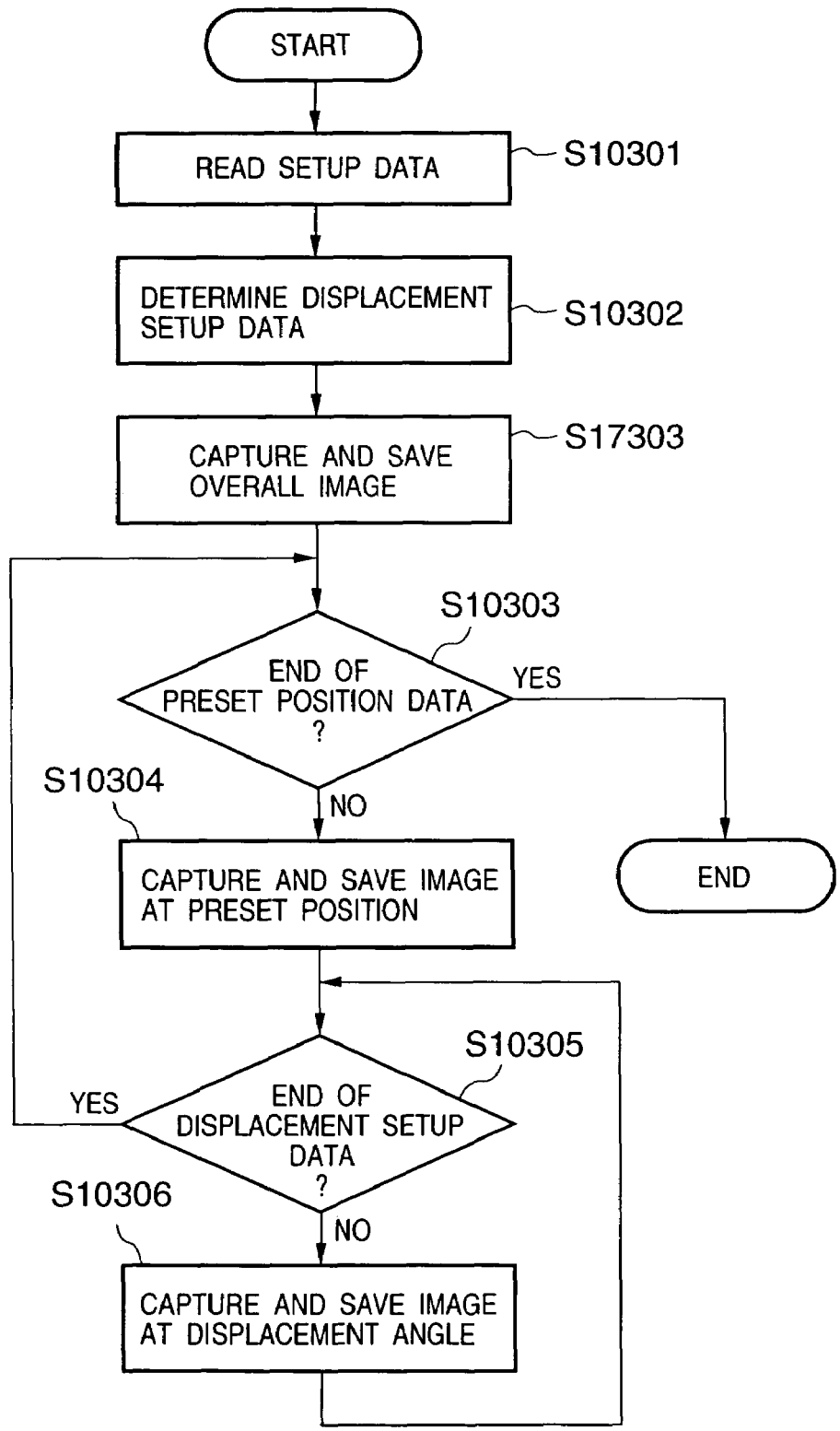
FIG. 29 is a flow chart showing the operation of a video recording execution program in the fifth embodiment.

The operations of the video recording execution program and candidate edit program as characteristic features of the sixth embodiment will be described below with reference to FIG. 29.

The video recording execution program resides on the memory 101, and is called by the OS at the time designated by the operation setup program. The basic operation is the same as that of the video recording execution program in FIG. 23, but step S17303 as an overall image capture/save process unique to this embodiment is inserted between steps S10302 and S10303.

In step S17303, a camera angle at which the respective preset positions can be sensed simultaneously is computed from the setup data read in step S10301, and a predetermined command for capturing an image at that angle is sent to the camera 111 to control the camera, thus capturing an image. The captured image is stored by writing its data in the auxiliary storage device 106. Note that the respective positions cannot be simultaneously sensed depending on preset positions and the angle performance of the camera. In such case, partial images may be sensed in a plurality of image sensing processes, and may be composited to obtain the overall image to be stored. Since the subsequent processes are the same as in FIG. 23, a description thereof will be omitted.

Figure 30:
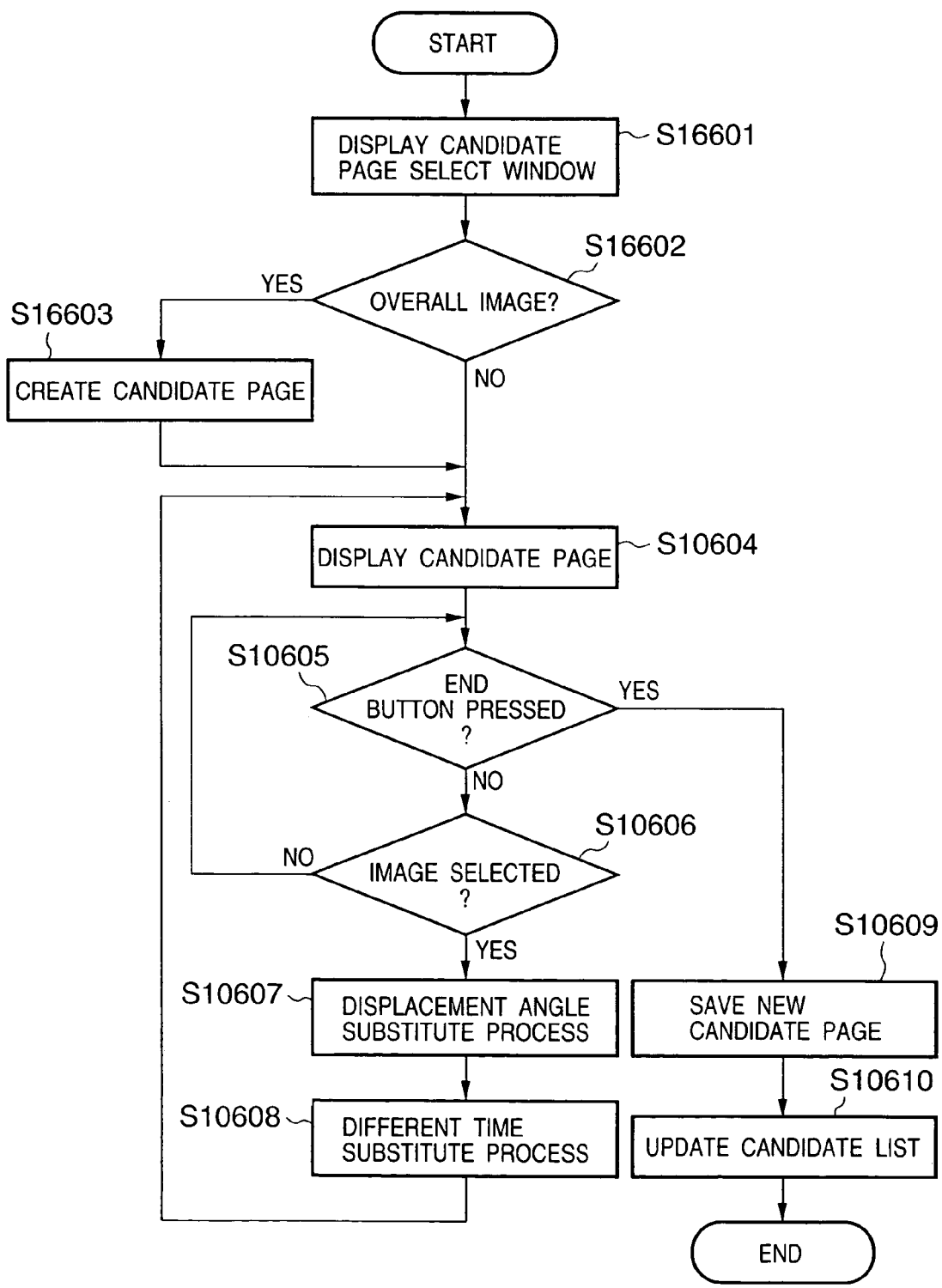
FIG. 30 is a flow chart showing the processing contents of a candidate edit program in the fifth embodiment.
Figure 31:
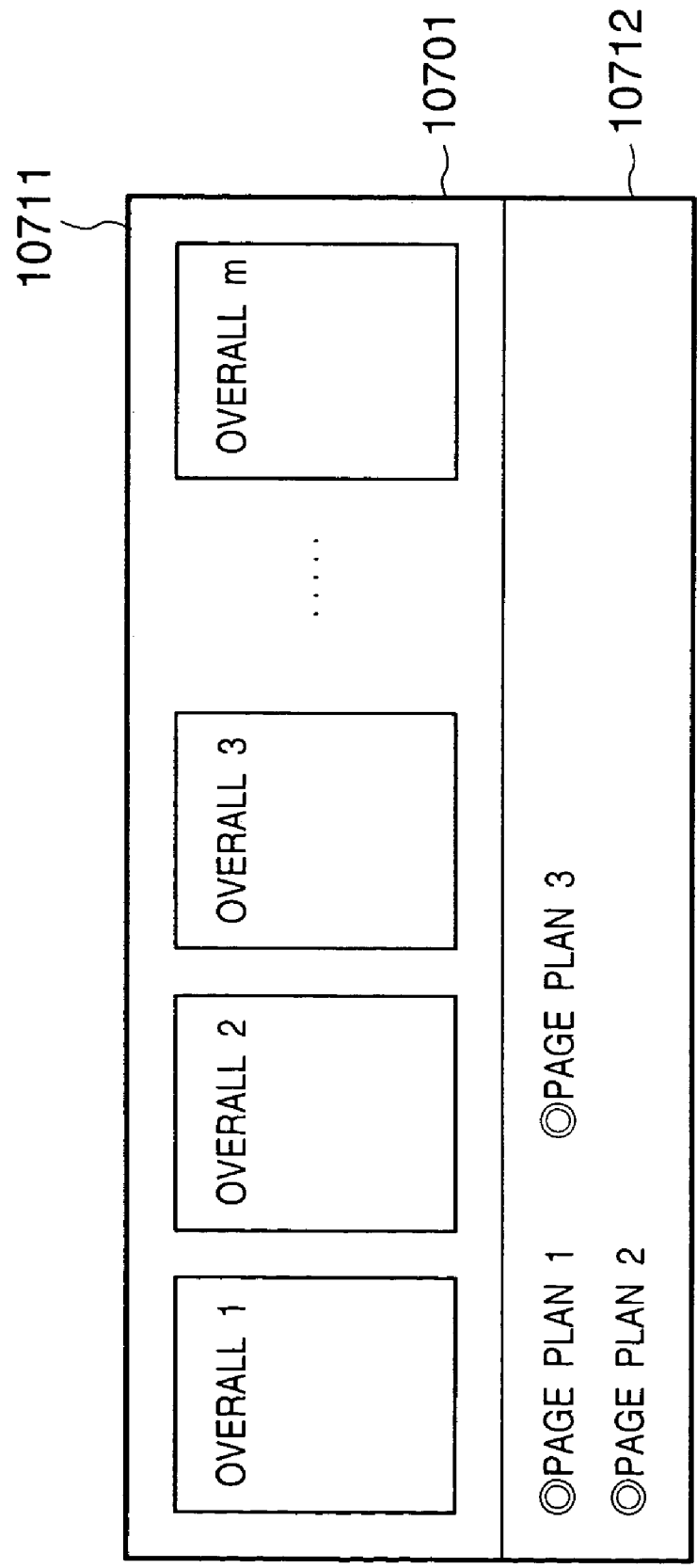
FIG. 31 shows an example of an edit window in the fifth embodiment.

The operation of the candidate edit program as a characteristic feature of the sixth embodiment will be explained below with reference to FIGS. 30 and 31.

The candidate edit program resides on the memory 101, and is launched by the page candidate editor. The basic operation is the same as that in FIG. 28 mentioned above, but steps S10601, S10602, and S10603 in FIG. 28 are respectively replaced by candidate page select window display process step S16601, candidate page display select/input process step S16602, and candidate page creation step S16603 unique to the sixth embodiment.

A candidate page select window 10701 is displayed (step S16601). The candidate page select window 10701 has an area 10711 for displaying/selecting the overall image, and an area 10712 for selecting a candidate from an existing candidate list. When the candidate edit program is launched for the first time in a series of processes, no existing candidate list is displayed since it is not available yet. The overall image area 10711 time-serially displays the overall images sensed and stored in step S17303 by the video recording execution program.

If a candidate page to be edited is selected as the overall image, the flow advances to step S16603; if it is selected from the existing list, the flow advances to step S10604 (S16602).

In step S16603, image data stored in the auxiliary storage device 106 are searched for preset angle images sensed at the image sensing time of the designated overall image, thus creating a candidate page to be edited.

The subsequent operations are the same as those of the candidate edit program of the fifth embodiment.

The operations of the candidate edit program of the sixth embodiment from the page editor's view can be summarized as follows.

When the candidate edit program is launched, the page editor selects a candidate edit page. When an existing candidate page created by another page editor or by himself or herself previously is to be edited, the editor selects the page from the existing candidate page list. In order to create a new candidate page, the editor selects an image which has satisfactorily captured respective preset angles as a whole from the overall images which are displayed time-serially, thus creating and displaying a candidate page.

In the example of a cafeteria menu, when the editor begins to edit by selecting an image in which fewer persons stand in front of a display case from the overall images obtained by sensing the entire display case, operations for substituting-images by those at times without any persons standing in front of the case in units of preset angles can be reduced.

According to this embodiment, a candidate page to be edited can be visually selected while observing the overall image in place of the time, thus allowing quick edit.

Seventh Embodiment

The seventh embodiment will be described below. When the position of the object to be sensed varies, for example, when the number of menu items, the number of dishes, and the like vary day by day in a menu display case of a cafeteria although "shelves" of the display case are fixed in position, the object to be sensed may be set at a position different from the image sensing position which has been predicted and set in advance.

In such case, when some image sensing positions are set like in the first embodiment, the set positions undergo automatic interpolation, and image sensing and video recording are also done at the positions obtained by interpolation to solve the aforementioned problem.

Various interpolation methods are available. For example, a portion between the set image sensing positions is divided into a designated number of positions, and these divided positions can be added to the image sensing positions.

Figure 32:
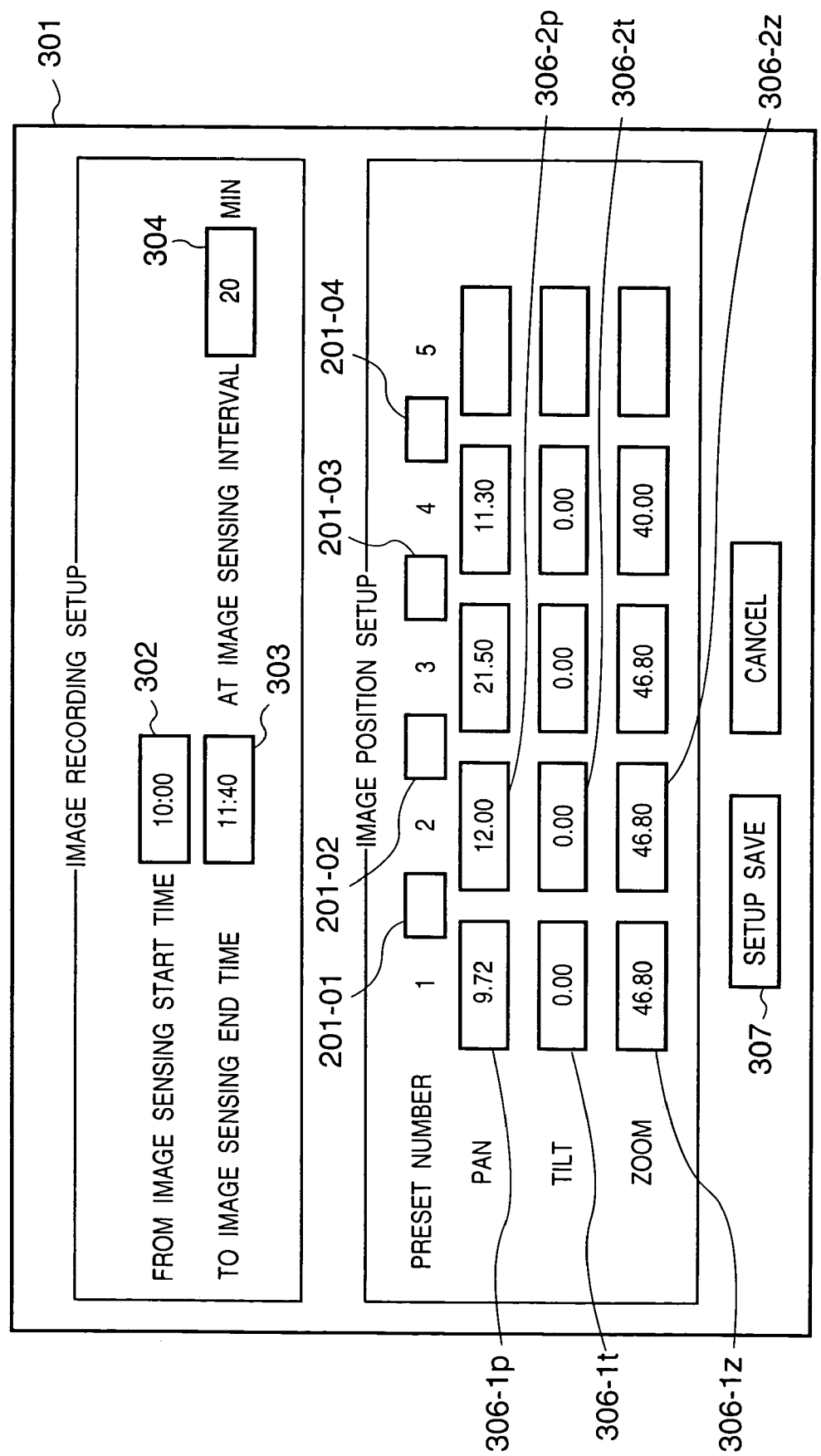
FIG. 32 is a view for explaining the operation setups for setting an image sensing schedule of a camera server in the sixth embodiment.

An example of an interface obtained by modifying the interface used to set a plurality of preset positions upon operation setups in the first embodiment will be explained below. FIG. 32 shows the interface obtained by adding numerical value input fields (201-01 to 201-04) between neighboring preset numbers of the image position setup area in FIG. 3 of the first embodiment. Points obtained by evenly dividing setup values of preset positions on two sides of a given field by a numerical value (positive integer) input to that field are registered as image sensing positions.

In the aforementioned interpolation method, when image sensing positions are set at the two ends of a given shelf, and the portion between these positions is divided into an arbitrary number of positions, images of one shelf can be evenly sensed.

Upon editing a candidate page, a list need not always be created using all images at the interpolated positions. When the change over time in position of the object to be sensed is not so large, a plurality of positions at which images of the object to be sensed can be sensed can be selected at appropriate time intervals to create a source candidate page. In the subsequent edit work, it suffices to substitute images at the respective positions by those sensed at different image sensing times by fixing the selected positions.

Figure 33:
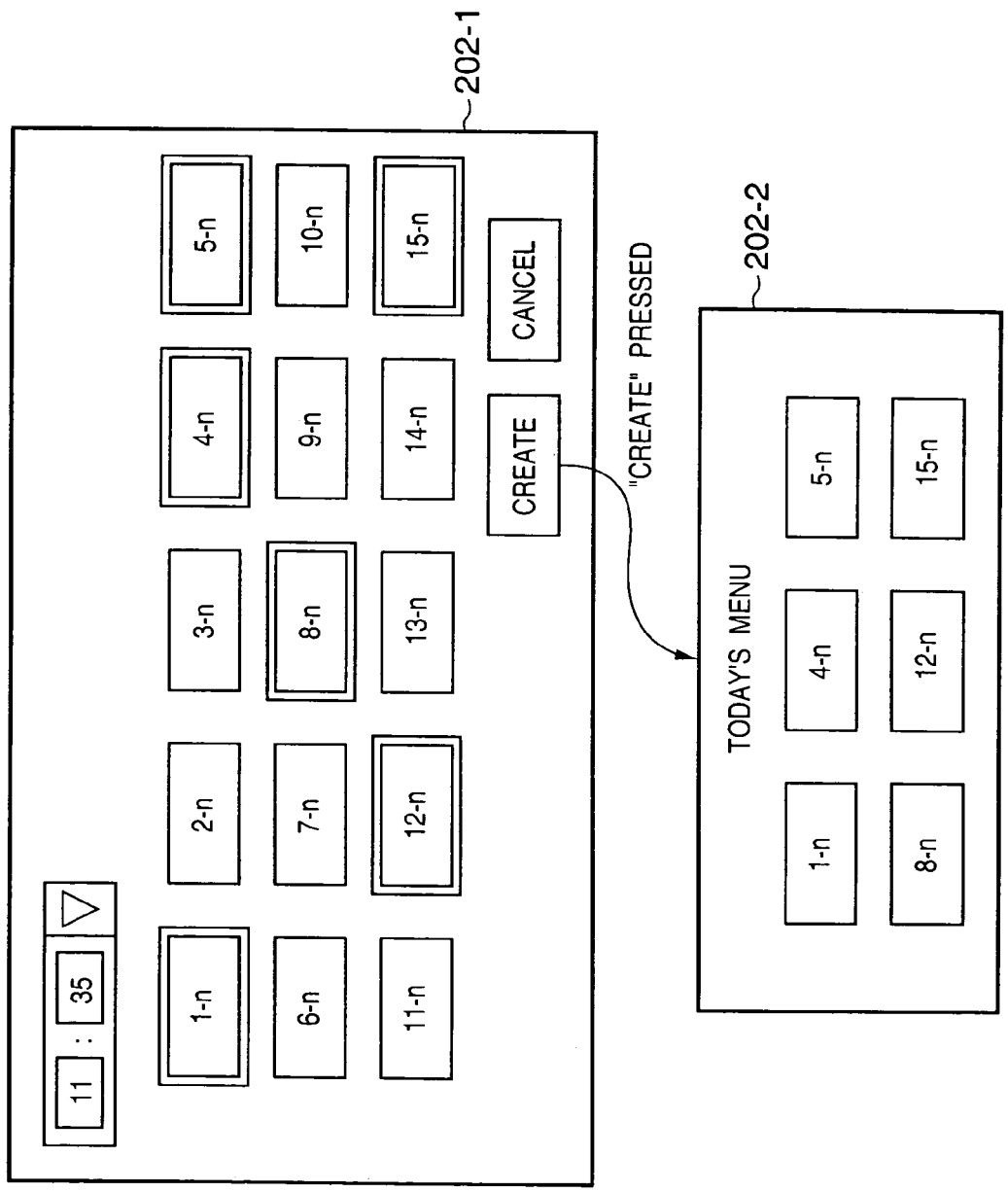
FIG. 33 shows an example of a window upon creating an initial candidate page in the sixth embodiment.
Figure 34:
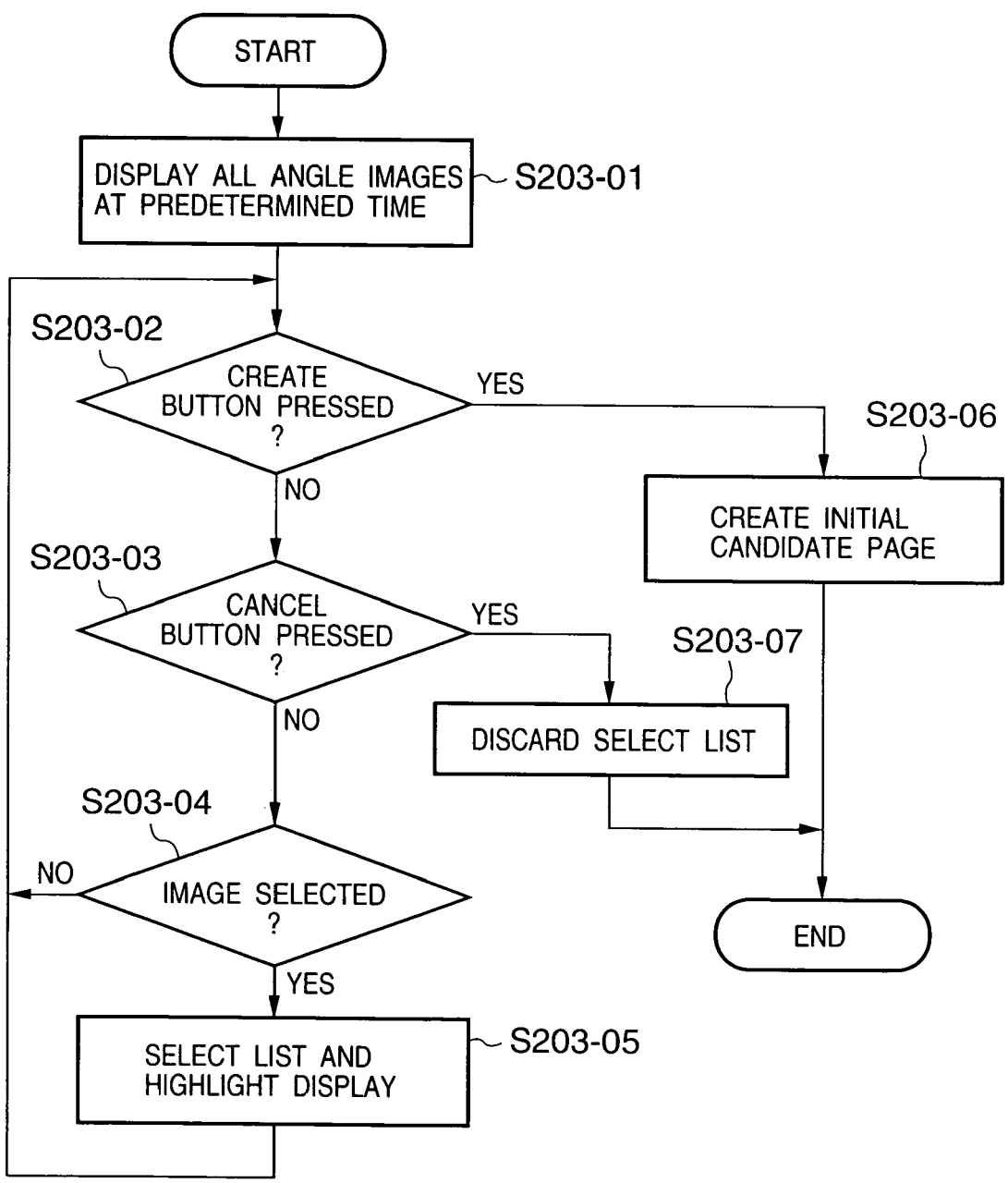
FIG. 34 is a flow chart showing the contents of an initial candidate page creation process in the sixth embodiment.

FIG. 33 and the flow chart in FIG. 34 show this state.

In step S203-1 of the flow chart, all images at all image sensing positions (including the set positions and interpolated positions) at a predetermined time determined (details of the determination process will be omitted) based on an image sensing time list or input are displayed. A window 202-1 in FIG. 33 is an example when images (15 images) at all the image sensing positions at 11:35 are displayed. From these images, a plurality of images including the object to be sensed are selected using the pointing device 108 (step S203-04). The selected images are highlighted, and are registered in a selection list (step S203-05). Note that selection/non-selection is toggled every time the pointing device is operated.

Upon completion of selection of all images at image sensing positions including the desired object to be sensed, the operator selects a "create" button on the window 202-1 in FIG. 33 (step S203-02) to create an initial candidate page (step S203-06), thus ending the process.

When the operator wants to interrupt the process, he or she can select a "cancel" button (step S203-03) to discard the selection list as work data (step S203-07), thus ending the process.

In the example shown in FIG. 33, six image sensing positions are selected from 15 positions, and an initial candidate page 202-02 is generated.

In this embodiment, when a large number of image sensing positions are obtained by interpolation, images displayed for the purpose of selection cannot fall within one window. In such case, the select window 202-1 is divided into a plurality of windows, and a button or pull-down menu for selecting one of these windows can be added.

When the image sensing positions are separately set on a plurality of shelves, this embodiment can be implemented as follows. That is, "0" is input to one of the numerical value input fields 201-01 to 201-04 each indicating the number of divisions in FIG. 32 to indicate the boundary of the shelves.

For example, when "0" is input to the field 201-03 and values other than zero are input to other fields, preset positions 1, 2, and 3 are handled as those on the first shelf, and preset positions 4 and 5 are handled as those on the second shelf. In the flow of the processes in this case, steps S203-01 to S203-05 in the flow chart in FIG. 34 are repeated for each shelf, and upon completion of selection on all the shelves, an initial candidate page is created in step S203-06.

When selection is allowed in units of shelves in this manner, even when the number of menu items is large, each single selection range can be narrowed down, thus allowing easy operation and reducing selection errors.

Eighth Embodiment

In the seventh embodiment, the method of creating an initial candidate page using images at the interpolated image sensing positions has been explained. Upon editing a page candidate of the first embodiment, or after an initial candidate page is created in the seventh embodiment, the configuration (the number and order of images) of that page is often required to be changed. An embodiment that allows such change will be described using FIG. 35 and the flow chart in FIG. 36.

Figure 35:
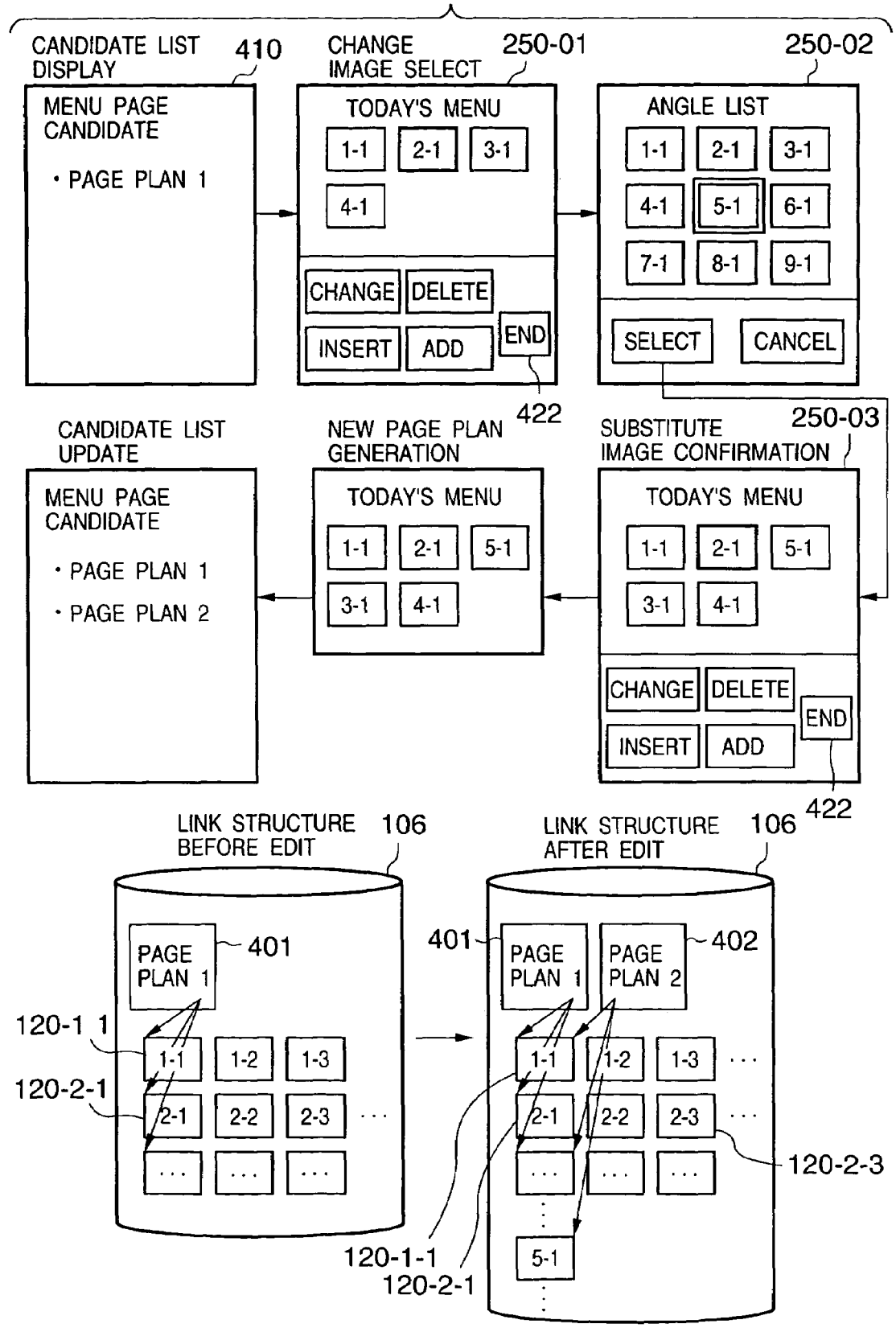
FIG. 35 is a chart showing the flow of image edit processes in the eighth embodiment.

FIG. 35 shows a modification of FIG. 4 (the flow of image edit processes) in the first embodiment, and common numbers are used for the same functional portions for the sake of simplicity.

Figure 36:
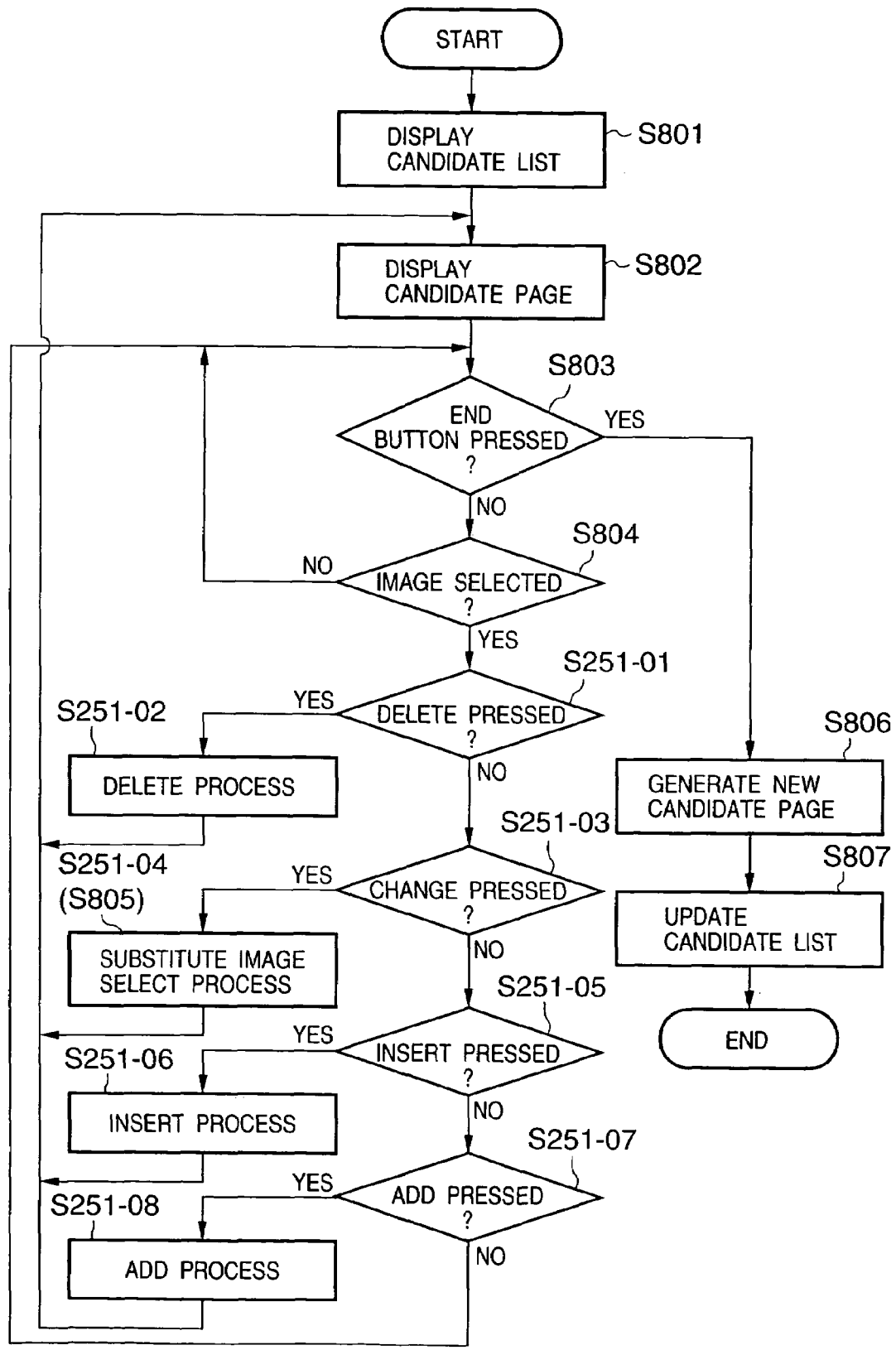
FIG. 36 is a flow chart showing the processing contents of a candidate edit program in the eighth embodiment.

FIG. 36 shows a modification of the main flow of the candidate edit program in FIG. 8, and uses common numbers for portions having the same functions.

In FIG. 36, a candidate page selected from the candidate list is displayed on a window 250-01 in FIG. 35. In the first embodiment (FIG. 4), only change (substitute) operation of a target image is taken into consideration. However, delete, insert, and add buttons are added on the window 250-01 shown in FIG. 35 in addition to the change button. The process for changing the configuration of the candidate page using these buttons will be explained below using the flow chart in FIG. 36.

In step S251-01, which is different from FIG. 8, delete operation is made. If the delete button has been pressed while a given image is selected, a delete process is executed in step S251-02 to delete the selected image from the image link structure.

If it is determined in step S251-03 that the change button has been pressed while a given image is selected, a substitute image select process (step S251-04) is executed. This process is the same as that in step S805 in FIG. 8.

If the insert button (step S251-05) or the add button (step S251-07) is selected while a given image is selected, a window 250-02 for selecting image sensing positions (angles) in FIG. 35 is displayed. Upon selection of an image of desired angles from the displayed angles, that image is inserted at the designated position (before the image selected on the window 250-01 upon depression of the insert button; after the image upon depression of the add button) of the candidate page.

FIG. 35 shows the flow in which an image 5-1 is added after an image 2-1 on the window 250-01.

We often want to cancel these processes in the middle of them, but that process is not particularly shown.

The delete process can be executed even when a plurality of images are selected, but the change, insert, and add processes (steps S251-04, S251-06, and S251-08) are canceled without any process when a plurality of images are selected.

As described above, according to the eighth embodiment, when the page candidate is to be edited in the first embodiment or after the initial candidate page is created even in the seventh embodiment, its configuration (the number and order of images) can be changed.

Note that the present invention may be applied to either a system including a plurality of devices or an apparatus consisting of a single device.

To recapitulate, according to the fourth to eighth embodiments, an image page can be created by selecting only appropriate sensed images in units of positions, thus greatly reducing the load of the edit work.

By selecting a substitute sensed image for only a position which is required to be changed on the image page automatically created by the system, the image page can be modified. Hence, an image of a given position where the image is not sensed satisfactorily need only be changed, thus further reducing the load of the edit work.

Furthermore, a plurality of volunteers can create some image page candidates, and by only selecting one of a plurality of created image page candidates, the image page can be uploaded to and published on the WWW server, thus further reducing running cost.

Also, since images with more appropriate angles can be selected in units of positions without manually acquiring them, the load of the edit work can be reduced, and an image page can be created using more preferred images.

Moreover, the image sensing time of an image list page from which the edit work is to start can be selected by knowledge and experiences, and the edit work can be simplified.

Also, the edit work can be done while independently considering the time and angle, and when a large number of images are stored, images at appropriate times and angles can be selected more easily.

The image sensing time of an image page from which the edit work is to start can be selected using an image with which respective positions can be grasped as a whole, thus simplifying the edit work.

As described above, an image to be included in a document which is submitted on the network can be easily updated, and the image to be sensed can fall within the view field the operator intended without accurately designating the image sensing position.

Ninth Embodiment

In the first embodiment, an image page is published when the approver has approved that page. However, the present invention is not limited to this.

In the ninth embodiment, when a given candidate page has not been approved after a predetermined time has passed, that page is automatically approved. In this way, the page can be prevented from being not published even after a predetermined time has passed, thus reducing the running cost.

The ninth embodiment will be described in detail below.

Figure 37:
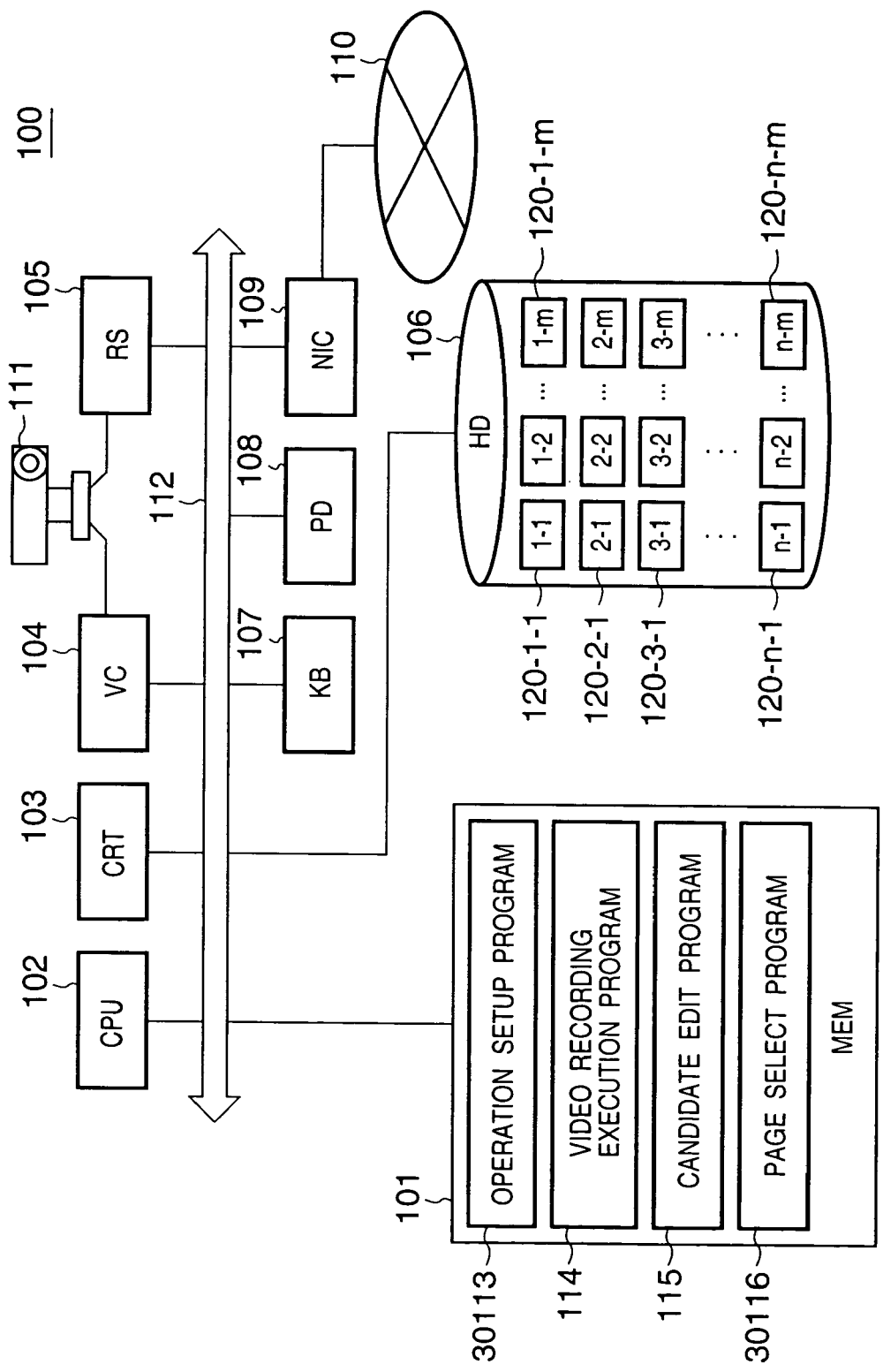
FIG. 37 is a block diagram showing the arrangement of a camera server according to the ninth embodiment of the present invention.

The system arrangement is substantially the same as the camera server diagram shown in FIG. 1, except that the operation setup program 113 and page select program 116 in FIG. 1 are respectively replaced by an operation setup program 30113 and page select program 30116, as shown in FIG. 37.

The operation of this embodiment will be described in detail below.

Figure 38:
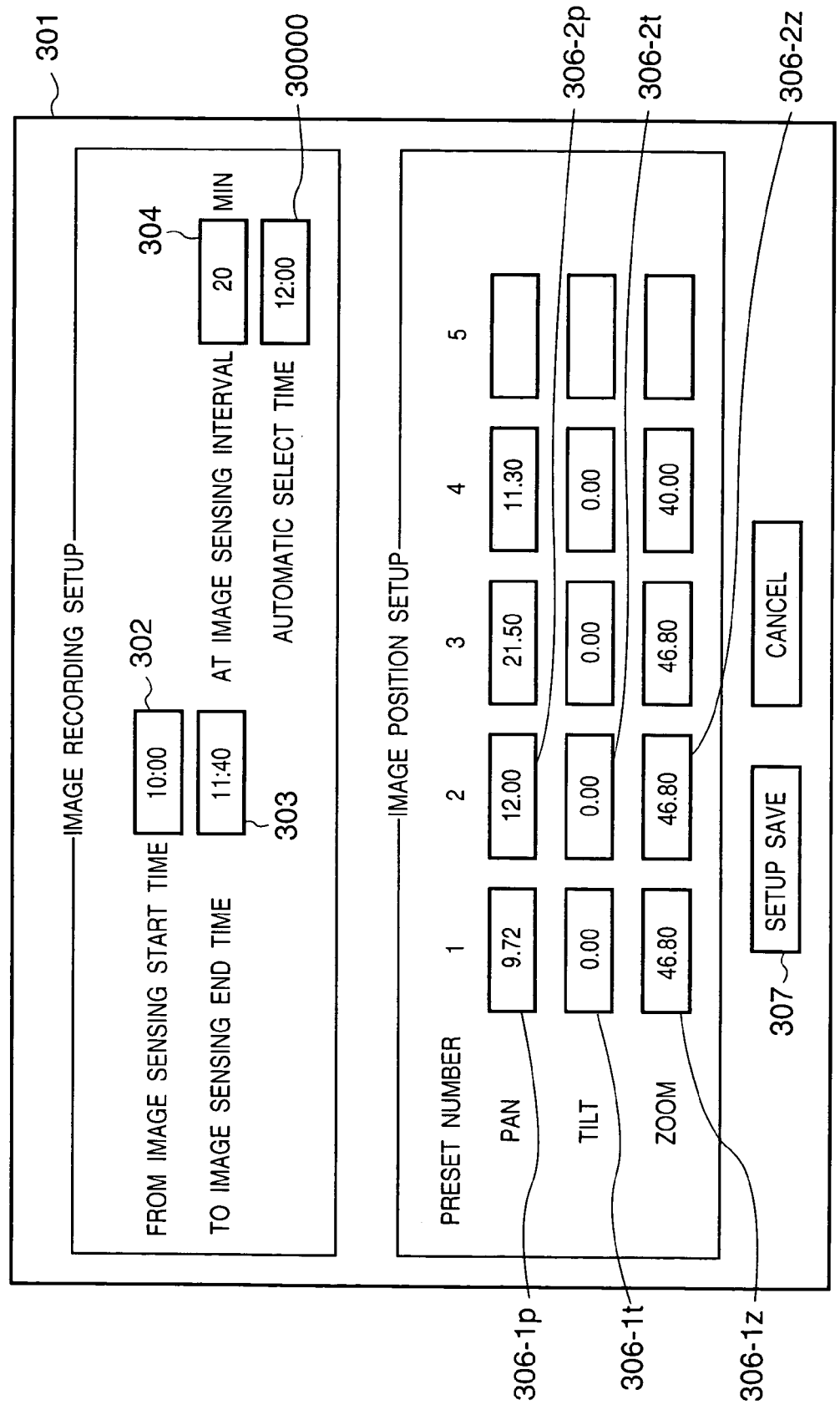
FIG. 38 is a view for explaining the operation setups for setting an image sensing schedule of the camera server in the ninth embodiment.

FIG. 38 shows an example of operation setups of the operation setup program 30113, and the operation setups will be explained below using FIG. 38.

FIG. 38 shows the interface to which a field 30000 is added to that shown in FIG. 3 of the first embodiment to allow input of an automatic select time.

Figure 39:
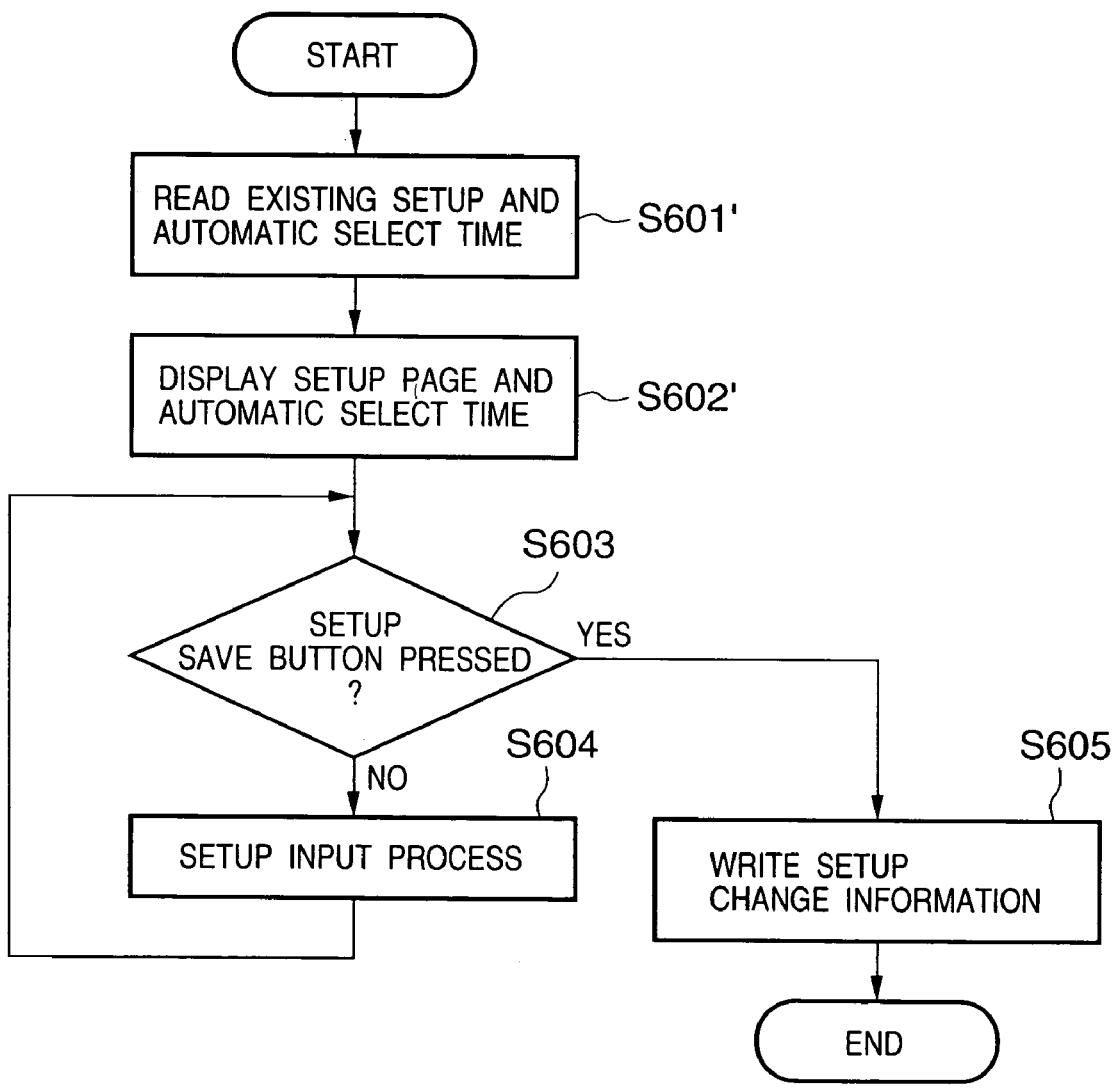
FIG. 39 is a flow chart for explaining the flow of an operation setup program in the ninth embodiment.

The flow of the operation of the operation setup program 30113 is substantially the same as that shown in FIG. 6 of the first embodiment, except that the existing setups and automatic select time are read in step S601', and a setup page and automatic select time are displayed in step S602', as shown in FIG. 39.

The operations of the video recording execution program 114 and candidate edit program 115 are the same as those in the first embodiment.

The flow of the operation of the page select program 30116 will be described below with reference to the flow chart in FIG. 40.

The page select program is launched by the approver or when a predetermined automatic select time has been reached.

Figure 40:
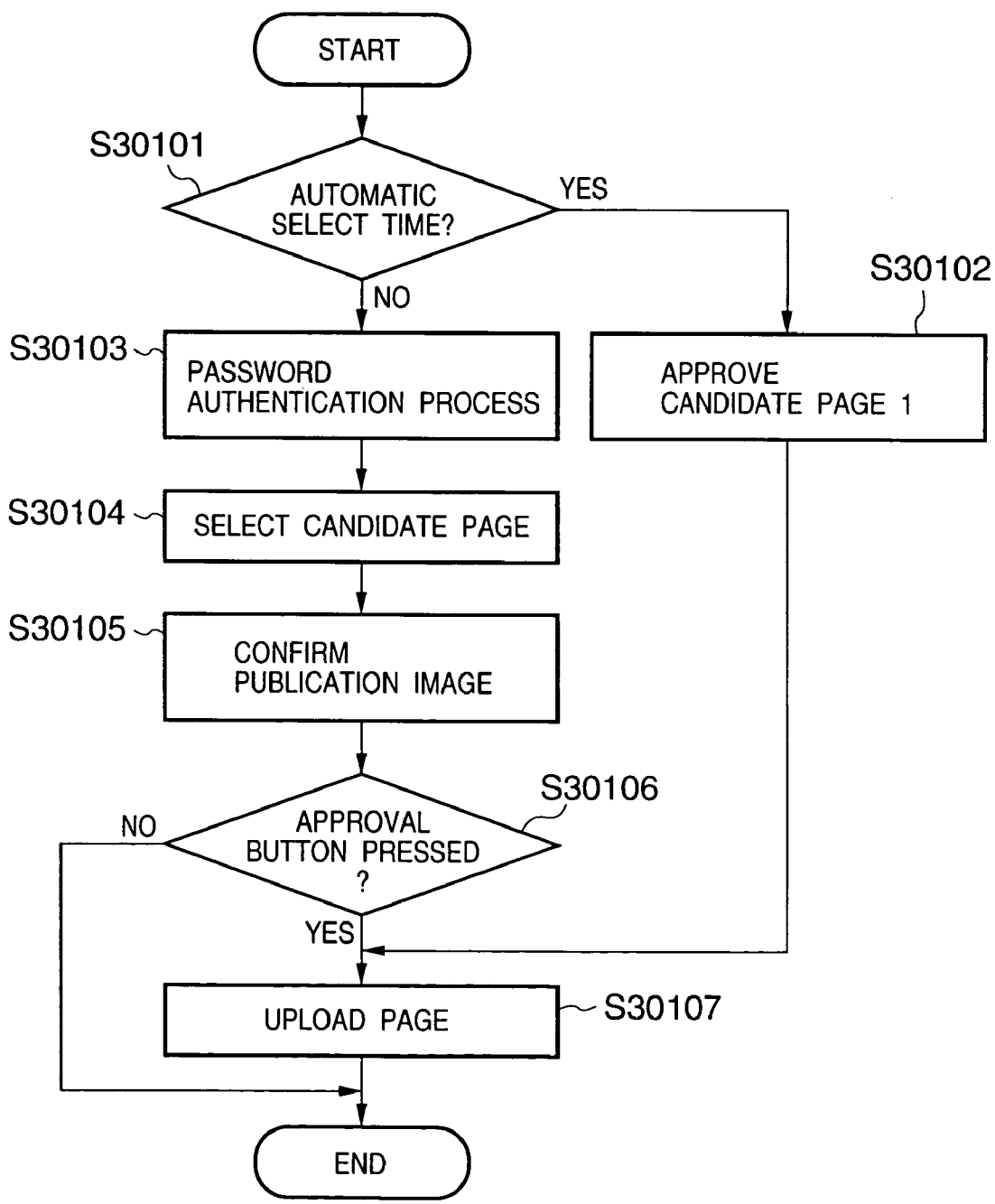
FIG. 40 is a flow chart for explaining the flow of a page select program in the ninth embodiment.

The processes in steps S30103 to S30106 in FIG. 40 are the same as those in steps S901 to S904 in FIG. 9 of the first embodiment.

If it is determined in step S30101 that the program has been launched at the automatic select time, image candidate page plan 1 created by the same process as in step S801 of the candidate edit program 115 is approved in step S30102.

The approved page is uploaded in step S30107 which is the same as step S905 in FIG. 9 of the first embodiment.

If it is determined in step S30101 that the program has been launched not at the automatic select time but by the approver, the flow advances to a password authentication process in step S30103. The subsequent processes are the same as those in FIG. 9. After the page is uploaded in step S30107 as in step S905 in FIG. 9 of the first embodiment, the automatic select time setup is cleared.

In place of clearing the automatic select time, information indicating that the page has been approved may be provided in step S30107, and if the page has been approved, it is not uploaded at that time (until the predetermined time has been reached).

In this manner, when the approver does not approve the page before a predetermined automatic select time is reached, image candidate page plan 1 is automatically created and uploaded, thus preventing the page from being not published even after the predetermined time has been reached, and reducing the running cost. Note that even the page which has been approved by the approver may not be uploaded before the predetermined time is reached. In this case, the approver can set an arbitrary upload timing, and it is convenient for the approver.

10th Embodiment

In the ninth embodiment, an image candidate page is automatically and unconditionally approved when it has not been approved before a predetermined time. However, the present invention is not limited to such specific embodiment.

In the 10th embodiment, when no approval is done even after the predetermined time has passed, an appropriate page is selected from candidate pages, and the selected page is automatically approved.

In this manner, the page can be prevented from being not published even after the predetermined time has passed, and an appropriate one of candidate pages selected by volunteers can be published, thus reducing the running cost.

Details of the 10th embodiment will be explained below.

Figure 41:
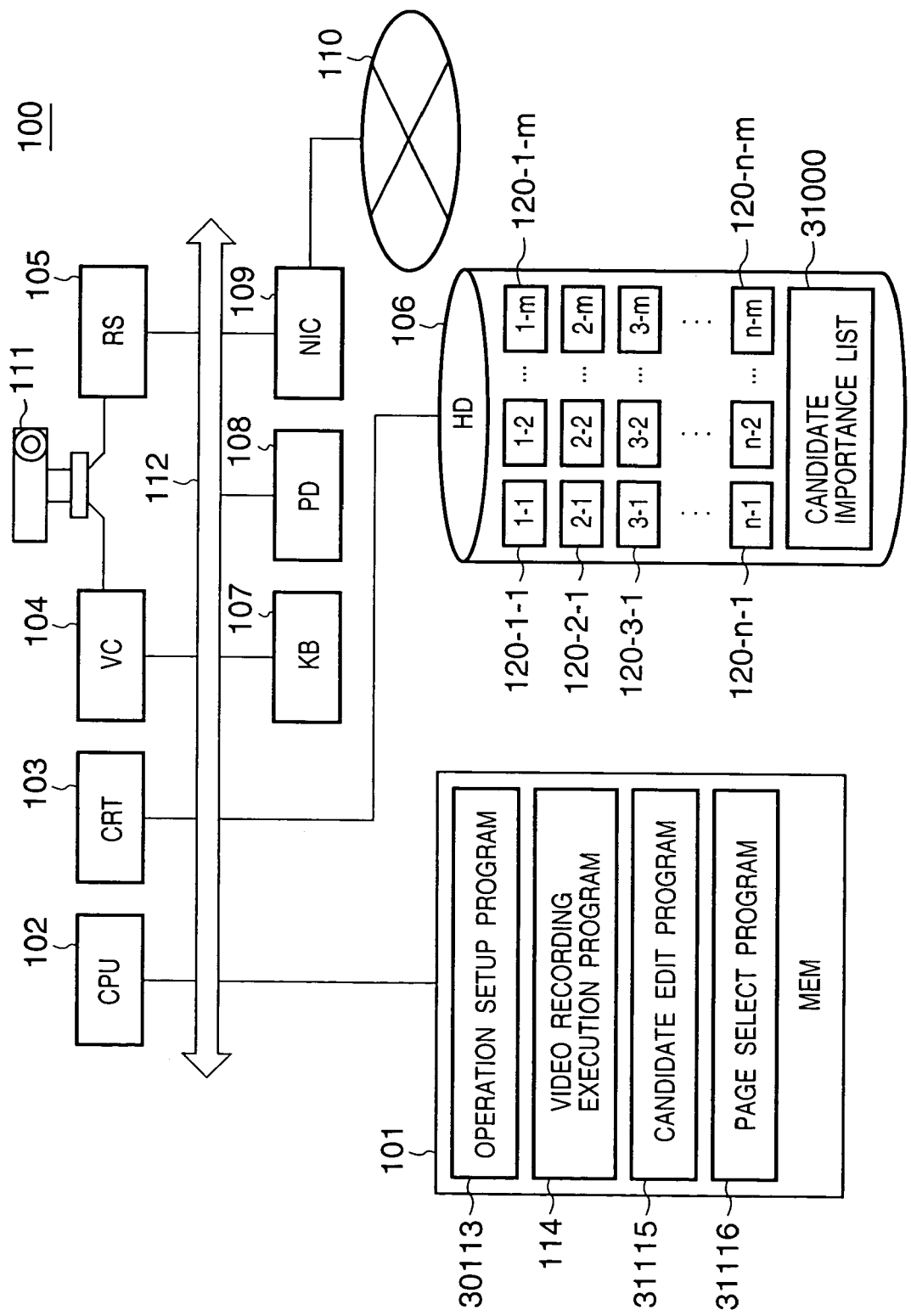
FIG. 41 is a block diagram showing the arrangement of a camera server according to the 10th embodiment of the present invention.

The system arrangement is substantially the same as that of the camera server in the ninth embodiment, except that the candidate edit program 115 and page select program 30116 of the ninth embodiment are respectively replaced by a candidate edit program 31115 and page select program 31116, as shown in FIG. 41. Also, a candidate importance list 31000 is added to the contents of the HD 106 in the camera server shown in FIG. 1 of the first embodiment.

The operation of the 10th embodiment with the above arrangement will be described in detail below.

The operation of the operation setup program 30113 is the same as that in the ninth embodiment. Also, the operation of the video recording execution program 114 is the same as that in the first or ninth embodiment.

Figure 42:
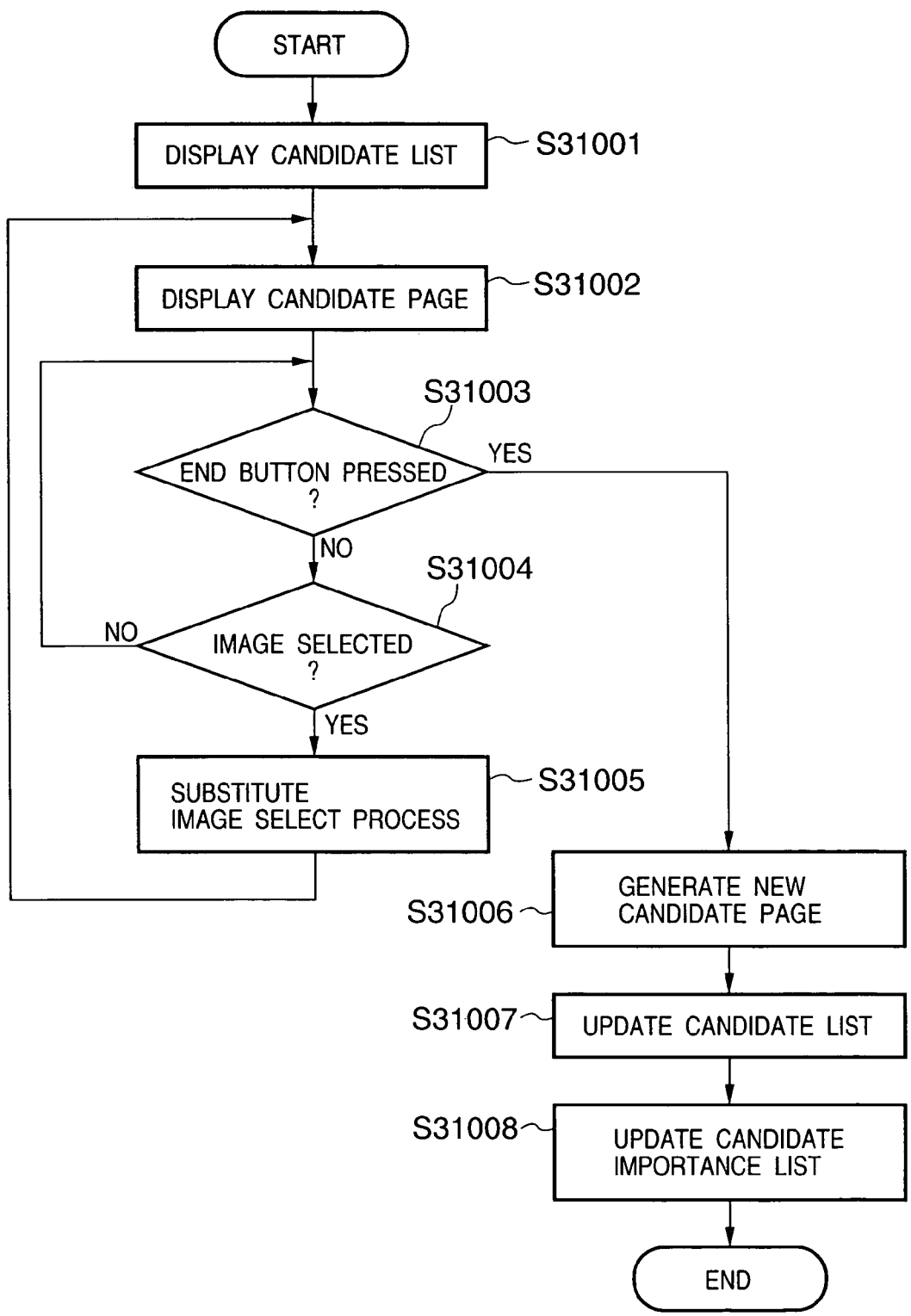
FIG. 42 is a flow chart showing the processing contents of a candidate edit program in the 10th embodiment.

In the flow of the operation of the candidate edit program 31115, a candidate importance list update process in step S31008 is added to the flow chart in FIG. 8 of the first embodiment, as shown in FIG. 42. Steps S31001 to S31007 in FIG. 42 are the same as steps S801 to S807 in FIG. 8, respectively.

In the operation, after the candidate list is updated in step S31007, a candidate importance list is updated in step S31008, thus ending the candidate edit program 31115.

Figure 43:
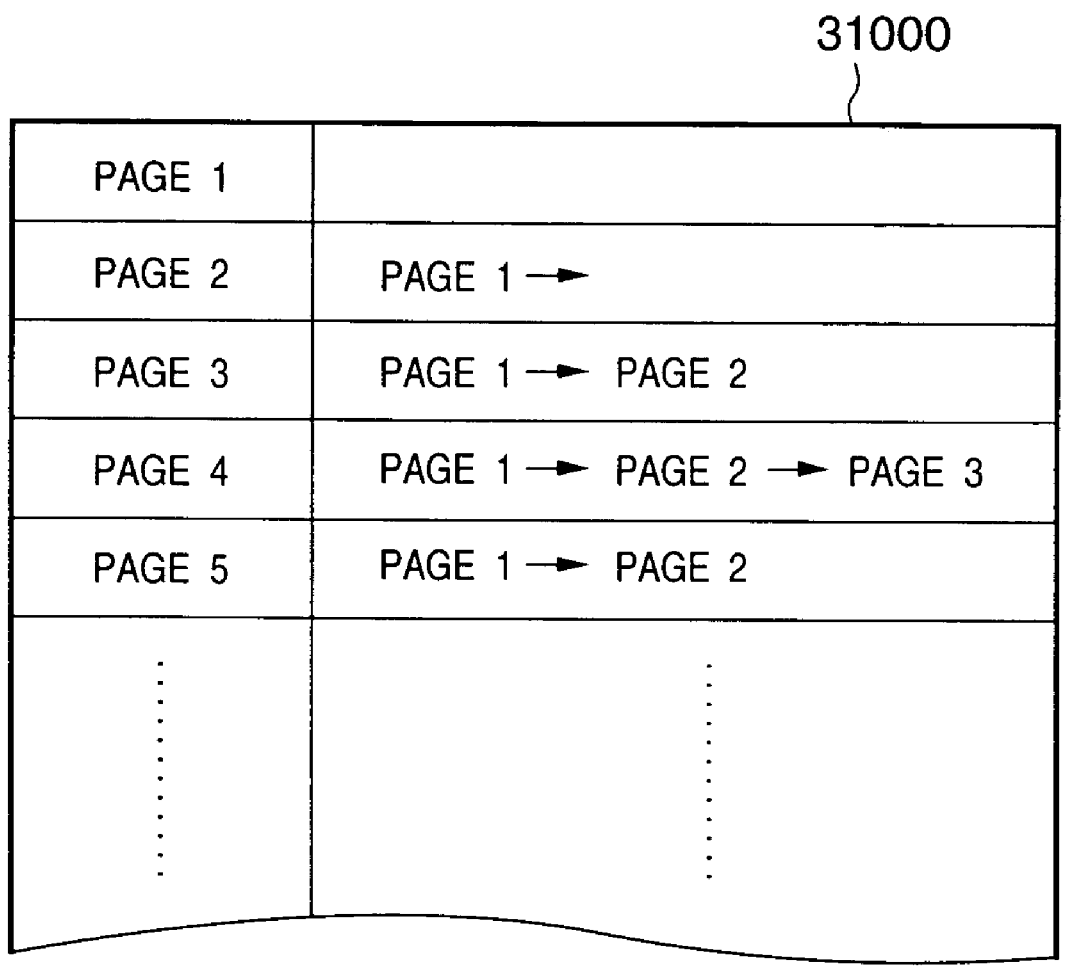
FIG. 43 shows the contents of a candidate importance list in the 11th embodiment of the present invention.

FIG. 43 shows an example of the candidate importance list 31000 in step S31008.

This list saves the edit history indicating the source candidate page of a given candidate page that has been edited.

The importance list 31000 holds:

"candidate page plan 1:" for automatically generated candidate page plan 1;

"candidate page plan 2: candidate page plan 1→" for candidate page plan 2 modified based on candidate page plan 1;

"candidate page plan 3: candidate page plan 1→candidate page plan 2" for candidate page plan 3 modified based on candidate page plan 2;

"candidate page plan 4: candidate page plan 1→candidate page plan 2→candidate page plan 3" for candidate page plan 4 modified based on candidate page plan 3; and "candidate page plan 5: candidate page plan 1→candidate page plan 2" for another candidate page plan 5 modified based on candidate page plan 2.

In the candidate importance list update process in step S31008, a process for updating the candidate importance list 31000 and saving the edit histories is done.

The flow of the operation of the page select program 31116 will be explained below using the flow chart in FIG. 44.

The processes in steps S31201 and S31203 to S31207 are the same as those in steps S30101 and S30103 to S30107 of FIG. 40 in the ninth embodiment. In the flow chart in FIG. 44, step S30102 in the flow chart in FIG. 40 is replaced by step S31202.

The page select program is launched by the approver or when a predetermined automatic select time has been reached.

If it is determined in step S31201 that the program has been launched at the automatic select time, the flow advances to step S31202 to approve, as a page plan with a high importance level, e.g., candidate page plan 3 having the longest edit history in the candidate importance list 31000 created in step S31008 of the candidate edit program 31115.

As in step S30107 in FIG. 40 of the ninth embodiment, the page is uploaded in step S31207.

In this manner, when the approver does not approve the page before a predetermined automatic select time is reached, a page plan that has been best edited of candidate page plans edited by volunteers is updated, thus preventing the page from being not published even after the predetermined time has passed, and reducing the running cost.

11th Embodiment

In the 10th embodiment, the importance list holds edit histories. However, the present invention is not limited to such specific embodiment.

In the 11th embodiment, when a page is not approved even after a predetermined time has passed, an appropriate one of candidate pages is selected based on its record of the number of times of edit and edit time, and is automatically approved. In this manner, the page can be prevented from being not published even after the predetermined time has passed, and an appropriate one of candidate pages selected by volunteers can be published, thus reducing the running cost.

Details of the 11th embodiment will be described below.

Figure 45:
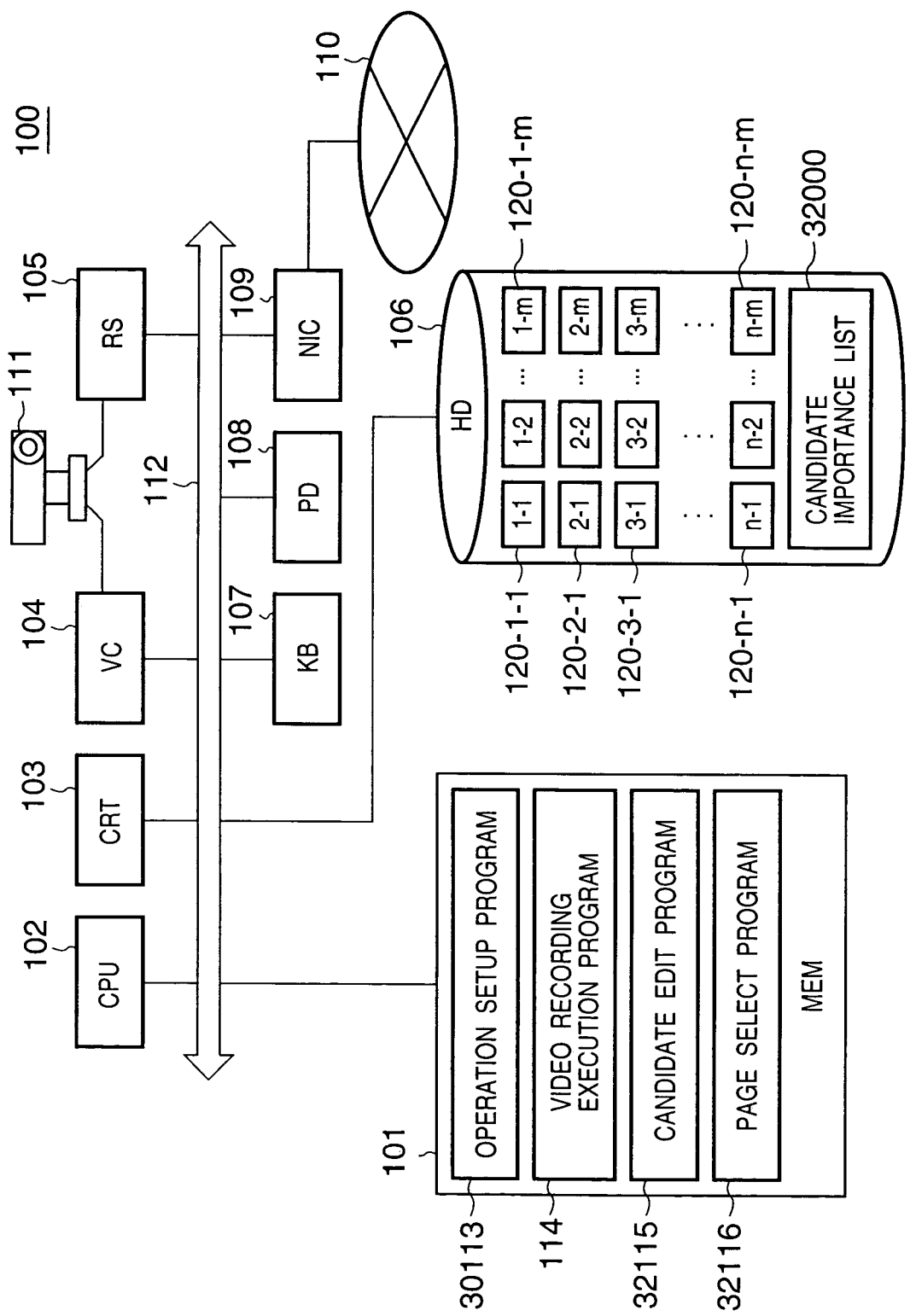
FIG. 45 is a block diagram showing the arrangement of a camera server in the 11th embodiment.

The system arrangement is substantially the same as that of the camera server of the 10th embodiment, except that the candidate edit program 31115 and page select program 31116 in the 10th embodiment are respectively replaced by a candidate edit program 32115 and page select program 32116, as shown in FIG. 45. Also, the candidate importance list 31000 in the HD 106 in the camera server of the 10th embodiment is replaced by a list 32000.

The operation of the 11th embodiment with the above arrangement will be described in detail below.

The operation of the operation setup program 30113 is the same as that in the 10th embodiment. Also, the operation of the video recording execution program 114 is the same as that in the first or 10th embodiment.

The flow of the operation of the candidate edit program 32115 is not shown since it is modified to apply the candidate importance list update process in step S31008 in the flow chart of FIG. 42 of the 10th embodiment to the 11th embodiment.

FIG. 46 shows an example of the candidate importance list 32000 in the 11th embodiment. As shown in FIG. 46, the 11th embodiment saves the number of times of edit and the last update time of each candidate page.

The importance list 32000 holds:

"candidate page plan 1: zero times, 11:20" for automatically generated candidate page plan 1;

"candidate page plan 2: once, 11:25" for candidate page plan 2 modified based on candidate page plan 1;

"candidate page plan 3: twice, 11:30" for candidate page plan 3 modified based on candidate page plan 2;

"candidate page plan 4: three times, 11:55" for candidate page plan 4 modified based on candidate page plan 3;

"candidate page plan 5: twice, 11:40" for another candidate page plan 5 modified based on candidate page plan 2; and "candidate page plan 6: three times, 11:45" for candidate page plan 6 modified based on candidate page plan 5.

That is, a process for updating the candidate importance list 32000 by holding the candidate importance level of a new candidate page, the number of times of modification of which is obtained by incrementing that of the source candidate page, and the edit time of which is saved is done in the same step as step S31008 of FIG. 42.

The flow of the operation of the page select program 32116 is not shown since a process for checking the importance level in step S31202 in the flow chart of FIG. 44 is applied to the 11th embodiment. In this step, page plan 3 which has a large number of times of edit and the latest update time in the candidate importance lest 32000 created by the candidate edit program 32115 and shown in FIG. 46 is approved as a page plan with a high importance level.

That is, since a volunteer who could edit based on candidate page 6 present at 11:45 created candidate page 4 at 11:55, it is determined that page 4 has higher importance level than page 6 although they have been modified the same number of times.

In this manner, when the approver does not approve the page before a predetermined automatic select time is reached, a page plan that has been edited by a volunteer who can use the most candidate page plans of those edited by volunteers is approved, thus preventing the page from being not published even after the predetermined time has passed, uploading a satisfactory image page, and reducing the running cost.

12th Embodiment

In the 10th and 11th embodiments, the edit record is used as an importance. However, the present invention is not limited to such specific embodiments.

In the 12th embodiment, a candidate page which has been supported without being edited, i.e., without requiring any change, is recorded, and when a page has not been approved after a predetermined time, an appropriate one of candidate pages is selected on the basis of the record of the number of times of edit, edit time, and support without edit, and is automatically approved.

In this manner, the page can be prevented from being not published even after a predetermined time has passed, thus reducing the running cost.

Figure 47:
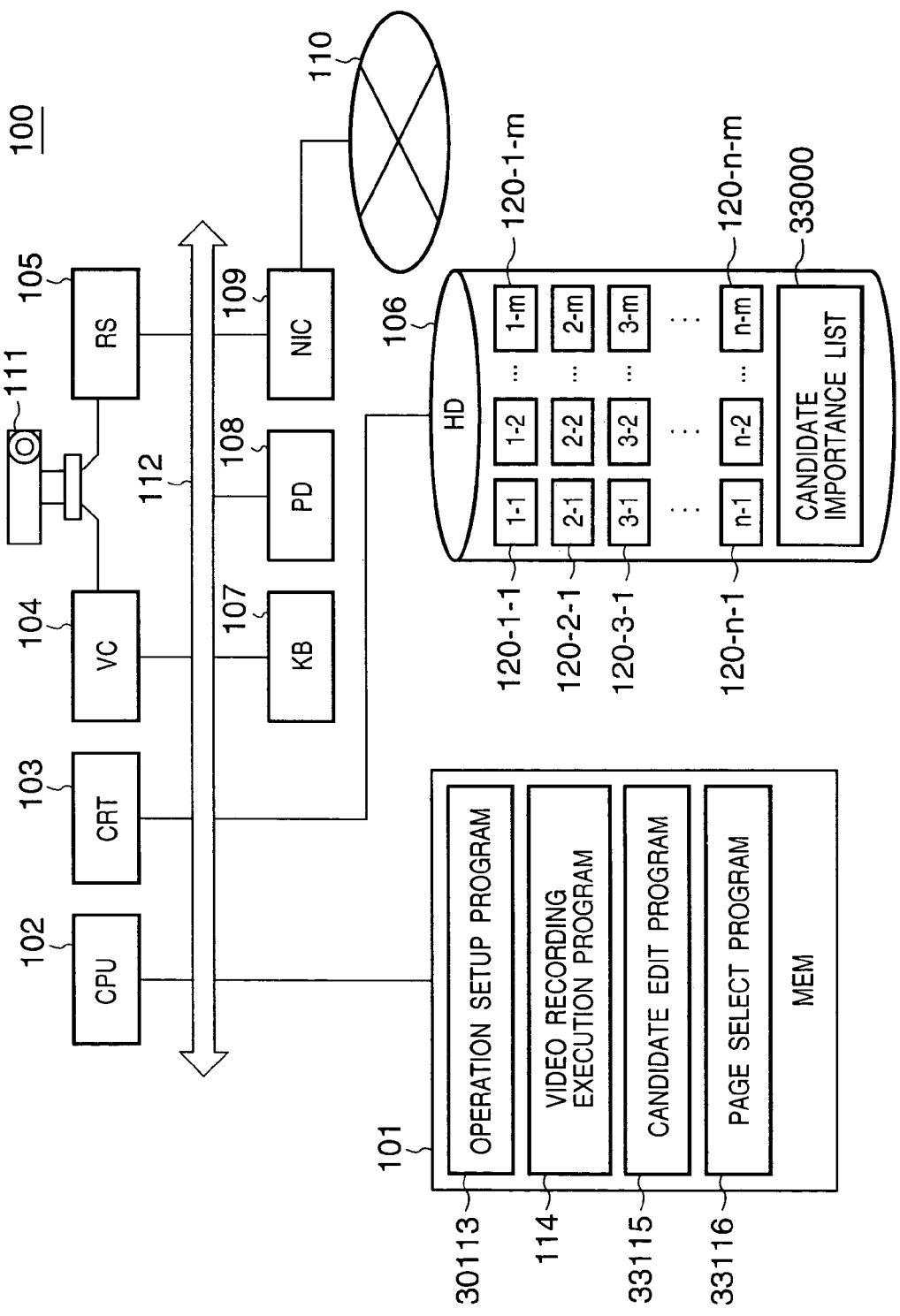
FIG. 47 is a block diagram showing the arrangement of a camera server according to the 12th embodiment of the present invention.

Details of the 12th embodiment will be explained below. The system arrangement is substantially the same as that of the camera server of the 11th embodiment, except that the candidate edit program 32115 and page select program 32116 in the 11th embodiment are respectively replaced by a candidate edit program 33115 and page select program 33116, as shown in FIG. 47. Also, the candidate importance list 32000 in the HD 106 of the camera server of the 11th embodiment is replaced by a candidate importance list 33000.

The operation of the 12th embodiment will be described in detail below.

Note that the operation of the operation setup program 30113 is the same as that in the 11th embodiment. Also, the operation of the video recording execution program 114 is the same as that in the first and 11th embodiment.

Figure 48:
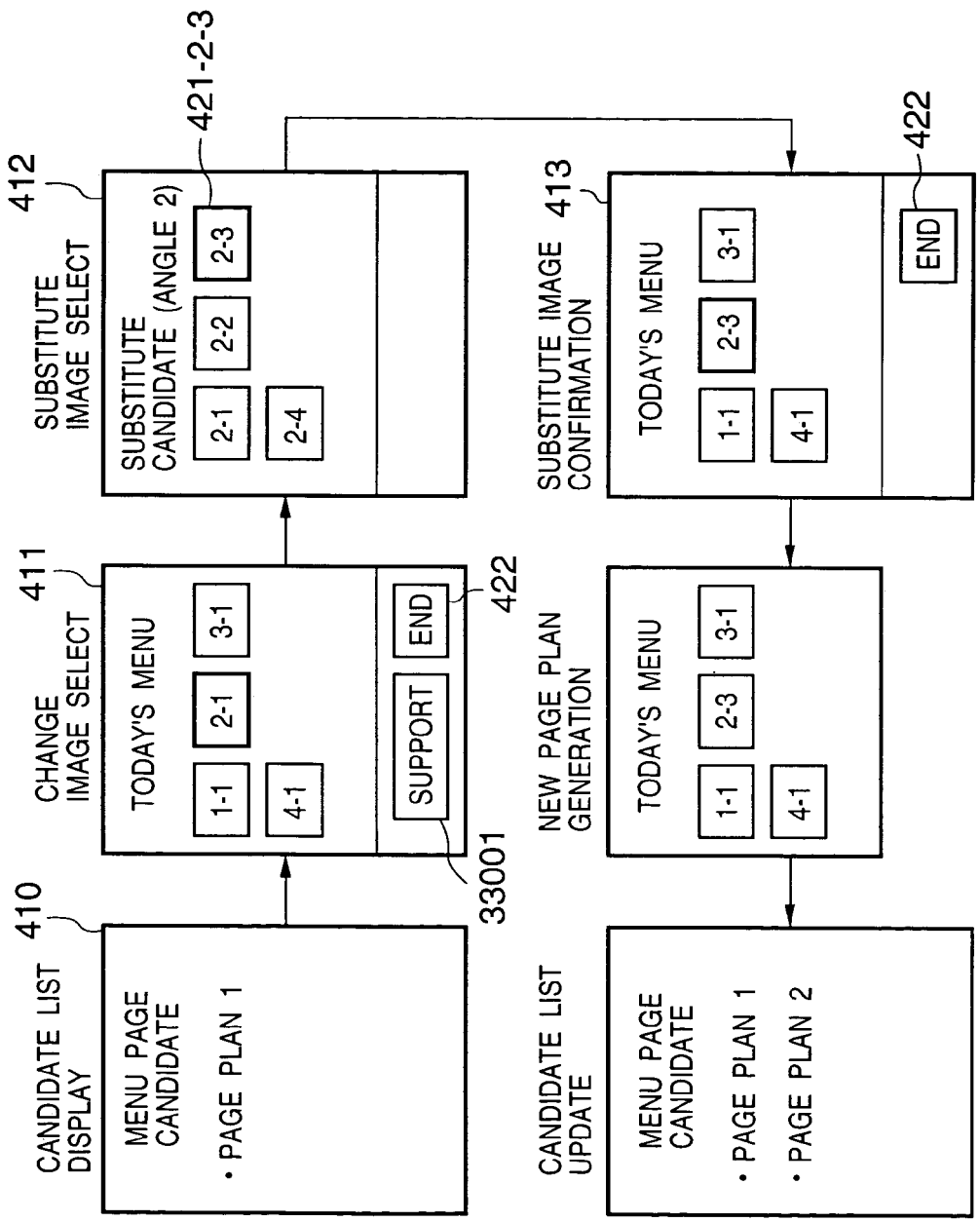
FIG. 48 is a chart showing an example of the flow of image edit process in the 12th embodiment.

FIG. 48 shows an example of the flow of image edit processes in the 12th embodiment. Reference numeral 33001 denotes a button which is used to support a candidate page, and can be indicated by a pointing device.

The flow of the operation of the candidate edit program 33115 is substantially the same as that in FIG. 42 of the 10th embodiment, except that step S33109 of supporting a page is added, and a candidate importance list update process in step S33108 equivalent to step S31008 is modified, as shown in FIG. 48. Also, steps S33101 to S33017 are respectively the same as steps S30101 to S30107 in FIG. 40.

When a candidate page is displayed in step S33102, if the operator has pressed the support button 33001 in FIG. 48 in step S33109, the number of times of support in the candidate importance list 33000 is incremented by 1 in step S33108 to update the list 33000, thus ending the process.

If the support button is not pressed, the flow advances to step S33103, which is equivalent to step S31003.

FIG. 50 shows an example of the candidate importance list 33000 updated in step S33108.

This list saves the number of times of edit, the last update time, and the number of times of support of each candidate page.

The important list 33000 holds:

"candidate page plan 1: zero times, 11:20, once" for automatically generated candidate page plan 1;

"candidate page plan 2: once, 11:25, three times" for candidate page plan 2 modified based on candidate page plan 1;

"candidate page plan 3: twice, 11:30, once" for candidate page plan 3 modified based on candidate page plan 2;

"candidate page plan 4: three times, 11:55, zero times" for candidate page plan 4 modified based on candidate page plan 3;

"candidate page plan 5: twice, 11:40, zero times" for another candidate page plan 5 modified based on candidate page plan 2; and "candidate page plan 6: three times, 11:45, once" for candidate page plan 6 modified based on candidate page plan 5.

That is, a process for updating the candidate importance list 33000 by holding the candidate importance level of a new candidate page, the number of times of modification or the number of times of support of which is obtained by incrementing that of the source candidate page, and the edit time of which is saved is done in step S33108 which is equivalent to step S31008.

In the flow of the operation of the page select program 33116, the process for checking the importance level in step S31202 in the flow chart of FIG. 44 of the 10th embodiment is modified (not shown).

Page plan 6 which has the largest sum of the number of times of edit and the number of times of support and has the latest update time in the candidate importance list 33000 created by the candidate edit program 33115 and shown in FIG. 50 is approved as a page plan with a high importance level.

That is, for example, both candidate page plan 2 having the number of times of edit=1, and candidate page plan 6 having the number of times of edit=3 have a sum of the numbers of times of edit and support=4, and their importance levels are equivalent. In this case, it may be determined that candidate page plan 6 which has been updated later has higher importance level than page plan 2.

In this manner, when the approver does not approve the page before a predetermined automatic select time is reached, a page plan which has been edited by a volunteer who can use the most candidate page plans, and which is supported without edit by many volunteers, of those edited by volunteers is approved, thus preventing the page from being not published even after the predetermined time has passed, uploading a satisfactory image page, and reducing the running cost.

13th Embodiment

In the 10th to 12th embodiments, the edit or support record of a candidate page is used as the importance level. However, the present invention is not limited to such specific embodiments.

In the 13th embodiment, a candidate page is selected using information as to image selection or support without edit, and is automatically approved.

In this manner, the page can be prevented from being not published even after a predetermined time has passed, and an appropriate one of candidate pages selected by volunteers can be published, thus reducing the running cost.

Details of the 13th embodiment will be described below.

Figure 51:
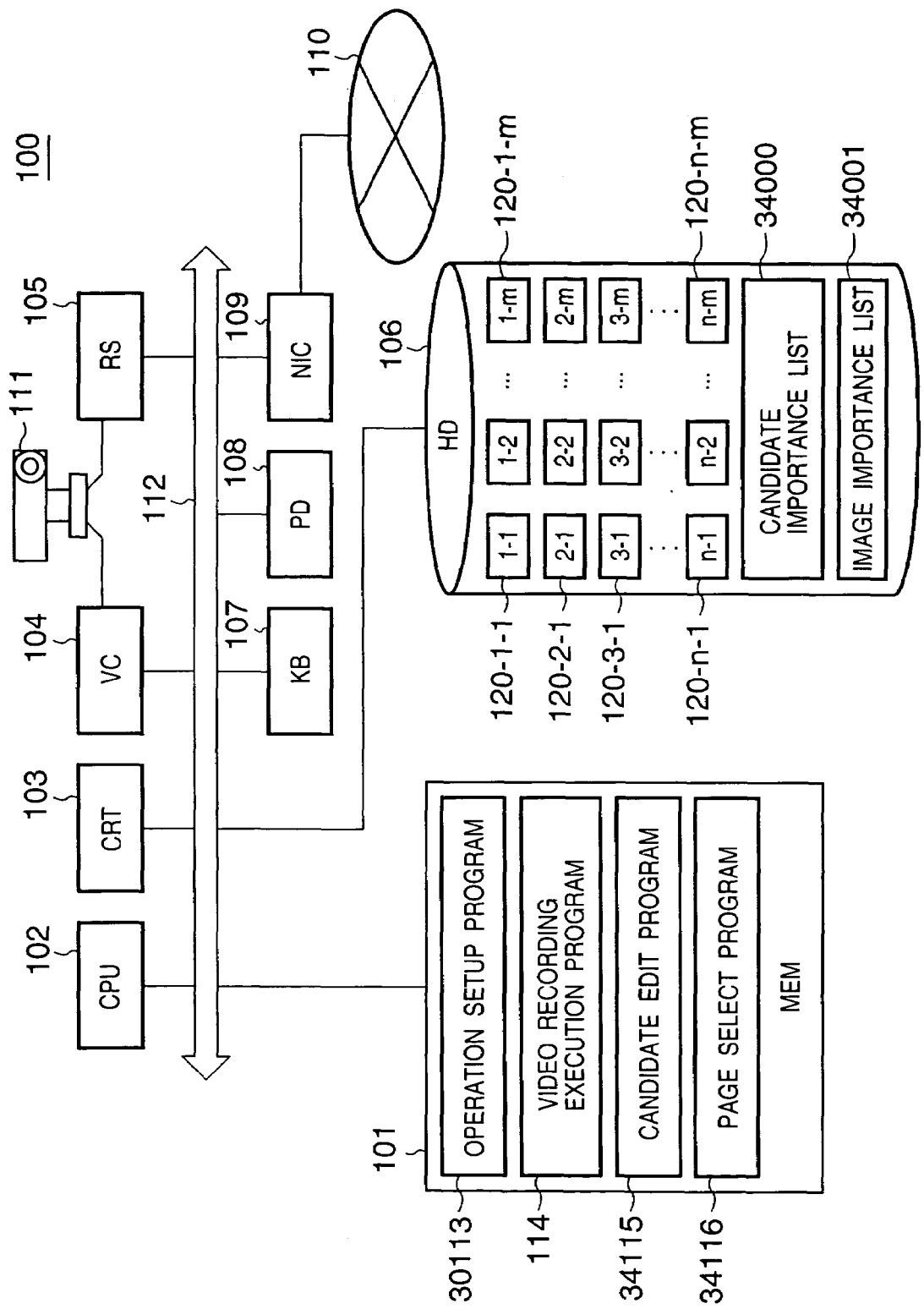
FIG. 51 is a block diagram showing the arrangement of a camera server according to the 13th embodiment of the present invention.

The system arrangement is substantially the same as that of the camera server of the 12th embodiment, except that the candidate edit program 33115 and page select program 33116 of the 12th embodiment are respectively replaced by a candidate edit program 34115 and page select program 34116, the candidate importance list 33000 in the HD 106 of the camera server is replaced by a candidate importance list 34000, and an image importance list 34001 is added to the contents of the HD, as shown in FIG. 51.

The operation of the 13th embodiment will be described in detail below.

The operation of the operation setup program 30113 is the same as that of the 12th embodiment. Also, the operation of the video recording execution program 114 is the same as that of the first and 12th embodiments.

Figure 52:
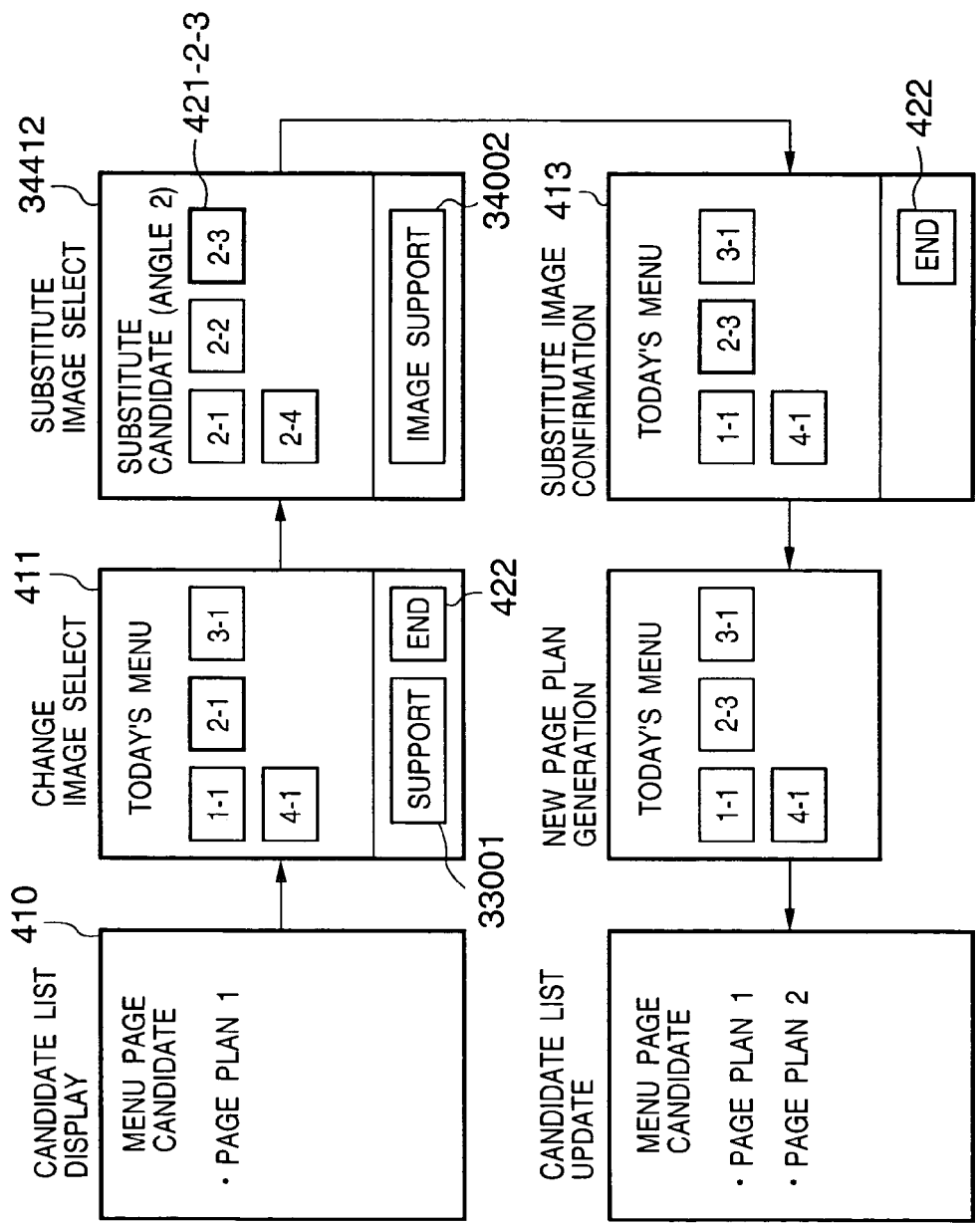
FIG. 52 is a chart showing an example of the flow of image edit processes in the 13th embodiment.

FIG. 52 shows an example of image edit processes in the 13th embodiment. In FIG. 52, reference numeral 34002 denotes a button which is used to support a selected image without edit.

Figure 49:
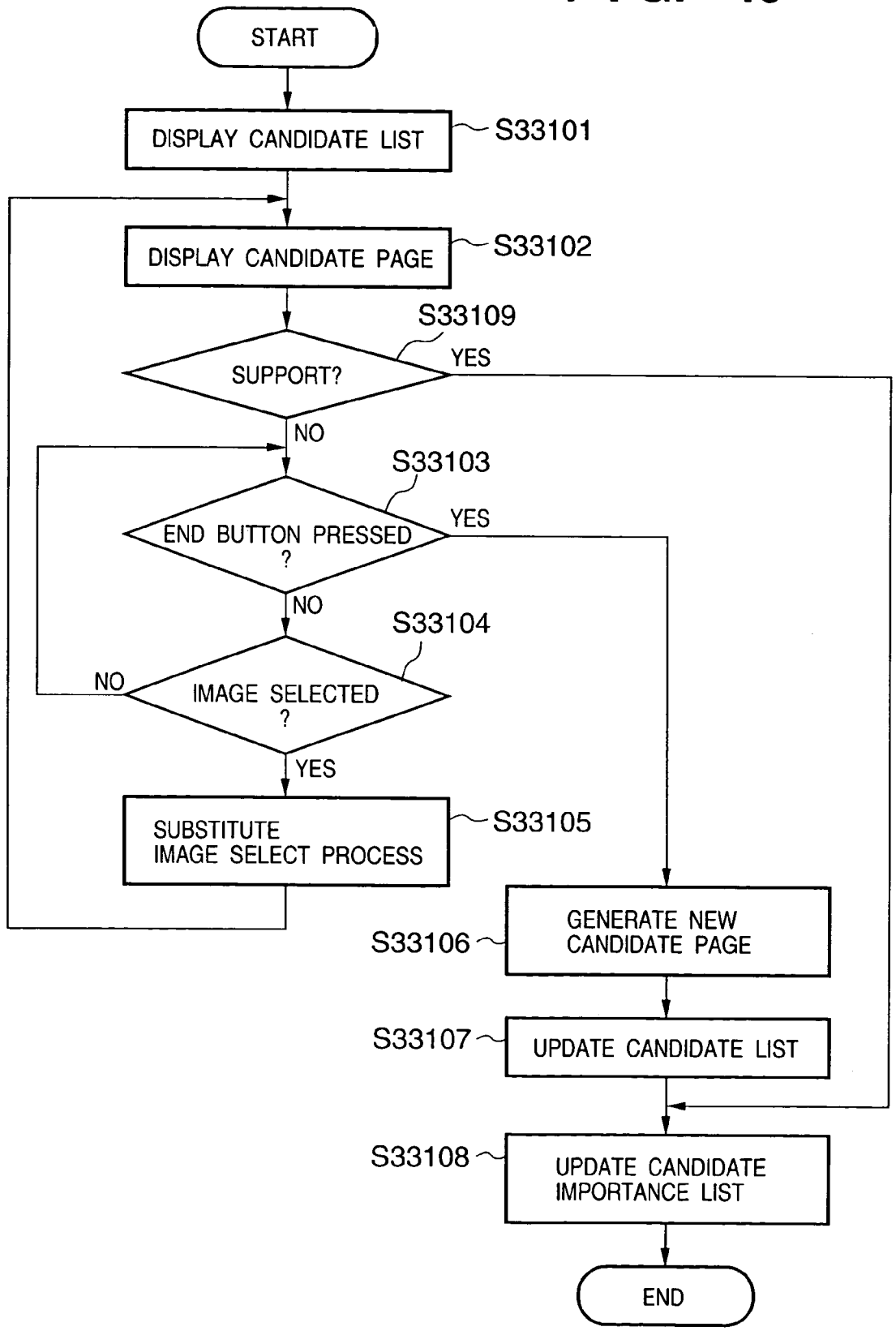
FIG. 49 is a flow chart showing the processing contents of a candidate edit program in the 12th embodiment.
Figure 53:
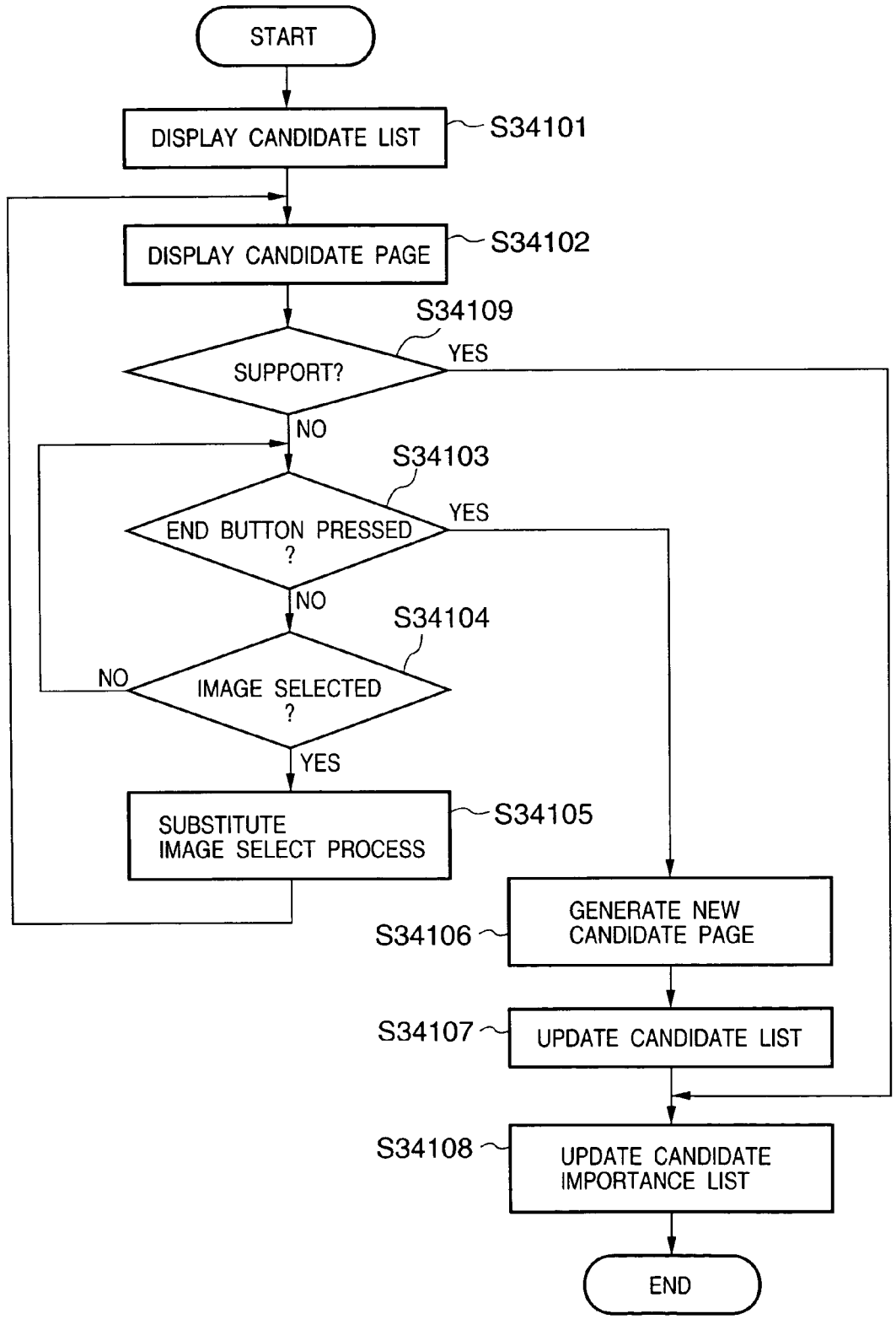
FIG. 53 is a flow chart showing the processing contents of a candidate edit program in the 13th embodiment.

The flow of the operation of the candidate edit program 34115 is substantially the same as that in the flow chart of FIG. 49 in the 12th embodiment, except that the substitute image select/recording process in step S34105 and the candidate importance list update process in step S34108 in FIG. 49 are modified, as shown in FIG. 53.

Steps S34101 to S34104, S34106, and S34107 are respectively the same as steps S33101 to S33104, S33106, and S33107 in FIG. 49.

In step S34105 after image selection in step S34104, a substitute image select window 34412 with the image support button 34002 is displayed. If the button 34002 has been pressed, the contents of the support field of the image of interest in the image importance list 34001 are counted up.

If another image is selected, the image of interest is substituted by that image, and the contents of the select field of the image of interest in the image importance list 34001 are counted up.

More specifically, as in step S33105 in FIG. 49 of the 12th embodiment, when an image is selected in the substitute image select/recording process in step S34105, the number of times of image selection in the image importance list 34001 is incremented by 1 to update the image importance list 34001.

On the other hand, if the support button 34002 has been pressed in the substitute image select/recording process in step S34105, the number of times of image support in the image importance list 34001 is incremented by 1 to update the image importance list 34001. The flow then returns to step S34102 to execute a candidate page display page.

FIG. 54 shows an example of the image importance list 34001 in the 13th embodiment. This list saves the number of times of selection or support without edit of each image.

That is, this list holds the numbers of times of selection and the numbers of times of support without edit of all image data 120-1-1, 120-2-1, . . . generated by the video recording execution program 114 in the form of a list.

FIG. 55 shows an example of the candidate importance list 34000 in step S34108. This list holds a score that computes the importance level of each candidate page from the image importance list 34001 created in step S34105 in addition to the contents of the candidate importance list 33000 in FIG. 49 of the 12th embodiment.

This score can be computed by summing up all the numbers of times of selection and support of individual images, for example, when candidate page plan 1 includes image data 120-1-1, 120-2-1, 120-3-1, and 120-4-1.

As for image data which has been neither selected nor supported, the importance level of a candidate page including that image data is set at zero, since volunteers have not edited that page.

In this case, only the score of the importance level computed from the image importance list 34001 may be set at zero.

Alternatively, as for image data which has been neither selected nor supported, a minus score may be given. For example, "1" is subtracted from the corresponding score to decrease the importance level of a candidate page that includes the image data of interest.

In this case, the score to be subtracted is not limited to "1" but may be a predetermined score.

In the flow of the operation of the page select program 34116, the process for checking the importance level in step S31202 in the flow chart of FIG. 44 of the 10th embodiment need only be modified.

In the candidate importance list 34000 created by the candidate edit program 34115 and shown in FIG. 55, candidate pages 2 and 6 have a sum of the numbers of times of edit and support=4, and have an equivalent importance level. However, the sum of the numbers of times of edit and support, and the score of the image importance, is 10 for candidate page 2 and 11 for candidate page 6. Hence, it is concluded that candidate page 6 has higher importance level than page 2.

If the score remains the same, a page plan which has been edited latest is approved as that with high importance level.

That is, it is determined that candidate page plan 6 which has a largest sum of the number of times of edit+the number of times of support+the image importance score and has been updated latest has a highest importance level.

In another importance computation method, when candidate page 6 includes image data which is neither selected nor supported, and candidate page 2 does not include such image, it is determined that the volunteers do not consider all images of candidate page 6 and, hence, candidate page 2 has a higher importance level than candidate page 6.

In this case, as a minus image importance score may be given to an image which is not supported, the importance level of candidate page 6 including an image which is not edited is decreased, thus relatively increasing the importance level of candidate page 2 which has been edited more satisfactorily.

In this manner, when the approver does not approve the page before a predetermined automatic select time is reached, a page plan which has been edited by a volunteer who can use a largest number of candidate page plans, and which includes many images selected or supported upon creating a candidate page of those edited by volunteers is approved, thus preventing the page from being not published even after the predetermined time has passed, uploading a satisfactory image page, and reducing the running cost.

14th Embodiment

In the 10th to 13th embodiments, the importance level is used in automatic approval of a candidate page. However, the present invention is not limited to such specific embodiments.

In the 14th embodiment, the order of candidate pages in the candidate page list is changed depending on their importance level upon displaying the list.

In this way, upon creating a new image page based on a given candidate page, a candidate page to be used can be easily determined.

Details of the 14th embodiment will be explained below.

Figure 56:
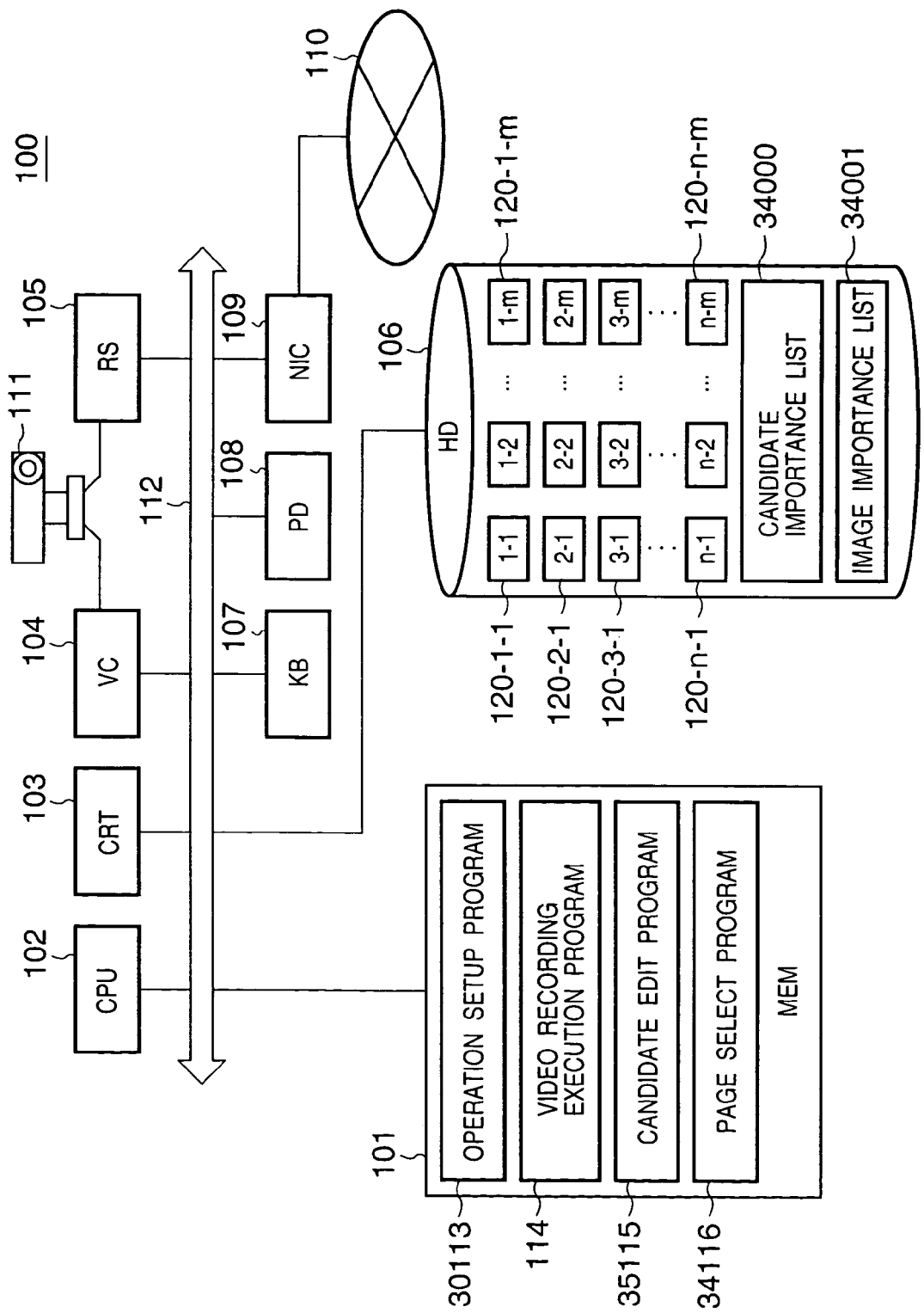
FIG. 56 is a block diagram showing the arrangement of a camera server according to the 14th embodiment of the present invention.

The system arrangement is substantially the same as that of the camera server of the 13th embodiment, except that the candidate edit program 34115 of the 13th embodiment is replaced by a candidate edit program 35115, as shown in FIG. 56.

The operation of the 14th embodiment will be described in detail below. Note that the operation of the operation setup program 30113 is the same as that in the 13th embodiment. Also, the operation of the video recording execution program 114 is the same as that in the first embodiment and ninth to 13th embodiments. Furthermore, the operation of the page select program 34116 is the same as that in the 13th embodiment. Hence, a detailed description of these programs will be omitted.

Figure 57:
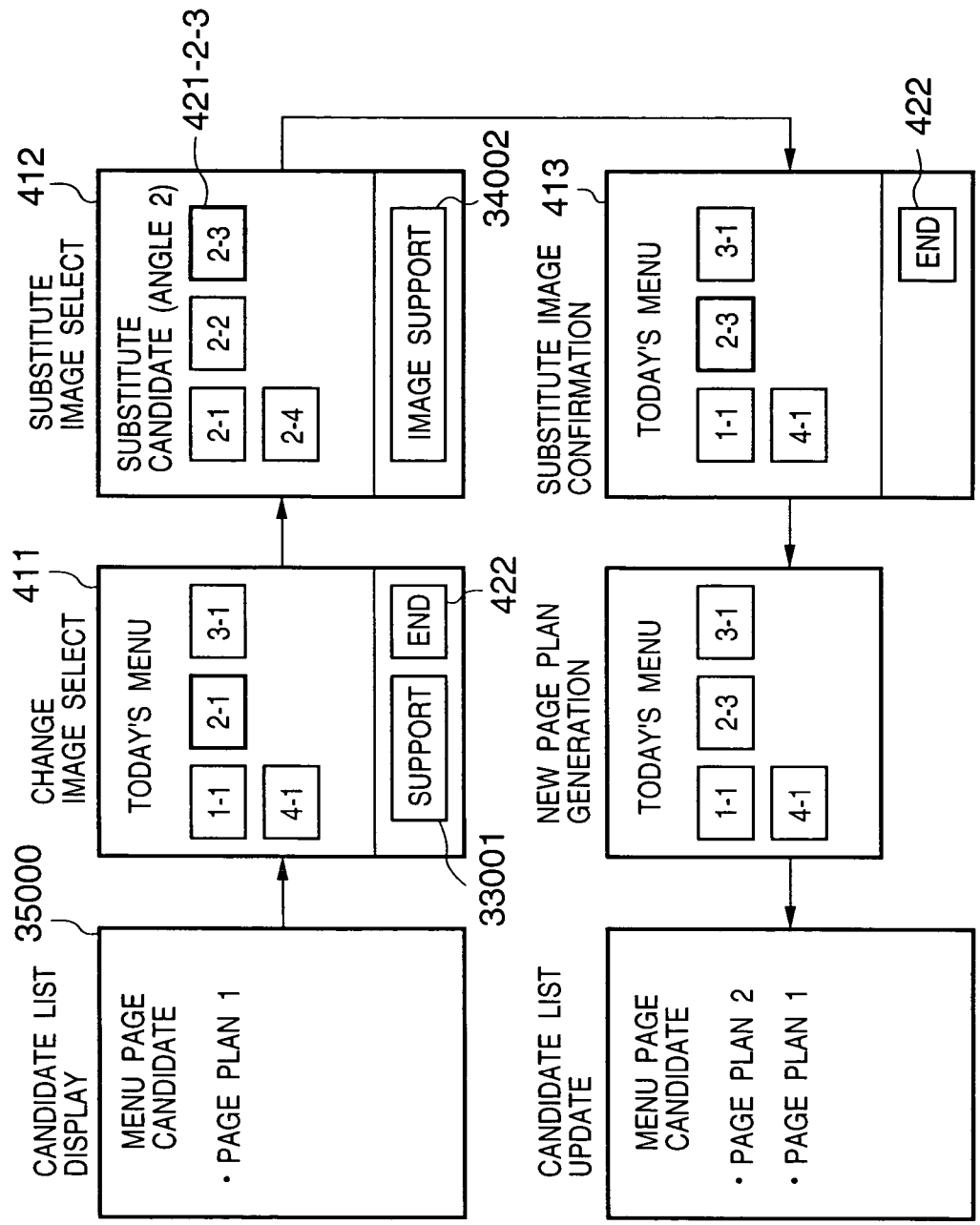
FIG. 57 is a chart showing an example of the flow of image edit processes in the 14th embodiment.

FIG. 57 shows an example of the flow of image edit processes of the 14th embodiment. In FIG. 57, reference numeral 35000 denotes a window for displaying candidates in the order of their importance levels in the form of a list.

The flow of the operation of the candidate edit program 35115 can be implemented by changing the candidate list display process in step S33101 in the flow chart of FIG. 49 in the 12th embodiment.

Figure 58:
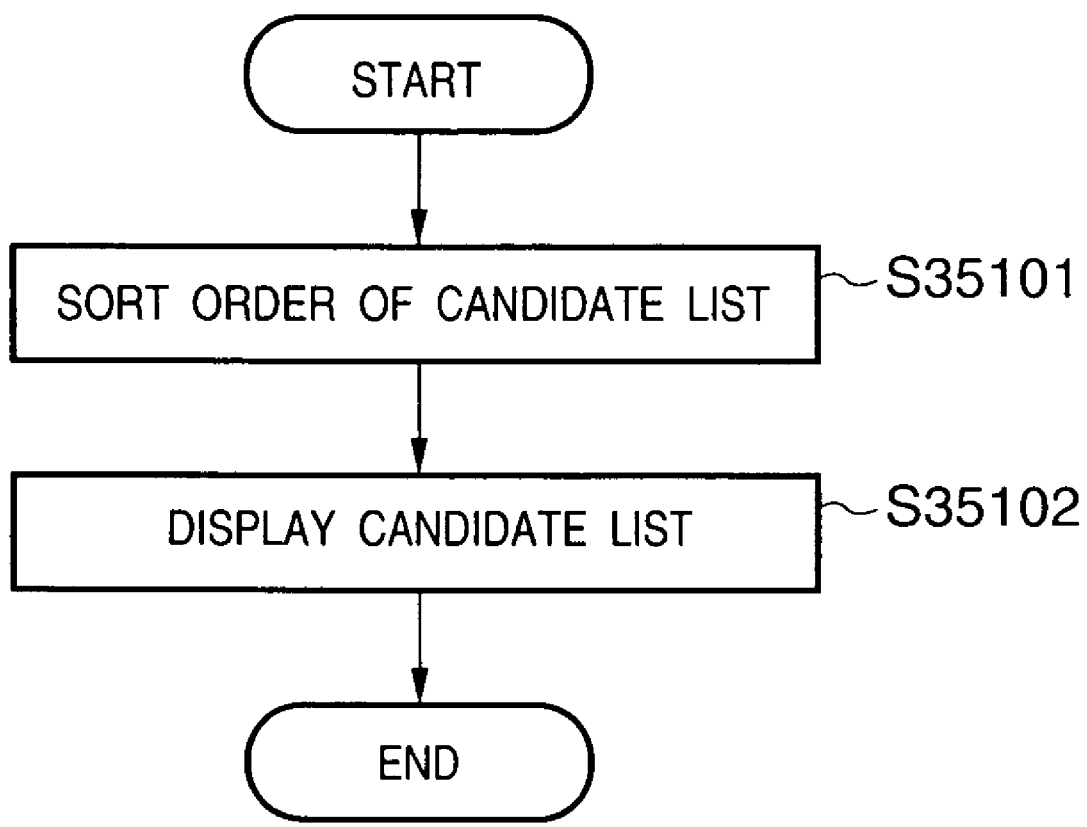
FIG. 58 is a flow chart showing the contents of a candidate list display process in the 14th embodiment.

The flow of the operation of the candidate list display process will be explained below using the flow chart in FIG. 58.

When the candidate list display process starts, the candidates in the candidate list are sorted in step S35101 on the basis of the candidate importance list 34000 (FIG. 55) created in step S34108 in FIG. 53 of the 13th embodiment and the computation results of importance levels as in step S31202 in FIG. 44 of the 10th embodiment.

In step S35102, the candidate list is displayed.

In this way, the candidate list window 35000 used to select a page to be edited by the candidate edit program 35115 is displayed in the order of importance levels of the candidates, and it becomes easy to edit based on a more suitable candidate page, thus reducing the running cost.

In the above description, the importance level is computed for a partial modification in consideration of the number of times of edit and the number of times of support in the example in which images automatically sensed and stored by the camera are substituted. Alternatively, a partial image may be selected from partial image candidates which are prepared by some method, as described above.

Furthermore, the above embodiment may be applied to a case wherein an image is segmented into partial images, which are to be modified.

In this case, a larger weight may be assigned to support than edit.

In the ninth to 14th embodiments described above, the processes in the camera server have been exemplified. In this case, the camera server may be either a system including a plurality of devices or an apparatus consisting of a single device.

To restate, according to the above embodiments, a preferred one of image pages created by volunteers is published, thus reducing the running cost.

Especially, in the ninth embodiment, when a page has not been approved after a predetermined time has passed, the page is automatically approved, thus publishing a candidate page, and reducing the running cost.

In the 10th embodiment, when the approver does not approve any page before the predetermined automatic select time has been reached, a page plan which has been best edited of candidate page plans edited by volunteers is uploaded, thus publishing a preferred image page, and reducing the running cost.

In the 11th embodiment, since a page plan which has been edited by a volunteer who can use a largest number of candidate pages is approved, a preferred image page can be published, thus reducing the running cost.

In the 12th embodiment, since a page plan which has been edited by a volunteer who can use a largest number of candidate pages and which is supported by many volunteers is approved, a preferred image page can be published, thus reducing the running cost.

In the 13th embodiment, since a candidate page plan which has been edited by a volunteer who can use a largest number of candidate pages and which is supported by many volunteers and includes many selected or supported images is approved, a preferred image page can be published, thus reducing the running cost.

Also, in the 13th embodiment since the importance level of a candidate page plan which includes an image which is not supported upon creating the candidate page is decreased, a more preferred image page can be published, thus reducing the running cost.

In the 14th embodiment, since the candidate list is displayed in the order of importance levels of candidates, it becomes easy to edit based on a more preferred candidate page, thus publishing a preferred image page, and reducing the running cost.

When the above embodiment is applied to a case wherein a page or image is partially edited in place of selecting an image in units of angles, the score can be computed for the entire page while page or image parts are edited or even when an identical part is shared by a plurality of persons, a good image or page can be created in collaboration.

As described above, according to the ninth to 14th embodiment, an image to be included in a document which is submitted on the network can be easily updated, and can be automatically published on the network.

15th Embodiment

In the first embodiment, images are evenly displayed on a candidate page. However, the present invention is not limited to such specific embodiment.

The 15th embodiment will be described in detail below.

Figure 59:
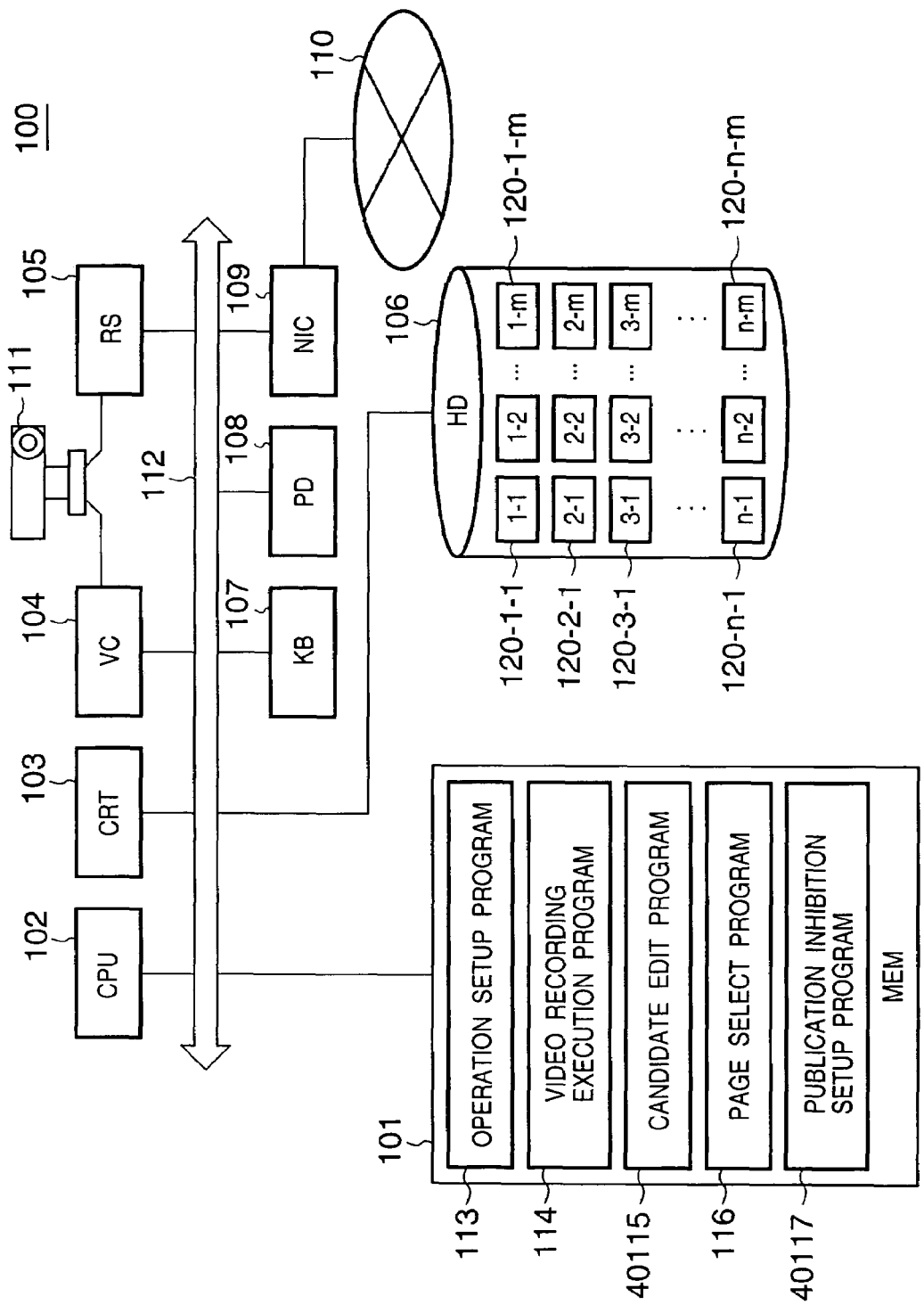
FIG. 59 is a block diagram showing the arrangement of a camera server according to the 15th embodiment of the present invention.

The system arrangement is substantially the same as that of the camera server in the first embodiment, except that the candidate edit program 115 in the first embodiment is replaced by a candidate edit program 40115, and a publication inhibition setup program 40117 is added to the contents of the memory 101 in FIG. 1 of the first embodiment, as shown in FIG. 59.

The operations of the operation setup program 113, video recording execution program 114, and page select program 116 are the same as those in the first embodiment. Note that video recording data records information of image sensing positions and times.

Figure 60:
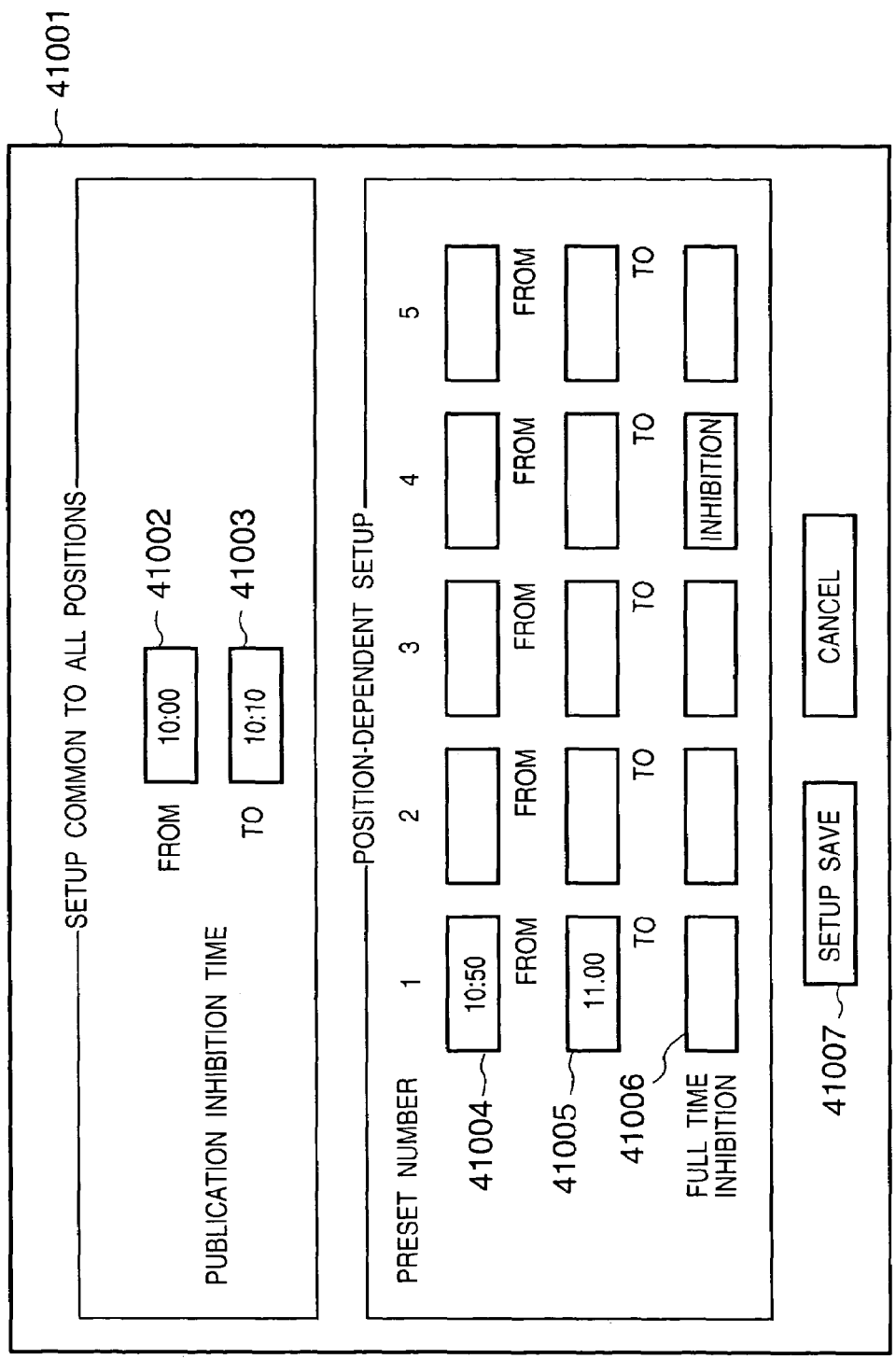
FIG. 60 shows an example of publication inhibition setups in the 15th embodiment.
Figure 61:
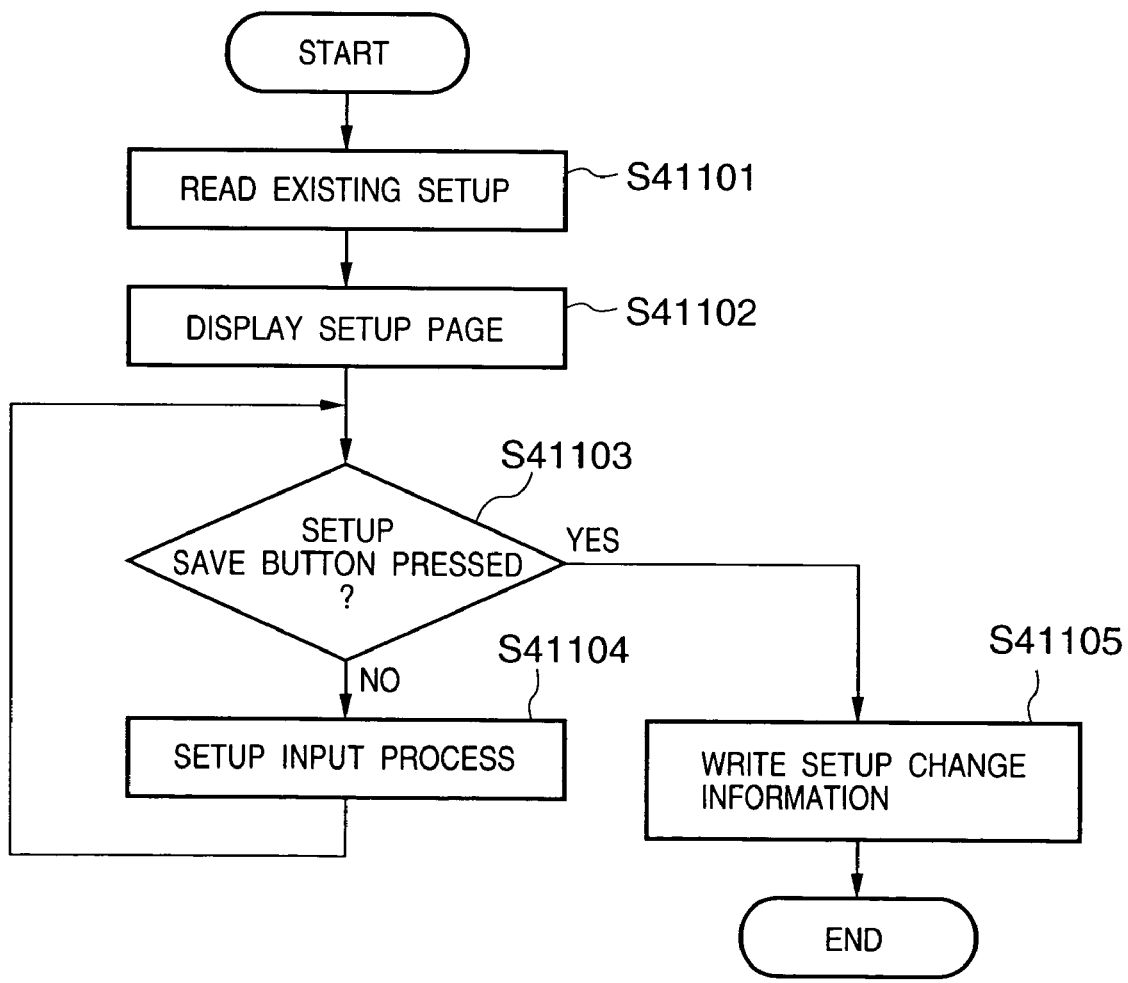
FIG. 61 is a flow chart showing the contents of a publication inhibition setup process in the 15th embodiment.

FIG. 60 shows an example of the operation setups of the publication inhibition setup program 40117, and the flow of the publication inhibition setup program will be explained below using the flow chart in FIG. 61.

The publication inhibition program is launched in response to an operator's request. Existing setup data (not shown) is read from the auxiliary storage device (step S41101), and a setup page window 41001 in FIG. 60 is displayed (step S41102). On this window, publication inhibition start and end times common to all the positions can be input in fields 41002 and 41003. In position-dependent setups, the publication inhibition start and end times of the first preset positions can be input in fields 41004 and 41005. Also, a publication inhibition position can be set in a field 41006 irrespective of time. Likewise, publication inhibition setups can be made for a maximum of five preset positions in the 15th embodiment. Of course, the number of positions may be increased. The setup input process in step S41104 repeats itself until a setup save button 41007 is pressed, and if it is determined that the setup save button 41007 has been pressed (step S41103), the flow advances to step S41105.

In the setup input process in step S41104, data input to various fields are checked, and display of input data is changed. In the example of FIG. 60, the publication inhibition start and end times common to all the positions, and the publication inhibit time information of the first preset position are set. Also, since the fields for the fourth preset position have no time entry about time, and designate that the image is not to be published, an image at this position is not published irrespective of time in this setup.

In step S41105, pieces of displayed information are written in the auxiliary storage device. In the example in FIG. 60, setups indicating that images are not published from 10:00 to 10:10 for all the preset positions, and an image at the first preset position from 10:50 to 11:00 and all images at the fourth preset position are not published are saved.

In this embodiment, the publication inhibition setup program 40117 is launched in response to an operator's request. In this case, the video recording execution program 114 might have already been executed. When the publication inhibition positions and times are known in advance, if the publication inhibition setup program is called from the operation setup program upon execution of the operation setup program 113, this setup is reflected upon execution of the video recording execution program, and images at the publication inhibition positions or the publication inhibition times can be prevented from being captured and stored. In this manner, the memory can be prevented from being wasted, and the running cost can be reduced. Also, the image sensing position or image sensing time need not be saved together with an image. The publication inhibition setup program has been explained.

Figure 62:
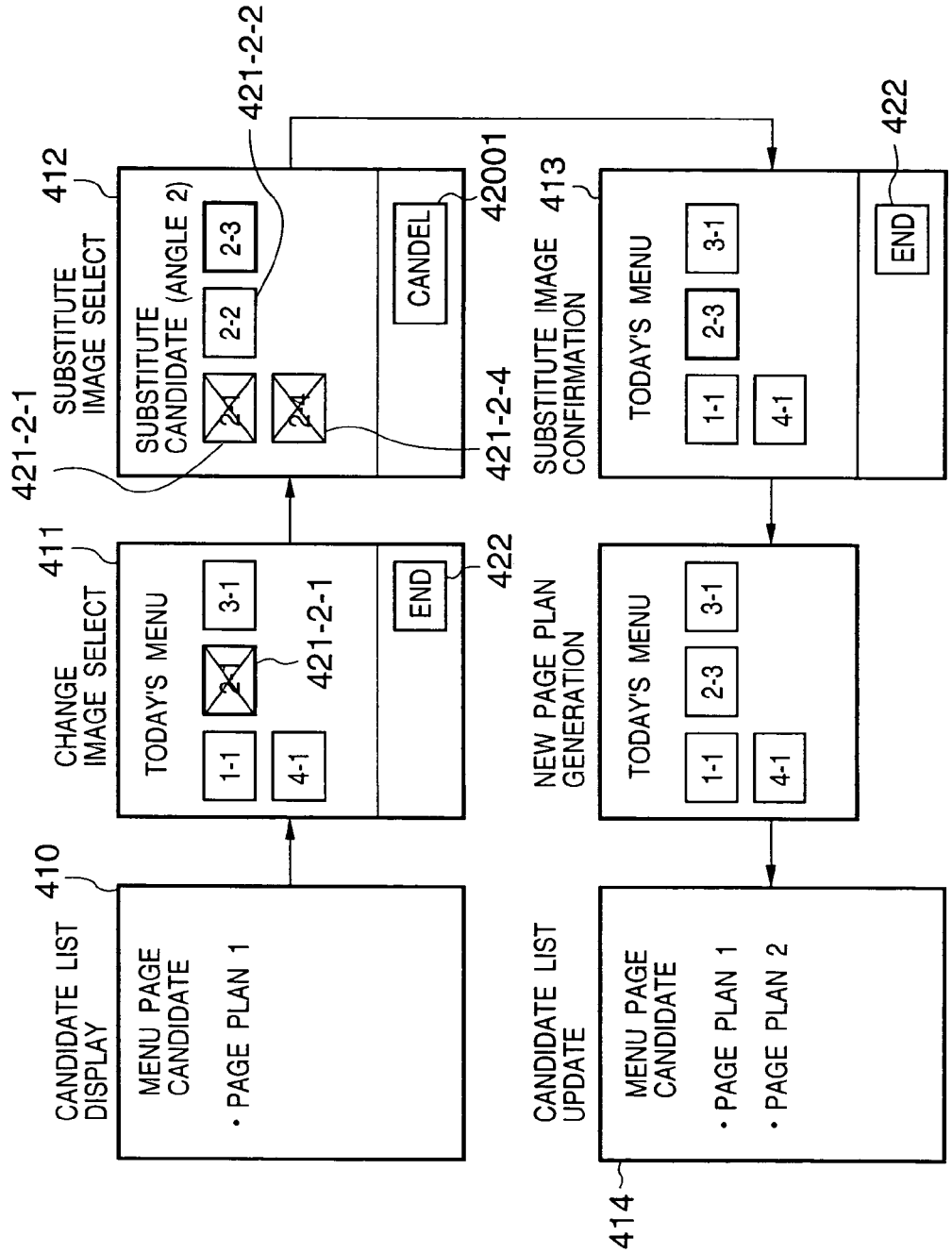
FIG. 62 is a chart showing an example of the flow of image edit processes in the 15th embodiment.

FIG. 62 shows the flow of image edit processes.

In FIG. 62, a button 42001 is added to the interface shown in FIG. 4 of the first embodiment to allow to cancel image substitution.

Figure 63:
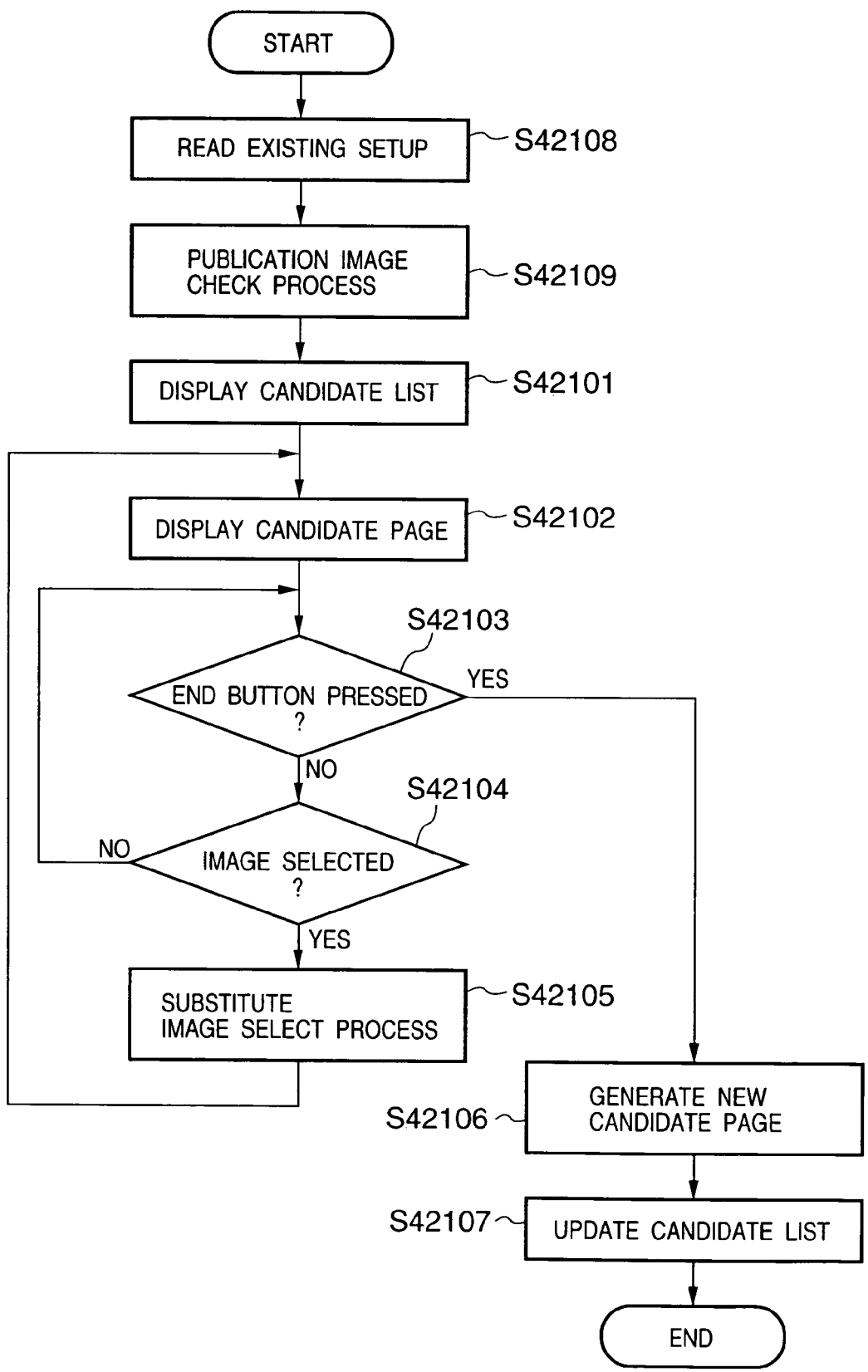
FIG. 63 is a flow chart showing the contents of a candidate edit process in the 15th embodiment.

The flow of the operation of the candidate edit program 40115 is as shown in FIG. 63, and is substantially the same as the flow chart of FIG. 8 of the first embodiment, except that a candidate page display process in step S42102, a substitute image select process in step S42105, a setup read process in step S42108, and a publication inhibited image check process in step S42109 are added to the head of the flow in this order.

Steps S42101, S42103, S42104, S42106, and S42107 in FIG. 63 are respectively the same as steps S801, S803, S804, S806, and S807 in FIG. 8 of the first embodiment.

A process executed when the button 42001 in FIG. 62 is clicked in step S42105 upon selecting an image in step S42104 so as to cancel image selection is added to step S805 in FIG. 8 of the first embodiment.

FIG. 64 shows an example of the contents of a publication list 42201 in the 15th embodiment.

In the setup read process in step S42108, setup data (stored in the HD 106) generated by the publication inhibition setup program 40117 is read to execute a publication inhibited image check process (step S42109). That is, it is checked based on the position and image sensing time if each image is inhibited from being published. If an image can be published, "OK" is stored in the corresponding field of the publication list; if an image is inhibited from being published, "NG" is stored.

In the candidate page display process in step S42102 and the substitute image select process in step S42105, publication inhibited images are displayed to be distinguished from other images on the basis of the publication inhibited image check process result. In the example shown in FIG. 62, publication inhibited images such as image 421-2-1 on the change image select window 411 and images 421-2-1 and 421-2-4 on the substitute image select window 412 can be displayed to be easily distinguished from other images.

In the 15th embodiment, when publication inhibition conditions are set, publication inhibited images are emphasized upon displaying a candidate page. In this manner, whether or not each image can be published can be determined, thus improving the edit efficiency of an image list page.

Also, an image which should not be published inadvertently can be prevented from being uploaded.

16th Embodiment

In the 10th to 14th embodiments, importance computations are made using edit or support records of a candidate page or select or support records of images. However, the present invention is not limited to such specific embodiments.

In the 16th embodiment, the priority of a candidate page is changed using publication inhibited image information.

In this way, an image list page that includes a publication inhibited image can be prevented from being open to the public.

Details of the 16th embodiment will be explained below.

Figure 65:
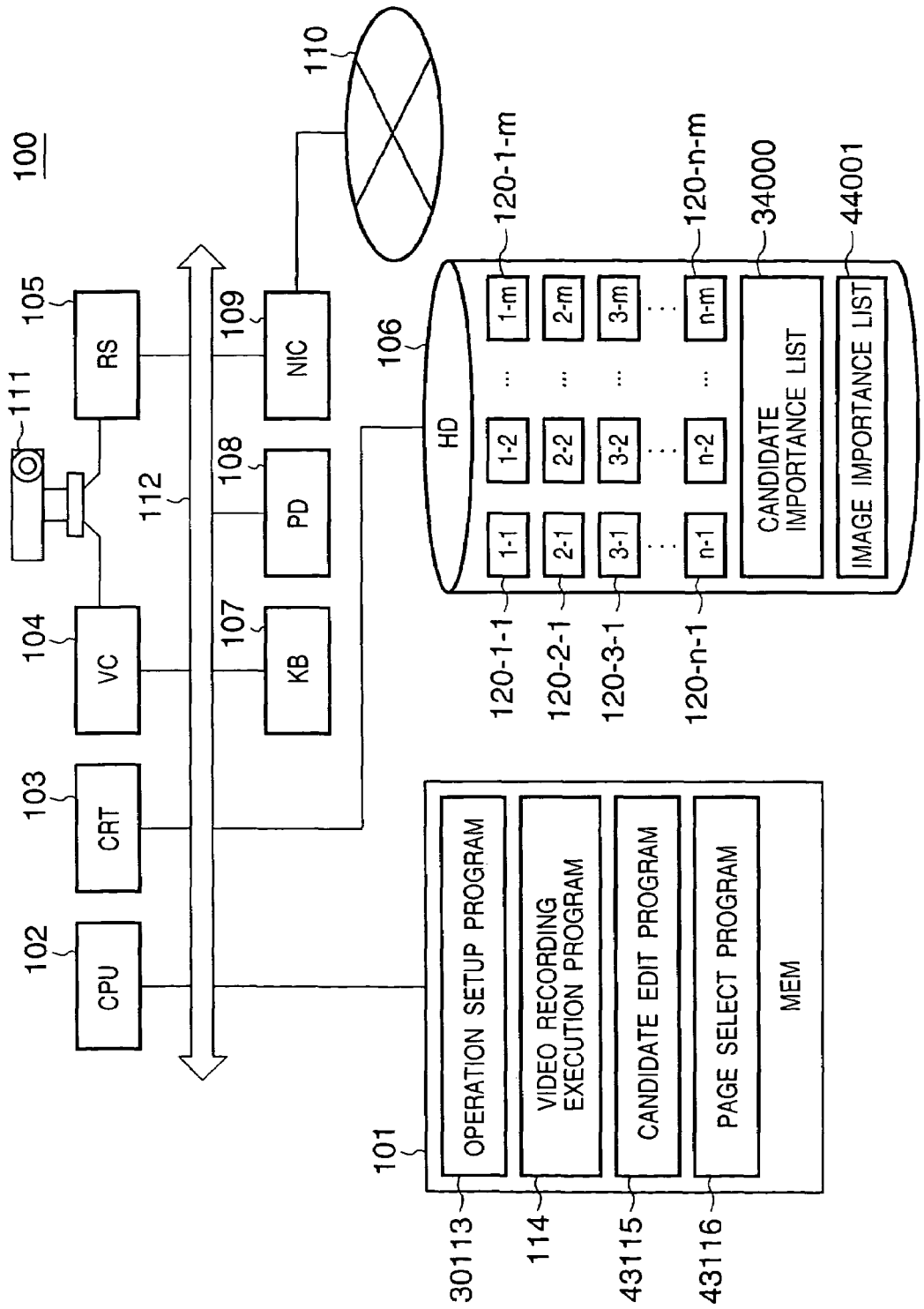
FIG. 65 is a block diagram showing the arrangement of a camera server according to the 16th embodiment of the present invention.

The system arrangement is substantially the same as that of the camera server of the 14th embodiment, except that the candidate edit program 35115 and page select program 34116 of the 14th embodiment are respectively replaced by a candidate edit program 43115 and page select program 43116, as shown in FIG. 65. Also, the candidate importance list 34001 in the HD 106 of the camera server of the 14th embodiment is replaced by an image importance list 44001.

The operations of the operation setup program 30113 and video recording execution program 114 are the same as those in the 14th embodiment.

The operation of the 16th embodiment will be described in detail below.

Figure 66:
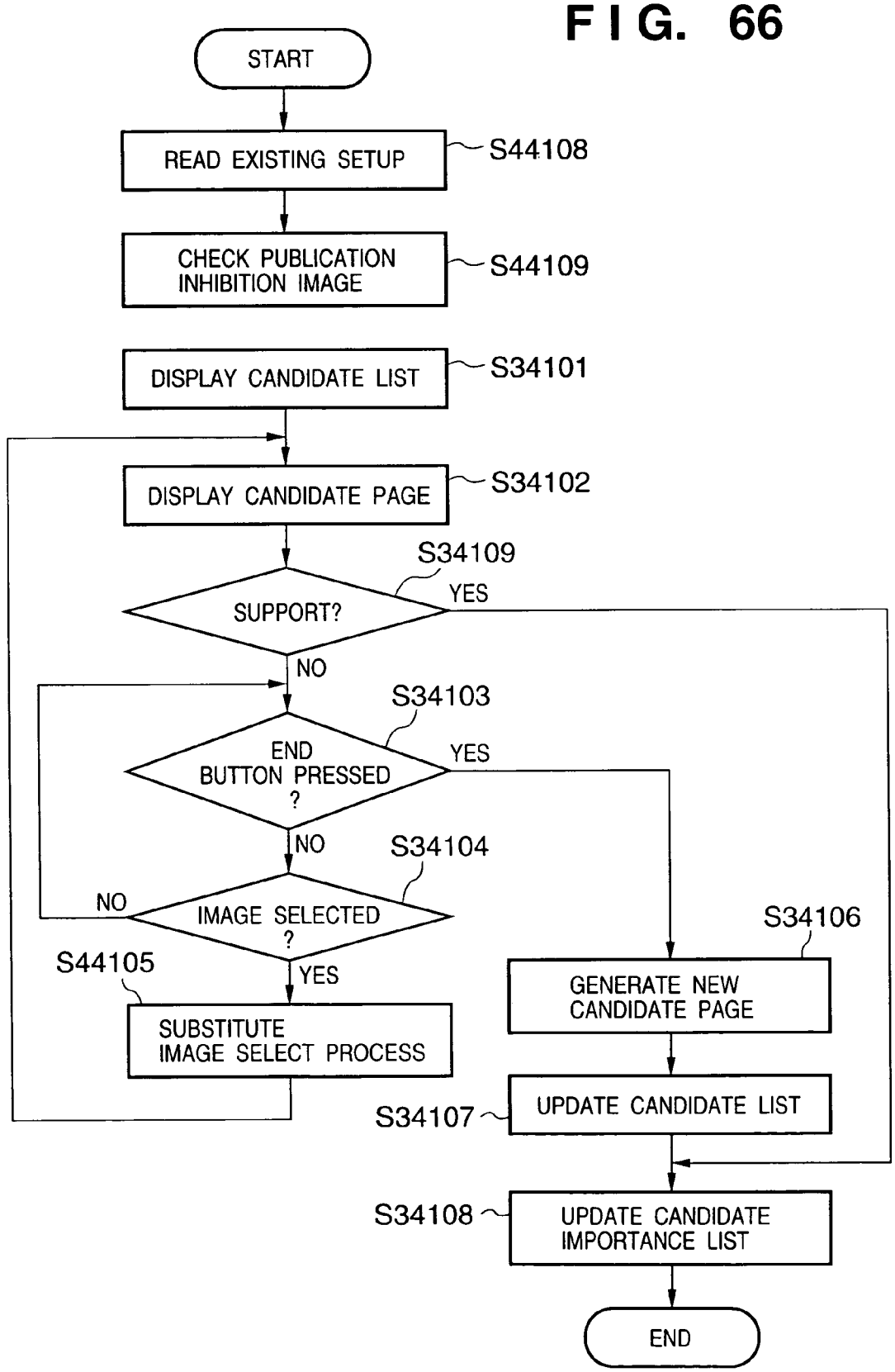
FIG. 66 is a flow chart showing the contents of a candidate edit process in the 16th embodiment.

The flow of the operation of the candidate edit program 43115 is substantially the same as the flow chart of FIG. 53 in the 13th embodiment, except that step S34105 is replaced by a substitute image select/recording process (step S44105), and a setup read process (step S44108) and a publication inhibited image check process (step S44109) are added to the head of the flow in this order, as shown in FIG. 66.

FIG. 67 shows an example of the image importance list 44001 in the 16th embodiment. In this list, a publication field is added to the image importance list 34001.

Note that the setup read process (step S44108) is the same as that in the 15th embodiment, and the publication inhibition process (step S44109) is also substantially the same as that in the 15th embodiment. In the process of the 15th embodiment, the list to be updated is the publication list 42201, but in the publication inhibited image check process S44109 of the 16th embodiment, the image importance list 44001 is used. In both these processes, the contents of the publication field are updated.

Also, in the substitute image select/recording process (step S44105), the contents of the select and support fields are similarly updated, although the image importance list 44001 is used.

In the example shown in FIG. 67, an image 120-1-1 has a number of times of selection=1 and a number of times of support=1, and can be published. Likewise, an image 120-3-1 has a number of times of selection=2 and a number of times of support=0, and is inhibited from being published. Also, an image 120-1-2 has both numbers of times of selection and support=0, and is inhibited from being published. In this example, "OK" or "NG" is recorded as publication information for the sake of simplicity. Alternatively, if "0" for OK or "−100" for NG is recorded, the importance level of each image can be computed from the image importance list. That is, the page select program 43116 implements substantially the same operations as in the 13th and 14th embodiments, except that a score as to whether an image is allowed to be published or not is added (subtracted).

In this fashion, an image page that satisfies the publication inhibition conditions is harder to select, thus improving the select efficiency.

17th Embodiment

Figure 68:
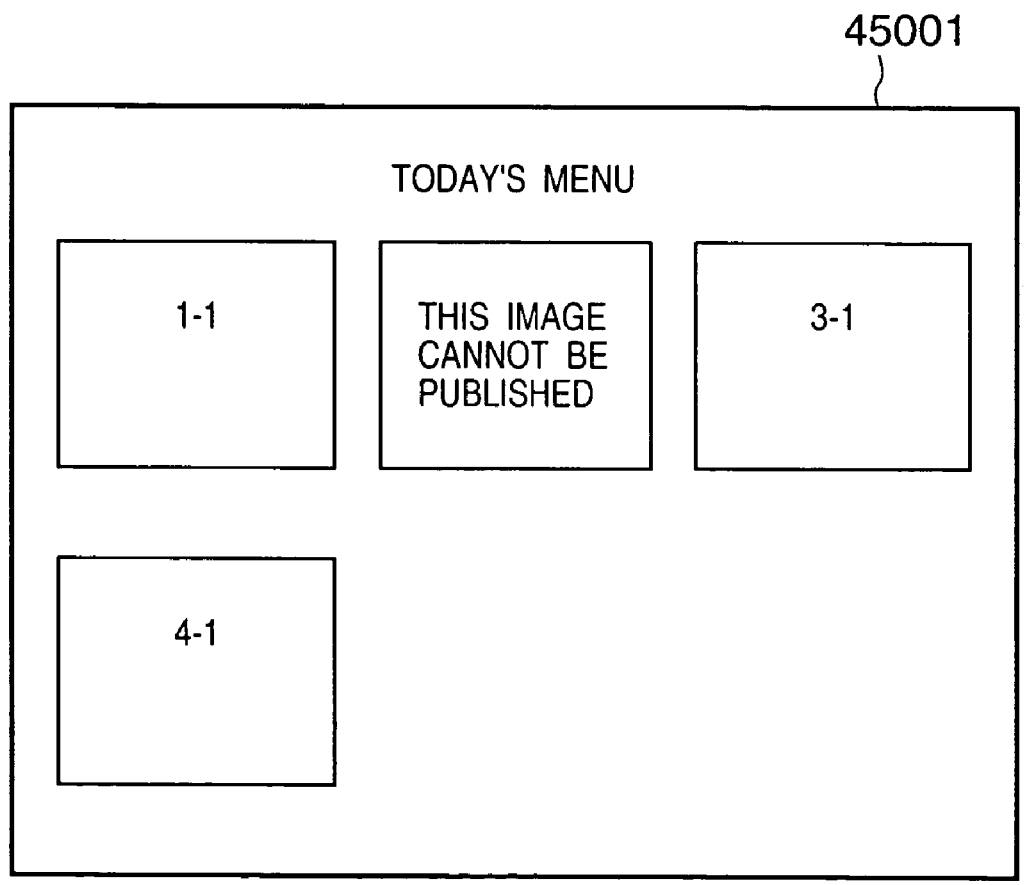
FIG. 68 shows an example of a page created by the 17th embodiment of the present invention.

In the 17th embodiment, a page upload process (see FIG. 3) in step S31207 in the page select program 34116 has different processing contents. Prior to page upload, whether or not an image at each position is inhibited from being published is checked with reference to the image importance list 44001. If the image of interest is inhibited from being published, it is substituted by a predetermined image. For example, the image of interest is substituted by an image of text "this image cannot be published" which is prepared in advance. After that, the page is uploaded. For example, when an image at the second position is inhibited from being published, a display like on a window 45001 in FIG. 68 is made.

In this manner, an image which is set to be inhibited from being published is not published even if it is picked up upon edit, thus allowing secure operation.

In the above example, an image is substituted by another image. Alternatively, a publication inhibited image may be simply deleted from the page to be uploaded.

Also, not only a publication inhibited image but also an image which is neither supported nor edited may be handled similarly.

In the first to 17th embodiments mentioned above, the processes in the camera server have been exemplified. In this case, the camera server may be either a system including a plurality of devices or an apparatus consisting of a single device.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the above embodiments, a preferred one of image pages created by volunteers is open to the public, thus reducing the running cost.

Especially, in the 15th embodiment, upon creating a candidate image list page, a publication inhibited image can be emphasized upon being displayed, thus greatly reducing the load of the edit work.

In the 16th embodiment, since the importance level of automatic selection of a candidate page on which an image at the inhibited position or time is selected is decreased, an image list page including a publication inhibited image can be prevented from being published.

In the 17th embodiment, when a candidate page is approved and is open to the public, a publication inhibited image is automatically substituted by a preferred image, thus improving the appearance of an image list page.

Furthermore, in the 17th embodiment when a candidate page is approved and is open to the public, a publication inhibited image is deleted, thus improving the appearance of an image list page. Also, even when a publication inhibited image is inadvertently picked up upon edit, it can be prevented from being published, thus improving security.

As described above, according to the 15th to 17th embodiments, an image to be included in a document which is submitted on the network can be easily updated, and an image which is sensed under a required image sensing condition can be set to be inhibited from being published.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for submitting document information including a plurality of images via a network, said apparatus comprising:
   an image pickup unit;
   a schedule setting unit adapted to set, in advance, an image pickup position and a image pickup time of said image pickup unit as schedule information and store the schedule information in a memory;
   an image storage unit adapted to store an image which is obtained by said image pickup unit in accordance with the schedule information stored in the memory;
   a first display unit adapted to display the images in the document information which had been created;
   a first designation unit for designating an image among the plurality of images in the document information displayed by said first display unit, to be replaced with an image newly stored in said image storage unit, and displaying the designated image in a different manner from non-designated images;
   a second display unit adapted to display images newly stored in said image storage unit;
   a second designation unit for designating a new image among the images displayed by said second display unit and displaying the designated image in a different manner from non-designated images displayed by said second display unit;
   a document creation unit adapted to create new document information by substituting the image designated by said second designation unit for the designated image, designated by said first designation unit, in the document information; and
   means for storing an image prepared in advance, and substituting an image among the plurality of images in the document information, which is not changed, by the image prepared in advance.

2. The apparatus according to claim 1, further comprising means for transferring the document information created by said document creation unit to a network server.

3. The apparatus according to claim 1, wherein the document information is HTML document information.

4. A method of controlling an information processing apparatus for submitting document information including a plurality of images via a network, said method comprising:
   the step of setting, in advance, an image pickup position and an image pickup time of an image pickup unit as schedule information and storing the schedule information in a memory;
   the step of storing an image which is obtained by the image pickup unit in accordance with the schedule information stored in the memory;
   the first display step of displaying the images in the document information which had been created;
   the first designation step of designating an image among the plurality of images in the document information displayed by said first display step, to be replaced with an image newly stored in said image storage step, and displaying the designated image in a different manner from non-designated images;
   the second display step of displaying images newly stored in said image storage step;
   the second designation step of designating a new image among the images displayed by said second display step and displaying the designated image in a different manner from non-designated images displayed by said second display step;
   the step of creating new document information by substituting the image designated by said second designation step for the image, designated by said first designation step, in the document information; and
   the step of storing an image prepared in advance, and substituting an image among the plurality of images in the document information, which is not changed, by the image prepared in advance.

5. A storage medium that stores a computer program code for an information processing apparatus which comprises image input means and submits document information including a plurality of images via a network, the code comprising:
   a program code of the step of setting, in advance, an image pickup position and an image pickup time of an image pickup unit as schedule information and storing the schedule information in a memory;
   a program code of the step of storing an image which is obtained by said image pickup unit in accordance with the schedule information stored in the memory;
   a program code of the first display step of displaying the images in the document information which had been created;

a program code of the first designation step of designating an image among the plurality of images in the document information displayed by said first display step, to be replaced with an image newly stored in said image storage step, and displaying the designated image in a different manner from non-designated images;

a program code of the second display step of displaying images newly stored in said image storage step;

a program code of the second designation step of designating a new image among the images displayed by said second display step and displaying the designated image in a different manner from non-designated images displayed by said second display step;

a program code of the step of creating new document information by substituting the image designated by said second designation step for the image, designated by said first designation step, in the document information; and a program code of the step of storing an image prepared in advance, and substituting an image among the plurality of images in the document information, which is not changed, by the image prepared in advance.

* * * * *

UNITED STATES PATENT AND TRADEMARK OFFICE
CERTIFICATE OF CORRECTION

PATENT NO. : 7,249,317 B1 Page 1 of 1
APPLICATION NO. : 09/667638
DATED : July 24, 2007
INVENTOR(S) : Hisao Nakagawa et al.

It is certified that error appears in the above-identified patent and that said Letters Patent is hereby corrected as shown below:

IN THE DRAWINGS:
Sheet 60, FIG. 62, "CANDEL" should read --CANCEL--.

COLUMN 7:
Line 67, "120-2-1." should read --120-2-1,....--.

COLUMN 19:
Line 42, "ing-images" should read --ing images--.

COLUMN 32:
Line 26, "the-fourth" should read --the fourth--.

COLUMN 35:
Line 52, "a" should read --an--.

Signed and Sealed this

Eighteenth Day of March, 2008

JON W. DUDAS
*Director of the United States Patent and Trademark Office*